United States Patent [19]
Brownrigg et al.

[11] Patent Number: 6,044,062
[45] Date of Patent: Mar. 28, 2000

[54] WIRELESS NETWORK SYSTEM AND METHOD FOR PROVIDING SAME

[75] Inventors: Edwin B. Brownrigg, Roseville; Thomas W. Wilson, Alameda, both of Calif.

[73] Assignee: CommUnique, LLC, Alameda, Calif.

[21] Appl. No.: 08/760,895

[22] Filed: Dec. 6, 1996

[51] Int. Cl.$^7$ .................................................. H04Q 7/38
[52] U.S. Cl. ......................... 370/238; 370/315; 455/445; 455/11.1
[58] Field of Search .................................... 370/310, 315, 370/327, 328, 338, 351, 237, 238, 501, 401, 402, 255, 256, 389; 455/11.1, 445; 340/826, 827, 825.03; 709/238, 239, 240, 241, 242, 243, 244

[56] References Cited

U.S. PATENT DOCUMENTS

| | | | |
|---|---|---|---|
| 5,282,204 | 1/1994 | Shpancer et al. | 370/350 |
| 5,592,491 | 1/1997 | Dinkins | 455/111.1 |
| 5,757,783 | 5/1998 | Eng et al. | 455/11.1 |
| 5,790,938 | 8/1998 | Talarmo | 455/11.1 |

OTHER PUBLICATIONS

Westcott, Jil et al., "A Distributed Routing Design for a Broadcast Environment," IEEE 1982, pp. 10.4–1–10.4–5.

Kahn, Robert E., "Advances in Packet Radio Technology," IEEE Nov. 1978, vol. 66, No. 11, pp. 1468–1496.

Kahn, Robert E., "The Organization of Computer Resources into a Packet Radio Network," IEEE Jan. 1977, vol. Com–25, No. 1, pp. 169–178.

Frankel, Michael S., "Packet Radios Provide Link for Distributed, Survivable C$^3$ in Post–Attack Scenarios," MSN Jun. 1983.

Lauer, Greg et al., "Communications in the Information Age," pp. 15.1.1–15.1.4, IEEE Globecom '84, 1984.

WestCott, Jil A., "Issues in Distributed Routing for Mobile Packet Radio Network," IEEE 1982, pp. 233–238.

Gower, Neil et al., "Congestion Control Using Pacing in a Packet Radio Network," IEEE 1982, pp. 23.1–1–23.1–6.

MacGregor, William et al., "Multiple Control Stations in Packet Radio Networks," IEEE 1982, pp. 10.3–1–10.3–5.

Shacham, Nachum et al., "Future Directions in Packet Radio Technology," IEEE 1985, pp. 93–98.

Jubin, John, "Current Packet Radio Network Protocols," IEEE 1985, pp. 86–92.

*Primary Examiner*—Huy D. Vu
*Attorney, Agent, or Firm*—Hickman Stephens Coleman & Hughes, LLP

[57] ABSTRACT

A wireless network system includes a server having a server controller and a server radio modem, and a number of clients each including a client controller and a client radio modem. The server controller implements a server process that includes the receipt and the transmission of data packets via the radio modem. The client controllers of each of the clients implements a client process that includes the receipt and transmission of data packets via the client radio modem. The client process of each of the clients initiates, selects, and maintains a radio trasmission path to the server that is either a direct path to the server, or is an indirect path or "link" to the server through at least one of the remainder of the clients. A method for providing wireless network communication includes providing a server implementing a server process including receiving data packets via a radio modem, sending data packets via the server radio modem, communicating with the network, and performing housekeeping functions, and further includes providing a number of clients, each implementing a client process sending and receiving data packets via a client radio modem, maintaining a send/ receive data buffer, and selecting a radio transmission path to the server. The radio transmission path or "link" is either a direct path to the server, or an indirect path to the server through at least one of the remainder of the clients. The process preferably optimizes the link to minimize the number of "hops" to the server.

16 Claims, 42 Drawing Sheets

| 36 | | | | | | | | | |
|---|---|---|---|---|---|---|---|---|---|
| 001 | 002 | 003 | 004 | 005 | 006 | 007 | 008 | 009 | 010 |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one Internet server in range of client 5.

5 will issue an "I am alive" packet seeking a route to the Internet.

Internet server 14 will respond and add user client 5 to its routing table as its left son.

The updated routing table of Internet server 14 is: 14(05).

The route from user client 5 to the Internet is: 05>14.

Fig. 2b

| 001 | 002 | 003 | 004 | ¥05 | ¥06 | 007 | 008 | 009 | 010 |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one user client in range of client 6.

6 will issue an "I am alive" packet seeking a client repeater route to the Internet.

5 will respond and add 6 to its routing table as its left son.

The updated routing table of Internet server 14 is:
14(05(06)).

The route from user client 6 to the Internet is: 06>05>14.

| 001 | 002 | 003 | 004 | ¥05 | ¥06 | ¥07 | 008 | 009 | 010 |
| --- | --- | --- | --- | --- | --- | --- | --- | --- | --- |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one user client in range of client 7.

7 will issue an "I am alive" packet seeking a client repeater route to the Internet.

6 will respond and add 7 to its routing table as its left son.

The updated routing table of Internet server 14 is:
14(05(06(07))).

The route from user client 7 to the Internet is: 07>06>05>14.

Fig. 2d

| 001 | 002 | 003 | 004 | ¥05 | ¥06 | ¥07 | 008 | 009 | 010 |
| --- | --- | --- | --- | --- | --- | --- | --- | --- | --- |
| 011 | 012 | 013 | ●14 | 015 | ¥16 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one Internet server in range of client 16.

16 will issue an "I am alive" packet seeking a route to the Internet.

Internet server 26 will respond and add user client 16 to its routing table as its left son.

The updated routing table of Internet server 26 is: 26(16).

The route from user client 16 to the Internet is: 16>26.

Fig. 2e

Server 14 = 14(05(06))
Server 26 = 26(16(07))

Client 05 = 05(06); >14
Client 06 = 06; >05>14
Client 07 = 07; >16>26
Client 16 = 16(07); >26

In a universe of 6 nodes, of which 2 are servers, the average hop distance from a client to an Internet server is 1.5.

Fig. 2f

| | | | | | | | | | |
|---|---|---|---|---|---|---|---|---|---|
| ¥01 | ¥02 | ¥03 | ¥04 | ¥05 | ¥06 | ¥07 | ¥08 | ¥09 | ¥10 |
| ¥11 | ¥12 | ¥13 | ●14 | ¥15 | ¥16 | ¥17 | ¥18 | ¥19 | ¥20 |
| ¥21 | ¥22 | ¥23 | ¥24 | ¥25 | ●26 | ¥27 | ¥28 | ¥29 | ¥30 |
| ¥31 | ¥32 | ¥33 | ¥34 | ¥35 | ¥36 | ¥37 | ¥38 | ¥39 | ¥40 |
| ¥41 | ¥42 | ¥43 | ¥44 | ¥45 | ¥46 | ¥47 | ¥48 | ¥49 | ¥50 |
| ¥51 | ¥52 | ¥53 | ¥54 | ¥55 | ¥56 | ¥57 | ¥58 | ¥59 | ¥60 |

Server 14 =
14(24(34),23(32(41(51),42(52)),33(43)),13(22(31)),05(06),
04,03(02(11),12(01,21)))

Server 26 =
26(37(48(59(60),49(50),58),38(39(40)),28(29(30)),47(57)),
36(46(56)),35(44(53,54),45(55)),27(18(19(20))),25,
17(08(09(10)),07),16,15)

Client 01 = 01; >12>03>14
Client 02 = 02(11); >03>14
Client 03 = 03(02(11),12(01,21)); >14
Client 04 = 04; >14
Client 05 = 05(06); >14
Client 06 = 06; >05>14
Client 07 = 07; >17>26
Client 08 = 08(09(10)); >17>26
Client 09 = 09(10); >08>17>26
Client 10 = 10; >09>08>17>26
Client 11 = 11; >02>03>14
Client 12 = 12(01,21); >03>14
Client 13 = 13(22(31)); >14
Client 15 = 15; >26
Client 16 = 16; >26
Client 17 = 17(08(09(10)),07); >26
Client 18 = 18(19(20)); >27>26
Client 19 = 19(20); >18>27>26
Client 20 = 20; >19>18>27>26
Client 21 = 21; >12>03>14
Client 22 = 22(31); >13>14
Client 23 = 23(32(41(51),42(52)),33(43)); >14
Client 24 = 24(34); >14
Client 25 = 25; >26
Client 27 = 27(18(19(20))); >26
Client 28 = 28(29(30));>37>26
Client 29 = 29(30);>28>37>26
Client 30 = 30;>29>28>37>26
Client 31 = 31;>22>13>14

Fig. 2h'

Client 32 = 32(41(51),42(52)); >23>14
Client 33 = 33(43);>23>14
Client 34 = 34;>24>14
Client 35 = 35(44(53,54),45(55));>26
Client 36 = 36(46(56));>26
Client 37 = 37(48(59(60),49(50),58),38(39(40)),
28(29(30)),47(57));>26
Client 38 = 38(39(40));>37>26
Client 39 = 39(40);>38>37>26
Client 40 = 40;>39>38>37>26
Client 41 = 41(51);>32>23>14
Client 42 = 42(52);>32>23>14
Client 43 = 43;>33>23>14
Client 44 = 44(53,54);>35>26
Client 45 = 45(55);>35>26
Client 46 = 46(56);>36>26
Client 47 = 47(57);>37>26
Client 48 = 48(59(60),49(50),58);>37>26
Client 49 = 49(50);>48>37>26
Client 50 = 50;>49>48>37>26
Client 51 = 51;>41>32>23>14
Client 52 = 52;>42>32>23>14
Client 53 = 53;>44>35>26
Client 54 = 54;>44>35>26
Client 55 = 55;>45>35>26
Client 56 = 56;>46>36>26
Client 57 = 57;>47>37>26
Client 58 = 58;>48>37>26
Client 59 = 59(60);>48>37>26
Client 60 = 60;>59>48>37>26

In a universe of 60 nodes, of which 2 are servers, the average hop distance from a client to an Internet server is 2.36206897.

Fig. 2h"

Traversing user client universe . . ..

User client, 9, has 5 user client neighbors.

User client, 9, will probe each for the shortest route to the Internet.
9's current route to the Internet is: nonexistant.

9 is now probing 10.
User client, 9, has no Internet server.
9's current route to the Internet is: nonexistant.

9 is now probing 20.
User client, 9, has no Internet server.
9's current route to the Internet is: nonexistant.

9 is now probing 19.
User client, 9, has no Internet server.
9's current route to the Internet is: nonexistant.

9 is now probing 18.
User client, 9, has no Internet server.
9's current route to the Internet is: nonexistant.

9 is now probing 8.
User client 8 will add 9 to its routing table as its left son.

The updated routing table of Internet server 14 is:
14(05(06(07(08(09)))),04,03).

The route from user client 9 to the Internet is:
09>08>07>06>05>14.

Fig. 2i

Traversing user client universe . . ..

User client, 29, has 8 user client neighbors.

User client, 29, will probe each for the shortest route to the Internet. 29's current route to the Internet is: nonexistant.

29 is now probing 19.
User client 19 will add 29 to its routing table as its left son.

The updated routing table of Internet server 14 is:
14(24,23,13,05(06(07(08(18(28),09(19(29),10(20))))),
04,03(12(22,21))).

The route from user client 29 to the Internet is:
29>19>09>08>07>06>05>14.

Fig. 2j

Traversing user client universe . . ..

User client, 7, has 5 user client neighbors.

User client, 7, will probe each for the shortest route to the Internet.
7's current route to the Internet is: 07>06>05>14.

7 is now probing 8.
7's current route to the Internet is: 07>06>05>14.

7 is now probing 18.
7's current route to the Internet is: 07>06>05>14.

7 is now probing 17.
User client, 7, has probed its neighbor, user client, 17, and found a shorter path to the Internet.

The old routing table of Internet server, 14, is:
14(24(34(44(54))),23(33(43(53))),13,05(06(07(08(18(28(38(48(58)))),
09(19(29(39(49(59)))),10(20(30(40(50(60)))))))))),04,03(02,12(01,
22(32(42(52))),21(31(41(51))))).

The updated routing table of Internet server, 26, is:
26(37(47(57)),36(46(56)),35(45(55)),27,25,17(07(08(18(28(38
(48(58)))),09(19(29(39(49(59)))),10(20(30(40(50(60)))))))),16,15).

The route from user client, 7, to the Internet is: 07>17>26.
7's current route to the Internet is: 07>17>26.

7 is now probing 16.
7's current route to the Internet is: 07>17>26.

7 is now probing 6.
7's final route is 07>17>26.

Fig. 2k

Traversing user client universe . . ..

User client, 8, has 5 user client neighbors.

User client, 8, will probe each for the shortest route to the Internet.
8's current route to the Internet is: 08>07>17>26.

8 is now probing 9.
8's current route to the Internet is: 08>07>17>26.

8 is now probing 19.
8's current route to the Internet is: 08>07>17>26.

8 is now probing 18.
8's current route to the Internet is: 08>07>17>26.

8 is now probing 17.
User client, 8, has probed its neighbor, user client, 17, and found a shorter path to the Internet.

The old routing table of Internet server, 26, is:
26(37(47(57)),36(46(56)),35(45(55)),27,25,17(07(08(18(28(38(48(58)))),09(19(29(39(49(59)))),10(20(30(40(50(60)))))))),16,15).

The updated routing table of Internet server, 26, is:
26(37(47(57)),36(46(56)),35(45(55)),27,25,17(08(18(28(38(48(58)))),09(19(29(39(49(59)))),10(20(30(40(50(60))))))),07),16,15).

The route from user client, 8, to the Internet is: 08>17>26.
8's current route to the Internet is: 08>17>26.

8 is now probing 7.
8's final route is 08>17>26.

Fig. 2I

Traversing user client universe . . ..

User client, 18, has 8 user client neighbors.

User client, 18, will probe each for the shortest route to the Internet.
18's current route to the Internet is: 18>08>17>26.

18 is now probing 8.
18's current route to the Internet is: 18>08>17>26.

18 is now probing 9.
18's current route to the Internet is: 18>08>17>26.

18 is now probing 19.
18's current route to the Internet is: 18>08>17>26.

18 is now probing 29.
18's current route to the Internet is: 18>08>17>26.

18 is now probing 28.
18's current route to the Internet is: 18>08>17>26.

18 is now probing 27.
User client, 18, has probed its neighbor, user client, 27, and found a shorter path to the Internet.
The old routing table of Internet server, 26, is:
26(37(47(57)),36(46(56)),35(45(55)),27,25,17(08(18(28(38 (48(58)))),09(19(29(39(49(59)))),10(20(30(40(50(60)))))),07),16,15).

The updated routing table of Internet server, 26, is:
26(37(47(57)),36(46(56)),35(45(55)),27(18(28(38(48(58))))),25, 17(08(09(19(29(39(49(59)))),10(20(30(40(50(60)))))),07),16,15).

The route from user client, 18, to the Internet is: 18>27>26.
18's current route to the Internet is: 18>27>26.

18 is now probing . . ..

18's final route is 18>27>26.

Fig. 2m

User client, 29, has 8 user client neighbors.

User client, 29, will probe each for the shortest route to the Internet.
29's current route to the Internet is: 29>19>18>27>26.

29 is now probing 19.
29's current route to the Internet is: 29>19>18>27>26.

29 is now probing 20.
29's current route to the Internet is: 29>19>18>27>26.

29 is now probing 30.
29's current route to the Internet is: 29>19>18>27>26.

29 is now probing 40.
29's current route to the Internet is: 29>19>18>27>26.

29 is now probing 39.
29's current route to the Internet is: 29>19>18>27>26.

29 is now probing 38.
29's current route to the Internet is: 29>19>18>27>26.

29 is now probing 28.
User client, 29, has probed its neighbor, user client, 28, and found a shorter path to the Internet.
The old routing table of Internet server, 26, is:
26(37(28(38(48(58))),47(57)),36(46(56)),35(45(55)),27(18(19(20(30(40(50(60)))),29(39(49(59))))),25,17(08(09(10)),07),16,15).

The updated routing table of Internet server, 26, is:
26(37(28(29(39(49(59))),38(48(58))),47(57)),36(46(56)),35(45(55)),27(18(19(20(30(40(50(60))))))),25,17(08(09(10)),07),16,15).

The route from user client, 29, to the Internet is: 29>28>37>26.
29's current route to the Internet is: 29>28>37>26.

29 is now probing 18.
29's final route is 29>28>37>26.

Fig. 2n

Traversing user client universe . . ..

User client, 44, has 8 user client neighbors.

User client, 44, will probe each for the shortest route to the Internet.
44's current route to the Internet is: 44>34>24>14.

44 is now probing 34.
44's current route to the Internet is: 44>34>24>14.

44 is now probing 35.
User client, 44, has probed its neighbor, user client, 35, and found a shorter path to the Internet.
The old routing table of Internet server, 14, is:
14(24(34(44(54))),23(32(41(51),42(52)),33(43(53))),13(22(31)),
05(06),04,03(02,12(01(11),21))).

The updated routing table of Internet server, 14, is:
14(24(34),23(32(41(51),42(52)),33(43(53))),13(22(31)),05(06),04,
03(02,12(01(11),21))).

The updated routing table of Internet server, 26, is:
26(37(38(39(40(50(60)),49(59)),48(58)),28(29(30)),47(57)),36(46
(56)),35(44(54),45(55)),27(18(19(20))),25,17(08(09(10)),07),16,15).

The route from user client, 44, to the Internet is: 44>35>26.
44's current route to the Internet is: 44>28>37>26.

44 is now probing . . .
.
.
.
44's final route is 44>35>26.

Fig. 2o

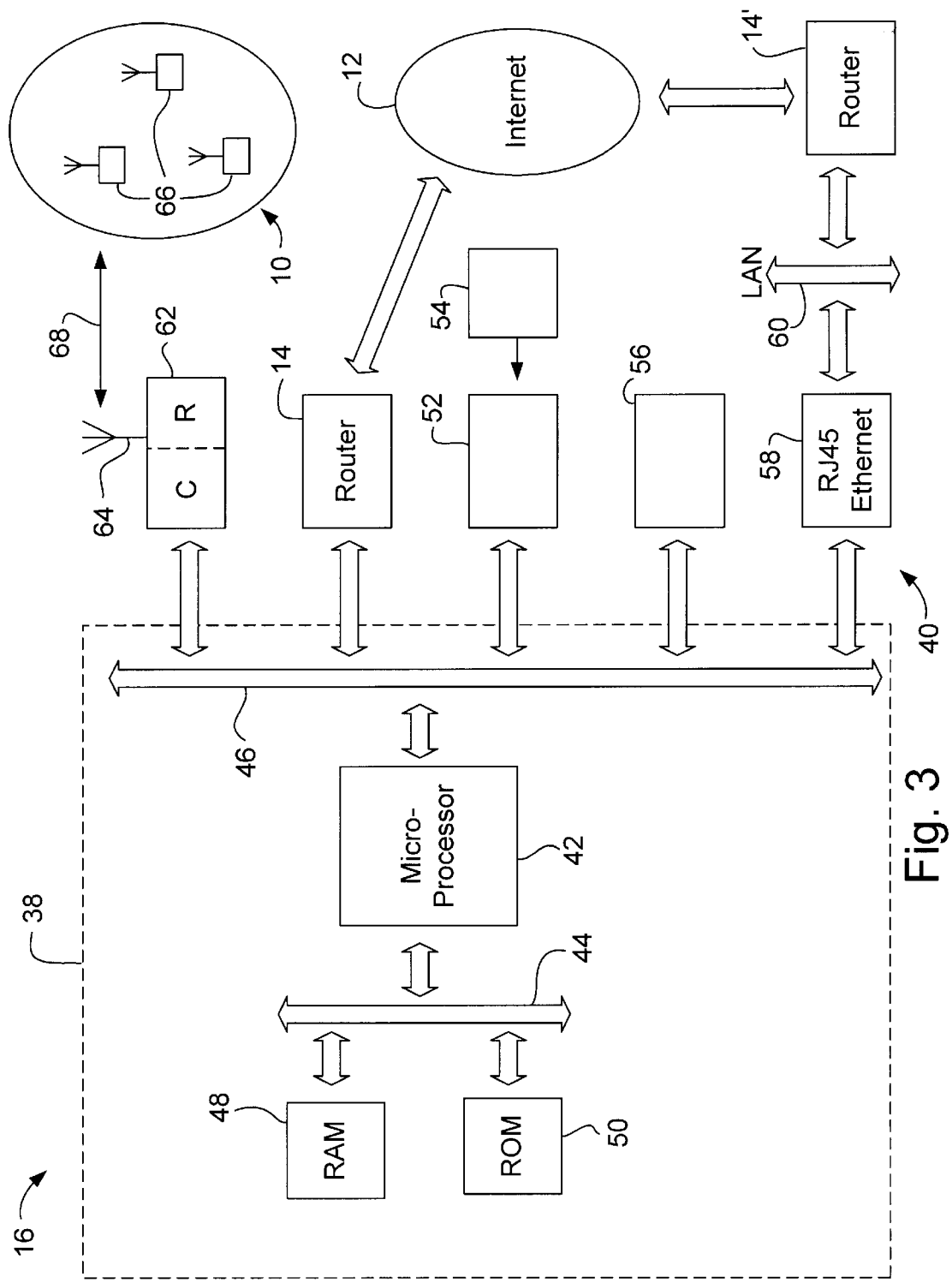

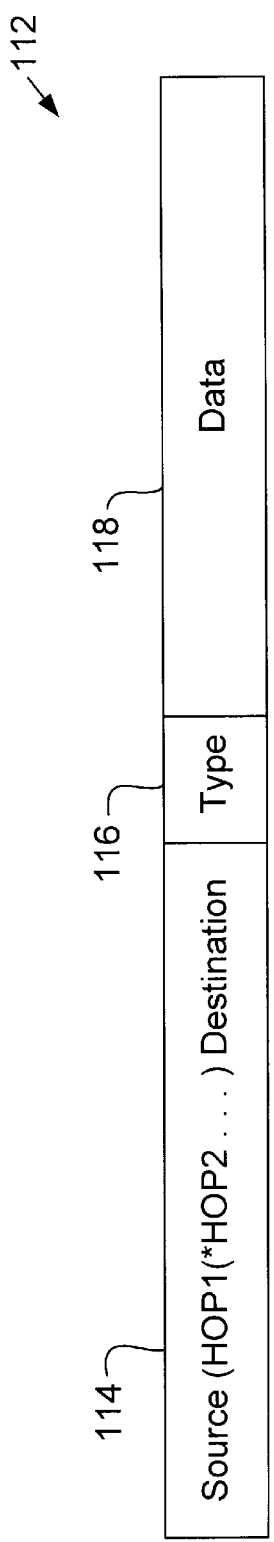
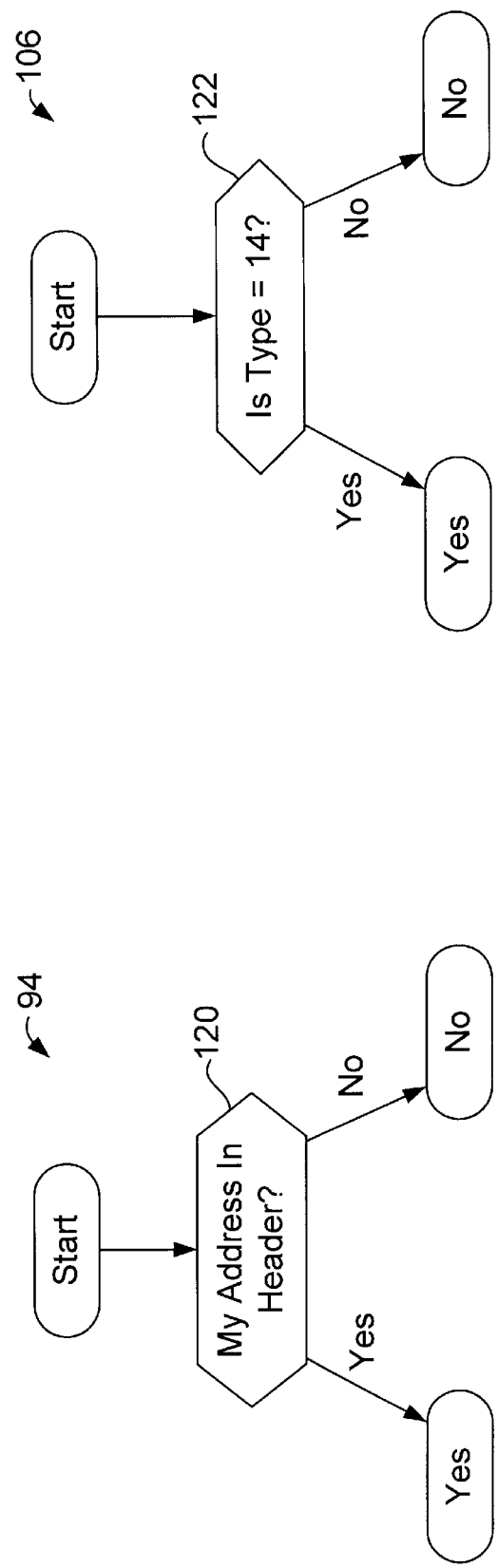
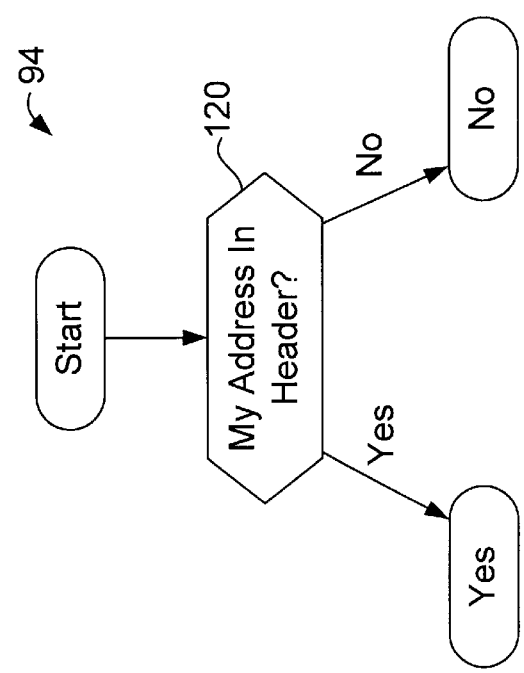
Fig. 5a
Fig. 5b
Fig. 5c

X(3(9,Z(8,5,Q(P))),B) ← 222

| Element | Node Name | Time Stamp | Memory Location Of Node |
|---------|-----------|------------|-------------------------|
| 1 | 3 | 1AFG | 12FG3 |
| 2 | P | E013 | 9AA22 |
| 3 | X | 99F6 | . |
| 4 | 5 | B999 | . |
| 5 | 8 | B999 | . |
| 6 | Q | . | . |
| 7 | 9 | . | . |
| 8 | B | . | . |
| 9 | Z | . | . |
| . | . | . | . |
| . | . | . | . |
| . | . | . | . |

↑224  ↑226  ↑228  ↑230

| Code Received | Server Response | Client Response |
|---|---|---|
| 01 | 02 + One-Way Seed | Drop |
| 02 | Drop | 05 + One-Way Response |
| 03 | Drop | 04 + Seed Or Null |
| 04 | Drop | 05 + One-Way Seed |
| 05 | If 02 And Authentic Then 06 Else Drop | If 04 And Authentic Then 06 Else Drop |
| 06 | Drop | If 05 Then 07 Else Drop |
| 07 | 08 | Drop |
| 08 | Drop | Update Tree Or Repeat Data |
| 09 | Drop | 10 |
| 10 | Drop | Update Tree Or Repeat Data |
| 11 | Drop | Send 11 To LEFTSON With Address of Departer Plus 01 to Reconnect |
| 12 | Reserved | Reserved |
| 13 | Delete Sender | Drops |
| 14 | Send To Network Transmit Buffer | Send To Computer Transmit Buffer |
| 86 | Reserved | Reserved |

WIRELESS NETWORK SYSTEM AND METHOD FOR PROVIDING SAME

TECHNICAL FIELD

This invention relates generally to digital computer networks, and more particularly to wireless digital networks for the transmission of digital data packets.

BACKGROUND ART

There are many kinds of networks that can be used to couple computers together for data communication. For example, a simple local area network (LAN), such as a Novell® network or an Appleshare® network, can be used to couple together the personal computers in an office. Often, one or more network "servers" or "hosts" will influence data flow within the network and access to certain network functions such as a central file repository, printer functions, Internet gateways, etc. Other local area networks operate on a peer-to-peer basis without the use of servers.

A wide area network (WAN) is sometimes referred to as a "network of networks." The Internet is a WAN that has, of late, become extremely popular. The origins of the Internet date back several decades to a government-sponsored military/business/research WAN that was designed to remain operational even in the event of a catastrophic loss of a large portion of the network. To accomplish this goal, robust protocols and systems were developed which allowed a geographically distributed collection of computer systems to be connected by means of a network that would remain operational even if large portions of the network were destroyed.

While the use of the Internet has been prevalent for many years now, its use has been limited by the arcane and often difficult commands required to access the various resources of the network. To address this problem, a protocol known as the "World Wide Web" or "WWW" was developed to provide an easier and more user-friendly interface to the Internet. With the World Wide Web, an entity having a domain name creates a "web page" or simply "page" which can provide information and, to an ever greater extent, some interactivity with the web page.

The Internet is based upon a transmission protocol known as "Transmission Control Protocol/Internet Protocol" (or "TCP/IP" for short), which sends packets of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based on Internet standards, and have become quite common for managing information and communication within an organization. Intranets, since they subscribe to Internet standards, can use the same web browser and web server software as used on the Internet. Intranets are, in many cases, supplementing or replacing traditional local area network protocols.

Most, if not all, of the data communication links between the various machines of most networks are hard-wired. That is, client machines are typically coupled to a server and to other client machines by wires (such as twisted-pair wires), coaxial cables, fiber optic cables, and the like. In some instances, some of the communication links can be wireless communication links, such as microwave links, radio frequency (r.f.) links, infrared links, etc., but this tends to be rare with most LANs.

The majority of so-called wireless networks use radio modems for data communication, although there are some IR networks available that work over very short distances, such as within a single large room. However, networks spanning larger areas will predominately use radio modems. GRE America, Inc. of Belmont, Calif. sells a number of spread-spectrum modems that can be used for the transmission of digitally encoded information. A number of wireless network services, such as Ricochet® network services (Ricochet is a subsidiary of Metcocom, Inc. of Los Gatos, Calif.) combine a radio modem with a portable personal computer to allow the personal computer to connect to the Internet. The Ricochet system operates by providing a large number of r.f. data transceivers within a given geographic area, that are often attached to telephone poles, and that are coupled to centralized server that serves as a gateway to the Internet.

The assumption made by the Ricochet system designers is that a given radio modem coupled to portable computer will be in radio contact with one, and only one, transceiver of the network. A data "packet" sent by the portable computer via the radio modem will be received by the transceiver and broadcast through the Ricochet network until it reaches a Wide Area Processor or WAP, where it is transmitted by twisted pair over the Internet to a Ricochet server connected to the Internet. Packets destined for a particular personal computer are received by the server of the Ricochet system, and are transmitted from each of the transceivers with the expectation that the radio modem of the destination portable computer will receive the data packets from one of those transceivers.

It should be noted that wireless communication systems such as the Ricochet system exhibit a number of drawbacks. For one, if the radio modem of the personal computer is not within transmission range of one of the transceivers of the Ricochet network, a connection cannot be made to the network. Furthermore, the Ricochet network can create a great deal of "packet duplication" or "pollution" as copies of a particular data packet are multiply repeated, rather than routed. This packet duplication can also occur if a radio modem of a particular personal computer in radio transmission range of two or more transceivers of the Ricochet network. In such an instance, the two or more transceivers can each receive the data packets, and each proliferates copies of the data packet across the Ricochet network. While duplicate packets are ultimately discarded, such duplicate packets increase data congestion in the network and increases the work that must be performed by the server. In addition, since data packets are transmitted from all the transceivers of the Ricochet network, there may be packet duplication at the personal computer if it is in contact with more than one transceiver of the Ricochet network, and the bandwidth available from each transceiver is reduced since each transceiver is transceiving each client-destined data packet on the network. Also, since the data is transmitted to the Internet over twisted pair, there is a 28.8K baud bottleneck in the system, resulting is average system performance of even less than 28.8K baud. It is therefore apparent that prior art wireless networks of the Ricochet network type lack robustness (i.e. the ability to maintain communication with the network under adverse conditions) and exhibit a number of inefficiencies such as data packet proliferation.

Cellular telephone systems operate using a number of transceivers, where each transceiver occupies a "cell." As a mobile telephone moves from one cell to another, an elaborate and expensive land-based system causes the mobile telephone to be "handed-off" from the cell that it was previously in to the cell that it is entering. As noted, the equipment and system used for the hand-off is expensive and, further, such hand-off sometimes fail, dropping the telephone connection. Furthermore, individual radios at a given cell can handle only one call at a time, which is inadequate for many computer network systems.

Amateur radio ("Ham") operators have developed a peer-to-peer digital repeater system referred to as the AX.25 protocol. With this protocol, each peer repeats all data packets that it receives, resulting in rapid packet proliferation. In fact, with this protocol, so many packet collisions occur among the peers that the packets may never reach the intended peer.

Lastly, there is abundant reporting in the literature, but it cannot be substantiated, that the U.S. Military has a wireless communication system which allows digital information to be transmitted in a more robust and efficient matter. More specifically, it is suspected that the U.S. Military has a system in which digital data can follow multiple paths to a server that may include one or more clients of the network. However, source code listings, or source code in machine-readable form for these U.S. military systems remains secret and unavailable to the public. Some of the literature pertaining to this U.S. military technology is summarized below.

"Packet Radios Provide Link for Distributed Survivable Command Control Communications in Post-Attack Scenarios", M. Frankel, *Microwave Systems News* 13:6 (June 1983), pp. 80–108, discusses the SURAN (Survivable Radio Network) project and its relation to overall command and control communications ($C^3$) development.

"Control Using Pacing in a Packet Radio Network", N. Goweer and J. Jubin, *Proceedings of Milcom* 82, (New York. IEEE Press, 1982), pp. 23.1–23.6, describes a technique for pacing flow control used in the DARPA packet radio project.

"Current Packet Radio Network Protocols", J. Jubin, *Proceedings of Infocom* 85 (New York: IEEE Press, 1985), pp. 86–92, is a systematic review of the various protocols currently used in the DARPA packet radio network. The article includes a discussion of pacing, route calculation, maintenance of route and connectivity tables, acknowledgment schemes, and other mechanisms. The article also provides a discussion on how the various protocols interrelate and reinforce each other.

"The Organization of Computer Resources into a Packet Radio Network", R. Kahn, *IEEE Transactions on Communications* COM-25:1 (January 1977), pp. 169–178, is a prospectus for the second generation of the DARPA radio project. This lead to the development of the DARPA Bay Area Packet Radio experimental work in the mid to late 1970's.

"Advances in Packet Radio Technology", R. Kahn, S. Gronemeyer, J. Burchfiel, R. Kunzelman, *Proceedings of the IEEE* 66z:11 (November 1978), pp. 1468–1496 is a survey of packet radio technology in the second generation of the DARPA packet radio project.

"Survivable Protocols for Large Scale Packet Radio Networks", G. Lauer, J. Westcott, J. Jubin, J. Tornow, *IEEE Global Telecommunications Conference,* 1984, held in Atlanta, Ga., November 1984 (New York: IEEE Press, 1984) p. 468–471, describes the SURAN network, with an emphasis on network organizations and management protocols.

"Multiple Control Stations in Packet Radio Networks", W. MacGregor, J. Westcott, M. Beeler, *Proceedings of Milcom* 82 (New York: IEEE Press, 1982) pp. 10.3–10.3-5, is a transitional paper that describes design considerations involved in converting the DARPA packet radio network from single to multistation operation while eliminating the additional step to a fully hierarchical design. It focuses on the self-organizing techniques that are necessary in the multistation environment.

"Future Directions in Packet Radio Technology", N. Shacham, J. Turnow, *Proceedings of IEEE Infocom* 85 (New York: IEEE Press, 1985), pp. 93–98, discusses new research areas in packet radio, with some references to SURAN developments.

"Issues in Distributed Routing for Mobile Packet Radio Networks", J. Westcott, *IEEE Global Telecommunications Conference,* 1982 (New York: IEEE Press, 1982), pp 233–238, studies the issues involved in the DARPA packet radio network, prior to the availability of signal strength sensing from the radio receivers as a hardware capability on which to build. The paper describes issues that must be considered in evaluating the usability of an RF link and gives details of the alternate route mechanism used in the DARPA system to smooth temporary RF propagation problems that appear in a mobile node environment.

"A Distributed Routing Design for a Broadcast Environment", J. Westcott, J. Jubin, *Proceedings of Milcom* 82 (New York: IEEE Press, 1982), pp. 10.4-1–10.4-5, is a detailed study of the problems involved in connectivity and routing table management in stationless packet radio, including a discussion of algorithms proposed for the DARPA packet radio network.

There is, therefore, a great deal of literature describing packet radio systems. The prior art does not disclose, however, a packet-based wireless computer network that is both robust and efficient, wherein each client of the network can be efficiently and effectively in communication with a multiplicity of other clients and servers of the network, greatly multiplying the number of link choices available and, if conditions change, or if a better link to a server becomes known to a client, where the link for a client can be updated and improved.

DISCLOSURE OF THE INVENTION

The present invention includes a wireless network system which is particularly well adapted for connection to a wide area network such as an Intranet or the Internet. The wireless network system includes one or more servers which are coupled to the wide area network, and two or more clients capable of communicating with the server or with each other via radio modems. The communication in the wireless network system preferably takes the form of digital data packets, which are not too dissimilar from the TCP/IP data packets used over the Internet. However, the data packets of the present invention also include data routing information concerning the path or "link" from the source of the packet to the destination of the packet within the wireless network. The data packets also include a code indicating the type of packet being sent.

In operation, a client of the wireless network system of the present invention has either a direct or an indirect path to a server of the wireless network system. When in direct communication with the server, the client is said to be "1 hop" from the server. If the client cannot reliably communicate directly with the server, the client will communicate with a "neighbor" client which has its own path ("link") to the server. Therefore, a client can communicate with the server along a link that includes one or more other clients. If a client communicates with the server through one other client, it is said to be "2 hops" from the server, if the client communicates to the server through a series of two other clients, it is said to be "3 hops" from the server, etc. The process of the present invention preferably includes an optimization process which minimizes the number of hops from the clients to the servers, on the theory that the fewer the number of hops, the better the performance of the network. Alternatively, the optimization process can also factor in traffic and transmission reliability of the various links to determine the optimal path to the server.

A wireless network system in accordance with the present invention includes at least one server having a server controller and a server radio modem, and a plurality of clients, each including a client controller and a client radio modem The server controller implements a server process that includes the controlling the server radio modem for the receipt and transmission of data packets from clients of the network. The client controller implements a client process including the transmission and receipt of data packets from the server and from other clients. Preferably, the client process of each of the clients initiates, selects, and maintains a radio transmission path ("link") to the server. As noted previously, this radio transmission path to the server is either a direct path to the server (1 hop) or an indirect path to the server (multi-hop) through one or more other clients. Preferably, the client process of a particular client also constantly searches for improved paths to the server.

A method for providing wireless network communication in accordance with the present invention includes providing a server implementing a server process, and providing a plurality of clients, each client implementing a client process. The server process includes receiving data packets via a server radio modem, sending data packets via the server radio modem, performing a "gateway" function to another network, and performing housekeeping functions. The client process includes the sending and receiving of data packets via a client radio modem, maintaining a send/receive data buffer in digital memory, and selecting links to the server. Again, the client process preferably chooses a "best" link to the server that is either a direct path or an indirect path through one or more other clients.

The server of the present invention provides a gateway between two networks, where at least one of the networks is a wireless network. The gateway function of the server makes any necessary translations in digital packets being sent from one network to the other network. The server includes a radio modem capable of communicating with a first, wireless network of the present invention, a network interface capable of communicating with the second network (which may or may not be wireless and, in fact, is preferably a wired TCP/IP protocol network), and a digital controller coupled to the radio modem and to the network interface. The digital controller passes data packets received from the first network that are destined for the second network to the second network, and passes data packets received from the second network that are destined for the first network to the first network, after performing any necessary translations to the data packets. The digital controller further maintains a map of the links of the first network and provides that map to first network clients on request. By maintaining a map of the first network links, the server is able to properly address packets received from either the first network or the second network to the appropriate client of the first network, and allows the client of the network to maintain and upgrade their data communication paths to the server.

A network client for a wireless communication network of the present invention includes a radio modem capable of communicating with at least one server and at least one additional client, and a digital controller coupled to the radio modem to control the sending and receiving of data packets. The digital controller is further operative to determine an optimal path to at least one server of the wireless network. The optimal path can be either a direct path to the server, or an indirect path to the server through at least one additional client.

The method, apparatus, and systems of the present invention therefore provide a wireless network that is both robust and efficient. Since each client of the network can potentially be in communication with a multiplicity of other clients and servers of the network, there are a great number of link choices available. If conditions change, or if a better link becomes known to a client, the link can be updated and improved.

These and other advantages of the present invention will become apparent upon reading the following detailed descriptions and studying the various figures of the drawings.

BRIEF DESCRIPTION OF THE DRAWINGS

FIGS. 2a–2g, 2h'–2h", and 2i–2o are used to describe a prototype of the wireless network system of FIG. 1, illustrating both the path connection and path optimization processes of the present invention;

FIG. 3 is a block diagram of a server, router, the first wireless network, and the second network of FIG. 1;

FIG. 5a illustrates a data packet processed by the process illustrated in FIG. 5;

FIG. 5b is a flow diagram illustrating the process "Am I on Route?" of FIG. 5;

FIG. 5c is a flow diagram illustrating the process "Data?" of FIG. 5;

FIG. 19 is used to illustrate the "Process Per Type Code" of FIG. 18;

FIGS. 21a–21d illustrate the process of FIG. 20.

BEST MODES FOR CARRYING OUT THE INVENTION

Figure 1:
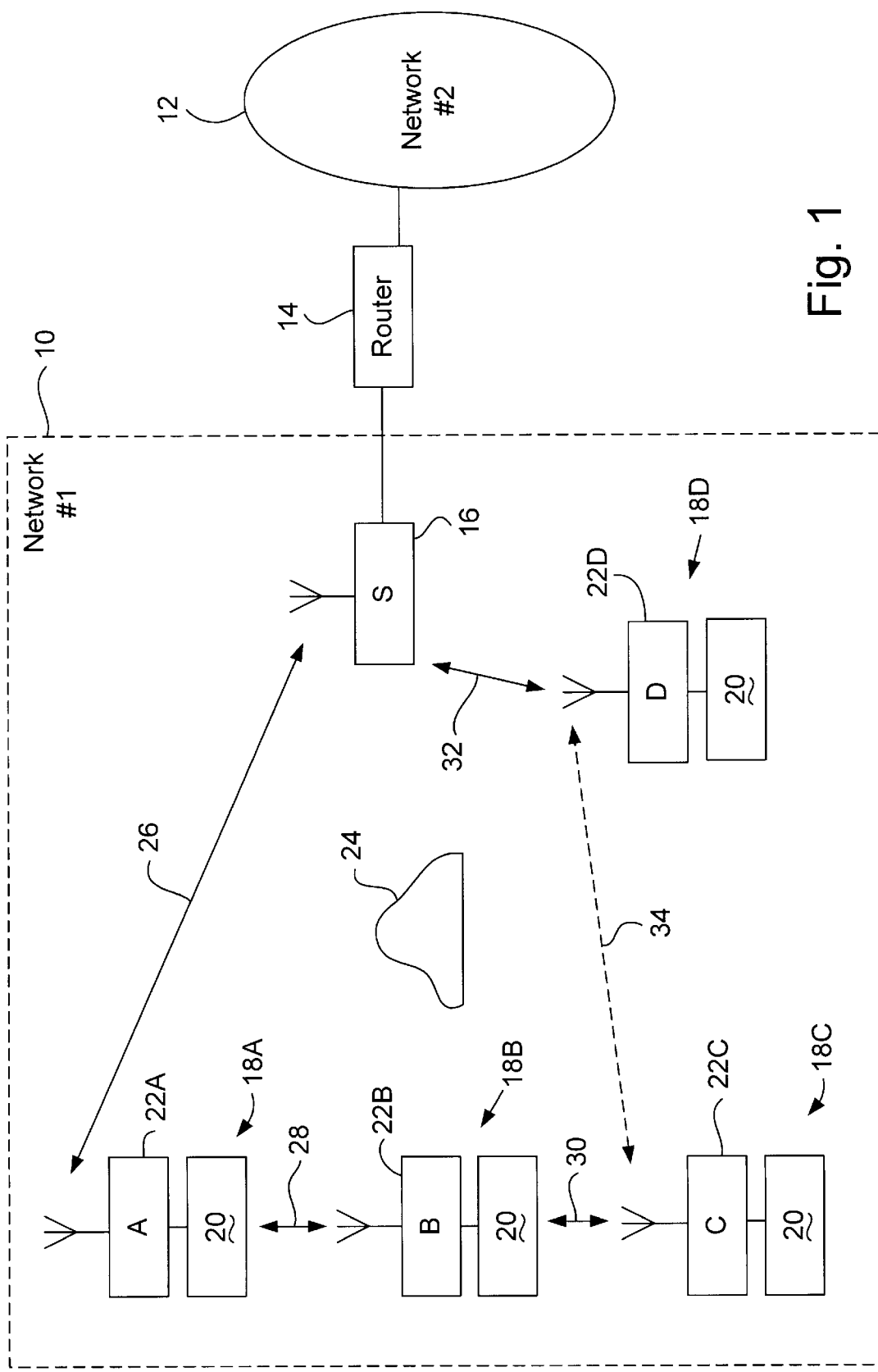
FIG. 1 is a pictorial representation of a wireless network system in accordance with the present invention.

FIG. 1 illustrates a wireless network system 10 in accordance with the present invention. The wireless network system 10, which will also be referred to herein as a "first network," is preferably in communication with a second network 12 via a digital communication bridge or router 14. The construction and operation of networks, such as second network 12, and bridges or routers, such as router 14, are well-known to those skilled in the art. It the present invention, it is preferred that the second network operates on the aforementioned TCP/IP protocols, i.e. the second network is the Internet or is a private Intranet. At times, herein, the second network will be referred to as simply the Internet, it being understood that other forms of a second network are also operable with the systems, apparatus, and processes of the present invention. Again, the construction and operation of the Internet and Intranets are well-known to those skilled in the art. Likewise, routers, bridges, and other network devices such as hubs, gateways and Ethernet interfaces are well-known to those skilled in the art, and are available from a variety of sources including Cisco Systems, 3-Com, Farillon, Asante, etc. In general, as a "network interface" will refer to any such device that allows a server of the wireless network system of the present invention to communicate, directly or indirectly, with the second network.

The wireless network system 10 of the present invention includes one or more servers 16, the single example of which is herein labeled S. It should be noted that the server 16 serves as a gateway in that it performs a translation service between the first network and the second network. For example, the data packets on the first network include links and data types that are only applicable to the first network. Therefore, such links and data types are removed from the data packets before they are transmitted to the second network which, as noted previously, preferably operates on a TCP/IP protocol. Conversely, data packets received from the second network are modified to include the links and data types before they are transmitted to the first network. Therefore, the data packets on the first or wireless network can be essentially "packages" or "envelopes" for TCP/IP data packets when they are destined for the Internet or received from the Internet. However, as will be discussed in greater detail subsequently, the data packets of the first network can be of types other than "data" types for TCP/IP formatted data. It should also be noted that while only a single server S is shown in this example that, in most cases, multiple servers, each with their own gateway to the Internet, will be used in the first network.

The wireless network system 10 further includes a number of clients 18, each including a client machine 20 and a radio modem 22. The client machine 20 can be any form of digital processor, including a personal computer (PC), a computer workstation, a personal digital assistant (PDA), etc. In the present invention, the client machine 20 is preferably a personal computer (PC) made to the Microsoft Windows/Intel microprocessor ("Wintel") standard, or to the Apple Macintosh standard. Wintel and Macintosh compatible computers are commercially available from a variety of vendors. Likewise, computer workstations and PDAs are available from a number of vendors. Radio modems, such as the radio modem 22, are further available from a number of vendors. The present invention has been implemented using radio modems produced by GRE America, Inc. which operate on a spread spectrum technology, and which provide good receiver sensitivity and repeater capabilities. These GRE America, Inc. radio modems are commercially available under the Gína trademark and operate in the 2.4 gigahertz or 90 megahertz bands with support for packetized data transmission. The Gína brand radio modems further include error detection and correction, can operate in asynchronous or synchronous modes, and can support data speed from 300 to 64 kbps. Furthermore, the Gína radio modems can operate in a point-to-point or a point-to-multipoint mode.

A server process, to be discussed in greater detail subsequently, is implemented on the server 16, and a client process, also to be discussed in detail subsequently, operates on each of the clients 18. In the present invention, the client process operates, at least in part, on the client machine 20. However, in alternative embodiment of the present invention, the client process can operate on the controller of the radio modem 22 of the client 18.

In wireless network system 10 illustrated in FIG. 1, the client 18A is in "direct" radio communication with the server 16 as indicated by the radio communication link 26. This will be referred to herein as "direct" or "1 hop" or "line-of-sight" connection with the server 16. The client 18B, however, does not have a direct path or "link" to the server 16 due to an obstacle 24, such as a hill, large building, etc. Therefore, the client 18B communicates via a radio link 28 with client 22A which relays the data packets from client 18B to the server 16. A client 18C has a direct line-of-sight to the server 16, but is out of transmission range to the server 16. Therefore, the client 18C transmits its data packet by a radio link 30 to client 18B, from where it is relayed to client 18A via link 28, for eventual relay to the server S via radio link 26.

As noted in FIG. 1, 18D is in direct communication with server 16 via radio communication link 32. If client 18C detects the transmissions of client 18D, it will note that client 18D has less "hops" to the server 16 than does client 18B, and will switch its link from client 18B to client 18D. This process is a part of the "stabilization" or "optimization" process of the network 10.

It will therefore be appreciated that the wireless network system 10 of the present invention is constantly attempting to optimize itself for the "best" data transmission. In the embodiment described herein, this optimization looks solely to the number of hops between the client and the server for the sake of simplicity. However, other factors can also affect the quality of the data transmission. For example, the traffic of data packets through a particular client modem may be large, such that it is better to route the data from neighboring clients through other clients, even though there may be more hops involved with this alternative routing. Also, some radio links may be less robust or may be slower than other links, such that optimization may result in a routing of data around the less robust or slower links, even though it may increase the number of hops to the server 16. Therefore, although the present preferred embodiment looks at only one single factor in its optimization processes, it will be appreciated by those skilled in the art that multiple factors can be used to stabilize or optimize the wireless network system 10 of the present invention.

It should also be noted that the wireless network system 10 of the present invention is quite robust in that it will survive the loss of one or more clients of the system. For example, if the client 18A is lost due, for example, to a power or system failure, the data packets for client 18C can be routed through the client 18D, and the data packets for the client 18B can be routed through clients 18C. Therefore, the wireless network system 10 is highly robust and highly survivable under a number of adverse conditions.

In addition, the present invention permits mobile communication within the wireless network system 10. For example, if the client 18D is a portable computer and is moved around within the wireless network system 10, it will opportunistically change its data communication path as better links become available. For example, if the client 18D is moved close to the client 18B, it may use the client 18B as its link to the server 16. Also, any routing through the client 18D from other clients (such as 18C in this example) will be updated and optimized as the data path for the client 18D changes.

It should be noted that, in general, the network will work the best and will be the most stable if the radio modems and their client/controllers are never turned off. It is therefore desirable to not have an on/off switch on the radio modem, so that clients are always participating in the network traffic distribution. However, even if a radio modem is turned off, the remaining clients will re-route through other clients, as will be discussed subsequently.

Figure 1B:
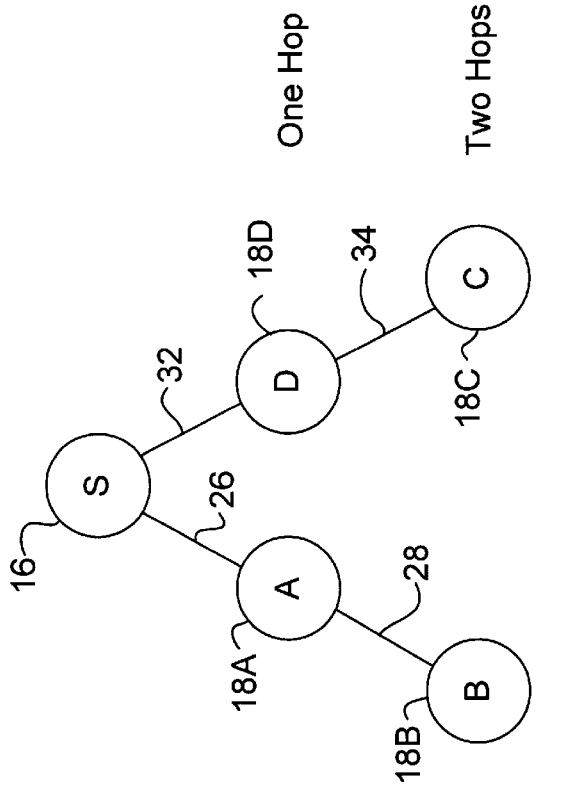
FIG. 1b illustrates a second tree structure illustrating optimized or "stabilized" data communication paths for the wireless network system of FIG. 1.
Figure 1A:
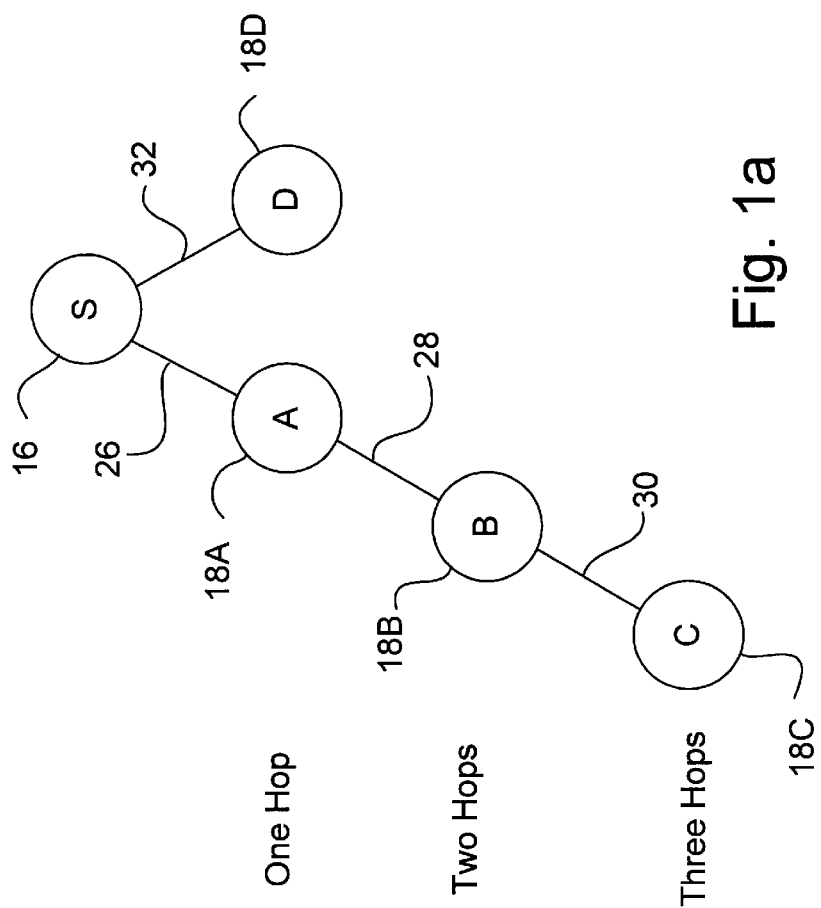
FIG. 1a illustrates a first tree structure of the data communication paths or "links" of the wireless network system of FIG. 1.

In FIGS. 1a and 1B, two "tree" structures are shown illustrating the various links that were discussed, by way of example, with reference to FIG. 1. The tree structure is maintained in the server S, and is transmitted to any client that may request it.

In FIG. 1a, a tree indicates that client 18A is linked to server 16 by a link 26, client 18B is linked by link 28 to client 18A and by link 26 to the server, and client 18C is linked by line 30 to client 18B, by link 28 to client 18A, and by line 26 to the server 16. The client 18D is in direct communication with the server 16 via radio link 32. Therefore, clients 18A and 18D are both "1 hop" away from the server 16, client 18B is "2 hops" away from server 16, and client 18C is "3 hops" away from server 16.

In the scenario where client 18C realizes it has a better connection to server 16 through the client 18D, the link 30 to client 18B is no longer used, and a new radio link 34 to client 18D is established. This is illustrated in FIG. 1b. Now, clients 18A and 18B remain 1 hop clients, clients 18B remains a 2 hop client, but client 18C is upgraded from a 3 hop client to a 2 hop client. Therefore, the data transmission efficiency of the network has been "stabilized" or "optimized."

It should be noted that the term "link" is used to convey both the connection to an adjacent client as well as the entire path from a client to a server. It will therefore be understood that when speaking of a link to an adjacent client, that this also implicitly includes all necessary links from that adjacent client to the server, i.e. a link is the entire path description from a given client to a given server.

FIGS. 2a–2o, an exemplary wireless point-to-multipoint network in accordance with the present invention is prototyped to facilitate a discussion of the theory and operation of the present invention. In FIG. 2a, a network 36 with 60 potential "nodes" is illustrated. As used herein, a "node" can either be a client or a server. The nodes 14 and 16 have been arbitrarily selected as servers for the purpose of this example. The nodes 14 and 16 are marking servers with the large, black dot immediately adjacent to those numerals. For the purpose of this example, it is assumed that a node can only communicate with an immediately adjacent node. Of course, in actual operation, nodes may be able to communicate with more distant nodes than its immediate neighbor nodes.

FIG. FIG. 2b, a first client is designated at node 05 (hereafter "client 5"). For the purposes of this example, the Yen or "¥" symbol is positioned next to the client 5. As noted previously, for the purpose of this example, we will assume that any particular node is only in radio communication range of a node that is adjacent in a horizontal, vertical, or diagonal direction, i.e. is an immediately adjacent "neighbor." In this instance, client 5 detects that there is a radio contact with node 14, which is a server (hereafter "server 14"). The server 14 and the client 5 will build a routing path or "link" between each other. This is accomplished by client 5 transmitting a "I Am Alive" packet seeking a route to a server. The server 14, being within radio transmission range, will respond and will add the client 5 to its routing table as its "left son." The meanings of the "routing table" and the "left son" will be described subsequently. The routing table of the server 14 is therefore 14(05), and the route from the client 5 to the server 14 is 05>14. Again, this notation will be discussed in greater detail subsequently.

The network 36 then has a second client 6 added as indicated by the ¥ symbol next to node 6 in FIG. 2c. Second client 6 makes radio contact with client 5 and builds a routing path or "link" to the server 14 through the client 5. Server 14 updates its routing table accordingly. This is accomplished by client 6 issuing an "I Am Alive" packet seeking a client repeater route to a server. Client 5 will respond and add client 6 to its routing table as its left son. The updated routing table of the server 14 is therefore: 14(05(06)). The route from the user client node 6 to the server 14 is: 06>05>14.

In FIG. 2d, a third client 7 is added to the network 36 as indicated by the "¥" symbol next to node 07. Client 7 establishes contact with client 6 and finds a path through clients 6 and 5 to server 14. This is accomplished by client 7 issuing a "I Am Alive" packet seeking a client repeater route to the server 14. Client 6 will respond and add client 7 to its routing table as its left son. The updated routing table of the server 14 is then: 14(05(06(07))). The route from client 7 to the server 14 is: 07>06>05>14.

In FIG. 2e, another client 16 has been added at node 16 as indicated by the "¥" symbol. It should be noted that client 16 can make radio contact with clients 05, 06, and 07. However, client 16 recognizes node 26 as being a server (hereafter "server 26") and then connects directly to server 26. This is accomplished by client 16 transmitting a "I Am Alive" packet seeking a route to a server. The server 26 will respond and will add client 16 to its routing table as its left son. The updated routing table of server 26 is then: 26(16). The routing from client 16 to the server 26 is 16>26.

In FIG. 2f, a server routing table and a route for each client thus far in the example are illustrated. It should be noted that when client 16 came into existence, a shorter route was created for client 7 to a server, namely via client 16 to server 26. As noted in this figure, client 7 has made the adjustment to connect to server 26, thereby "stabilizing" or "optimizing" the network 26. Also, it should be noted that server 14 has deleted client 7 from its routing table, since client 7 is now using server 26 as its gateway to the Internet. This creates a universe of six nodes, of which are two are servers and of which are four are clients. The average "hop" distance from a client to a server is 1.5 hops. The remainder FIGS. 26g–26o further illustrate these concepts.

In FIG. 26g, the network 36 illustrates an extreme example where 58 clients are connected to the two servers 14 and 26. FIGS. 2h' and 2h" show a fully "stabilized" or "optimized" network where the path or "link" from any client to a server is as short as possible, i.e. where there is few "hops" as possible. It should be noted that the optimization occurs dynamically during operation and without complex algorithms and look-up tables. As will be discussed in greater detail subsequently, the optimization occurs when clients "hear" transmission from other clients that have a better (i.e. shorter) path to a server.

FIG. 2h' shows the network as seen from the point of view of servers 14 and 26 and from the point of views of clients 1–client 31. In FIG. 2h", the network as seen from the point of view of clients 32–60, along with statistics for the overall network, are shown. In brief, in a universe of 60 nodes, of which are two are servers and 58 are clients, the average hop distance from a client to a server is 2.36206897 hops.

In FIG. 2i, the process of adding a new client 9 to the server is illustrated. The first time that client 9 came "alive" (i.e. became operational) it took five tries before node 9 found a client neighbor with the path to the server. The reason that it may take many tries to find a connection path is that multiple neighbors of client 9 are responding to client 09 "I Am Alive" message via CSMA/CD (Carrier Sent Multiple Access/Collision Detection) protocol. The likelihood that any particular neighbor of client 9 will respond first is, essentially, random. Once client 09 hear from a neighbor that it does not have a path to a server, client 9 tells that neighbor not to respond to the next "I Am Alive" announcement from client 9. In consequence, client 9 keeps trying to find a path to the server until it succeeds. However, that path may not be the shortest path. In this example, the client 9 finds a path to the Internet server, resulting in the updating of the routing table for the Internet server 14 as 14(05(06(07(08(09)))),04,03). The route or "link" from client 9 to the server is: 09>08>07>06>05>14.

In FIG. 2j, a client 29 is finding a route to the server via one of its neighbors. It finds a route through client 19, and is added to the routing table of client 19 as its left son. The routing table of server 14 is also updated, and the route from user client 29 to the server is determined. However, this route is not an optimal route in that it includes a greater number of hops than necessary.

In FIG. 2k, the "stabilization" or "optimization" process is illustrated. It was previously noted that the client 29 has a non-optimal path to its server. In order to improve this path, client 29 will receive "help" from its neighbors starting with client 7. Client 7 currently has a route to server 14. Client 7 starts randomly probing its neighbors looking for a shorter route to a server. Client 7 finds a shorter route to client 26. Client 7 informs server 14 to drop client 7 from server 14's routing table, and client 7 informs server 26 to add client 7 to its routing table. Since client 29 was "downstream" from client 07, client 29 dynamically becomes switched to a route to server 26.

In FIG. 2l, this process is repeated for client 08. Notably, client 8 shortens its route to server 26 by 1 hop. Client 9 cannot improve its route to server 26.

In FIG. 2m, client 18 shortens its route to server 27 to 2 hops. This is despite the fact that the route through clients 07 and 08 are a relatively efficient 3 hop links.

In FIG. 2n, client 29 is optimizing its path. Client 29 eliminates 18 from its route by "leap frogging" past client 18 with the result of the shortest possible 3 hop route to a server. Ultimately, therefore, client 29 route has improved from a 7 hop path through server 14 to the shortest possible 3 hop path to server 26. This result is dynamically accomplished with the efficiencies of client 7, 8, and 18 also improving, and without the need for complex routing algorithms.

In FIG. 2o, another example of individual dynamic routing is illustrated for client 44. This client node shortens its route from 3 to 2 hops by switching server destinations. Client 44 drops out of the server 14's routing table and gets added to server 26's routing table.

The advantage of prototyping the system as explained in FIGS. 2a–2o is that further optimizations become apparent. For example, if a great deal of network traffic is going through a particular node, it may be desirable to place a "passive repeater" at that node. A passive repeater is not a client, per se, but, rather, is a transceiver that receives and rebroadcasts packets. The passive repeater therefore effectively extends the range of the transmitting clients, and reduces data bottlenecks in the system. A passive repeater is also useful for clients with long links to a server in that it can shorten the link by effectively allowing the clients to skip some intermediate links. The prototyping of the system is also useful in that it shows that placing servers near the center of the network reduces the average link length (i.e. reduces the average number of client hops) in the network.

In FIG. 3, a block diagram of the server 16 of FIG. 1 is illustrated. In this instance, the server 16 includes a computer system 28 and a number of peripherals coupled to the computer system. The computer system 38 can be a personal computer system, a computer workstation, or a custom data processor capable of implementing the processes of the present invention.

By way of example, the computer system 38 includes a microprocessor 44 that is coupled to a memory bus 44 and to an input/output (I/O) bus 46. Typically also coupled to the memory bus 44 are random access memory (RAM) 48 and read only memory (ROM) 50. The RAM 48 is usually volatile (i.e. its contents are lost when power is removed) and is used for temporarily or "scratch pad" memory. The ROM 50 is non-volatile (i.e. its contents are not lost when power is removed), and typically includes the start-up instructions for the computer system 38. A number of peripherals are typically coupled to the I/O bus 46. For example, a removable media drive 52 for a removable media 54 (such as a floppy disk, a Zip® disk, or a C/D ROM) is typically coupled to the I/O bus 46, as is a fixed or hard disk 56. Furthermore, a router 14 or bridge can be used to couple the I/O bus 46 to the Internet 12 as previously described. In addition, an RJ45 Ethernet interface 58 can be used to couple the computer system 38 to a local area network 60 and from there to the Internet 12 by a router 14', or the like. Also, a radio modem 62 (including a control section C, a radio section R, and an antenna 64 coupled to the radio section R) can be coupled to the I/O bus 46. The radio modem 62 can communicate with the network 10 including a number of nodes 66 by a wireless transmission or "radio link 68." The assembly of the hardware of the server illustrate in FIG. 3 will be apparent to those skilled in the art.

Figure 4:
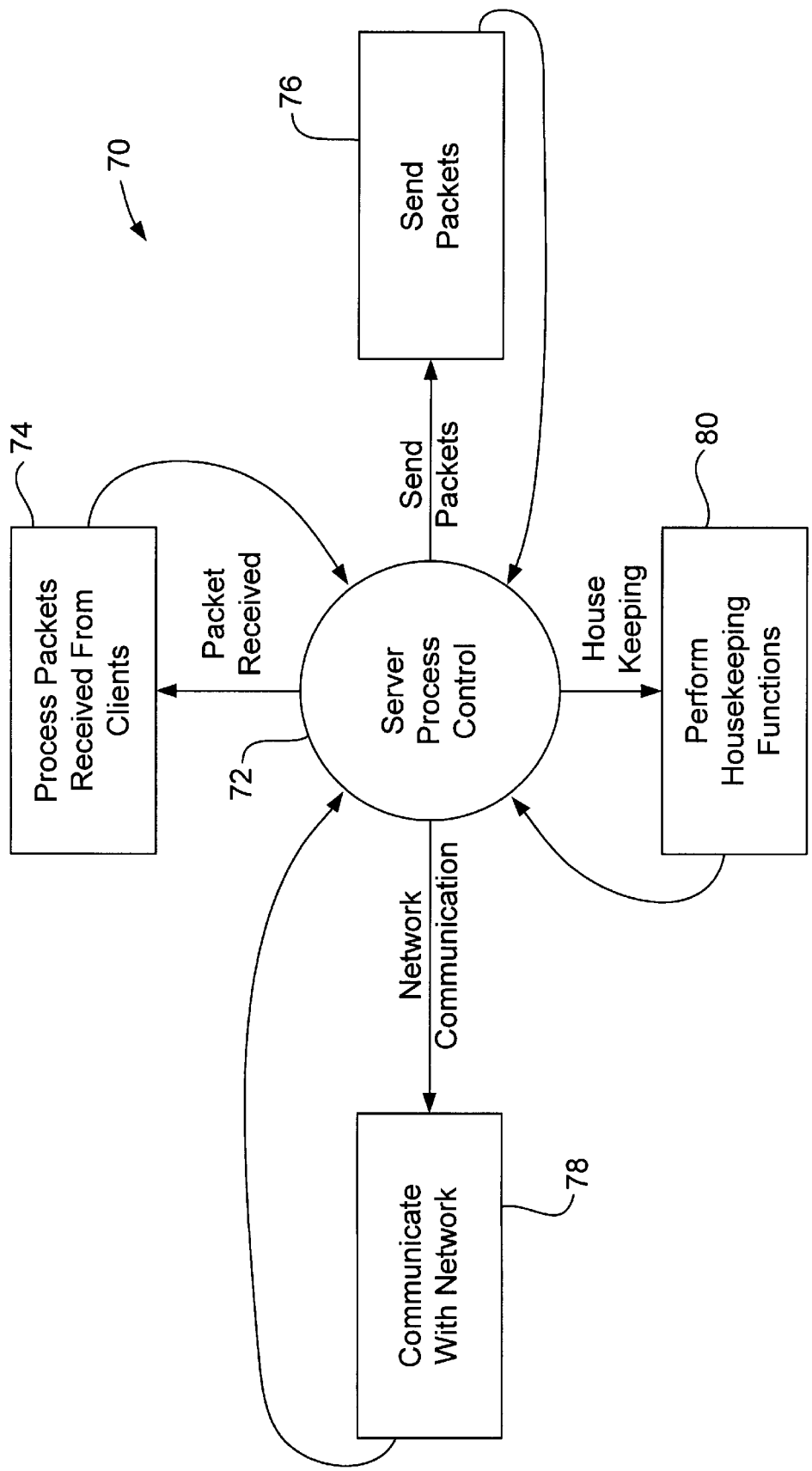
FIG. 4 is a flow diagram of a server process of the present invention operating on the server of FIG. 3.

In FIG. 4, a server process 70 of the present invention is implemented on the server 16. More particularly, the server process 70 can be implemented on computer system 38, within the control section of the radio modem 62, or partially in both of those places. In the present preferred embodiment, the majority of the server process 70 is implemented on the computer system 38. However, it should be noted that the control section C of the radio modem 62 includes a microprocessor and memory and, with proper program instructions, can be made to implement the process 70 of FIG. 4, freeing the personal computer 38 for other tasks.

The server process 70 includes a server process control 72 and four subprocesses. More particularly, the subprocesses include a process 74 which processes received from clients, a process 76 which sends packets, a process 78 which communicates with the network, and a process 80 which performs housekeeping functions. Each of these processes will be discussed in greater detail subsequently.

Figure 5:
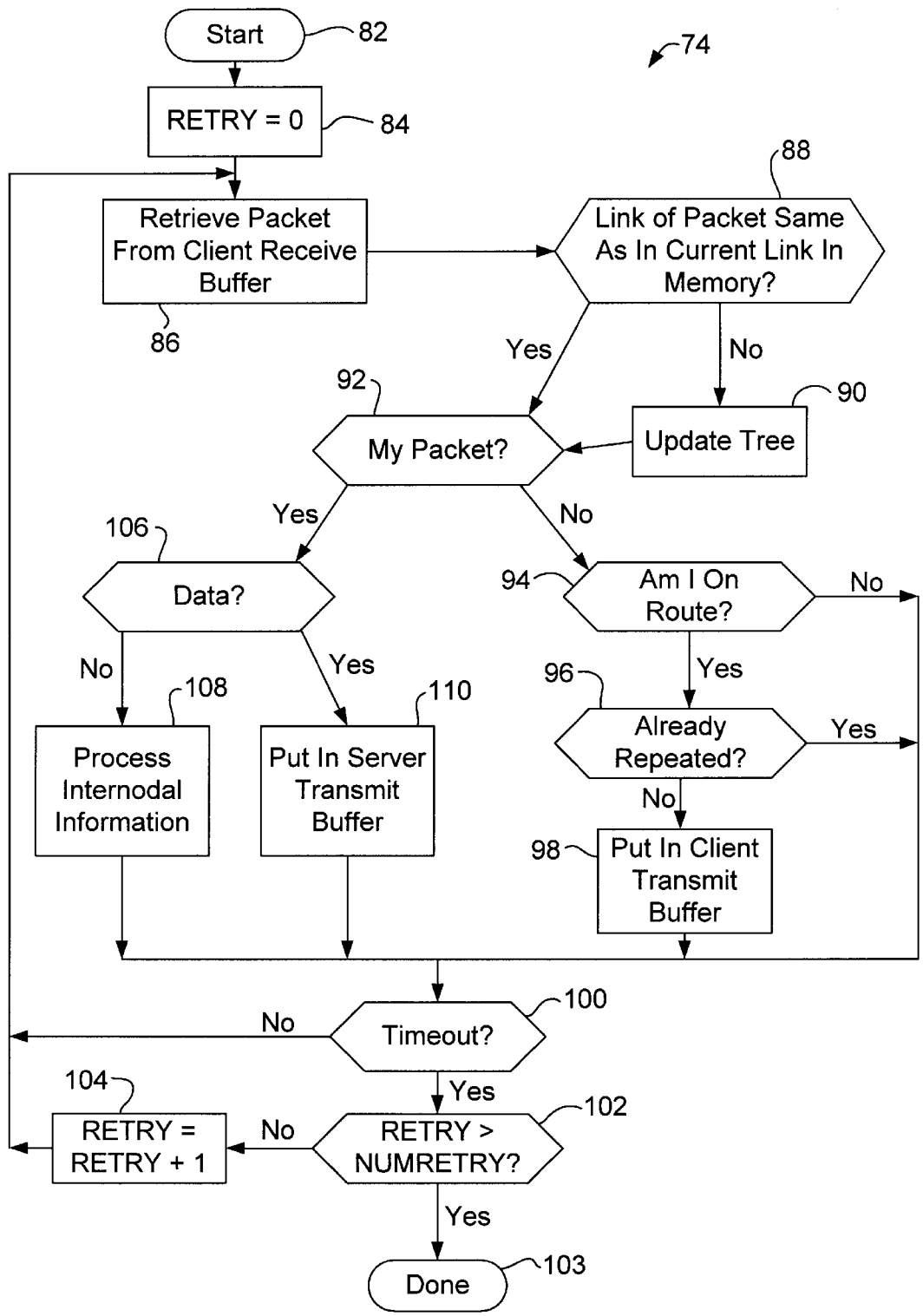
FIG. 5 is a flow diagram of the "Process Packets Received From Client" step of FIG. 4.

In FIG. 5, the process "Process Packets Received From Clients" 74 of FIG. 4 is illustrated in greater detail. The process 74 begins at 82, and in a step 84, the variable RETRY is set to 0. Next, a step 86 retrieves a packet from the client receive buffer, and a decision step 88 determines whether the path or "link" of the packet is same as the currently stored link in memory. If not, a step 90 updates the tree. If so, or after the updating of the tree in step 90, a decision step 92 determines whether it is "My Packet?" In other words, step 92 determines whether the packet being received by the server was intended for that server. If not, a decision step 94 determines whether that server is on the route. If that server is on the route, but it is not its packet, a decision step 96 determines whether the packet has already been repeated. If not, the packet is placed in the client transmit buffer. If decision step 94 determines that the server is not on the route, or the packet has already been repeated, or upon the completion of step 98, a decision step 100 looks for time-out. The time-out is provided by the server process control 72 such that the computer hardware resources on which process 70 are implemented can be shared among the four processes. More particularly, in most instances, the computer hardware resources are shared among the subprocesses 74–78 in a "round-robin" fashion well-known to those skilled in the art However, it should be noted that at times the strict round-robin scheduling is not adhered to, as will be discussed subsequently.

If step 100 determines that a time-out has occurred, the decision step 102 determines whether the retry number RETRY is greater than the number of retries allowed, namely NUMRETRY. In its preferred embodiment, the number of retries RETRY are set at, perhaps, 2 or 3 so that the server does not tie up its resources with endless retries of the process. If RETRY is greater than NUMRETRY, the process is completed as indicated at 103. Otherwise, a step 104 increments RETRY by 1. In the absence of a time-out and in the absence of the number of retries being used up, process control returns to step 86.

If step 92 determines that the packet is for that server, a step 106 determines whether the packet is a data type. If not, a step 108 processes "internodal information." If so, a step 110 places the data in a server transmit buffer. After the completion of steps 108 or 110, process control is returned to step 100 to determine if there is a time-out.

In FIG. 5a, a "data packet" 112 in accordance with the present invention is illustrated. As it will be appreciated by those skilled in the art, a data packet is an associated string of digital information that is transferred and processed as a unit. The data packet 112 of the present invention includes a header 114, a type 116, and data 118. The data 118 can be standard TCP/IP data. The header 114 includes the source address, the address of all hops along the way (i.e. the "link" of the data packet), and the destination address. Hops (i.e. clients and servers) that already have been traversed (i.e. have already forwarded the data packet) are indicated with an asterisk ("*") symbol. The type 116 is, in this implementation, a two digit code indicating the type of the data packet 112, as will be discussed in greater detail subsequently. The data section 118 of the data packet 112 includes the data associated with that packet. In the present invention, the data section is in the range of 128–1024 bytes in length.

In FIGS. 5b and 5c, respectively, the decision steps 94 and 106, respectively are illustrated with respect to the data packet architecture of FIG. 5a. The decision step 94 ("Am I On Route?") of FIG. 5 is simply determined by the process 120 "My Address In the Header?" If yes, the process of FIG. 5 branches to step 96, and if no, the process of FIG. 5 branches to step 100. In FIG. 5c, the decision step 106 "Data?" simplifies to a process 122 "Is the Type Equal to 14?" This is because, in the present invention, a type 14 has been arbitrarily chosen to indicates a data type. If yes, the process of FIG. 5 branches to step 100, and if no, the process of FIG. 5 branches to step 108.

Figure 6:
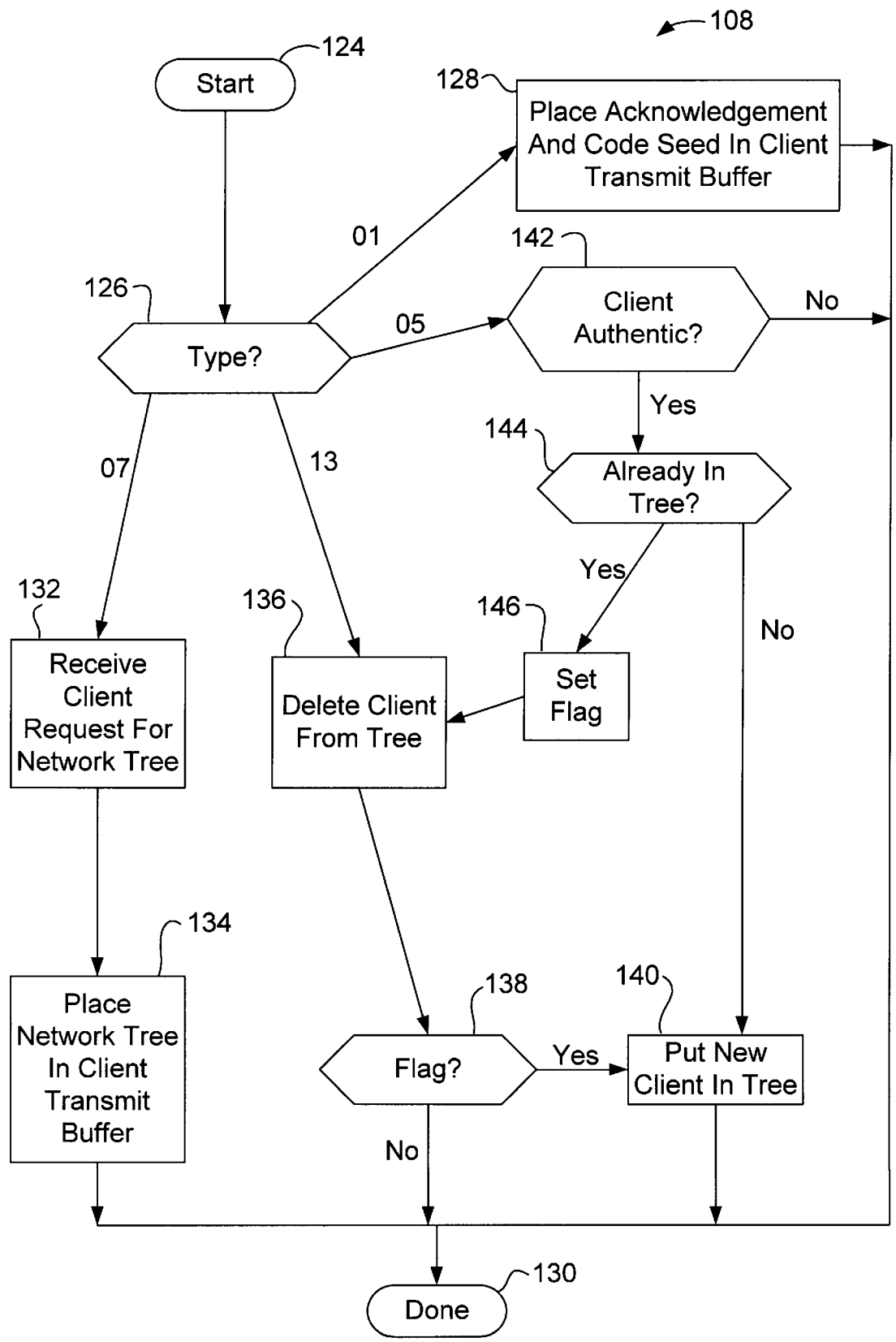
FIG. 6 is a flow diagram illustrating the "Process Internodal Information" process of FIG. 5.

In FIG. 6, the step 108 "Process Internodal Information" of FIG. 5 is explained in greater detail. The process 108 begins at 124 and, in a multi-branch decision step 126, the type of the data packet is determined. If the type is a "01", a step 128 places an acknowledgment and a "code seed" in the client transmit buffer, and the process is completed at 130. Acknowledgments and "code seeds" will be discussed subsequently. If the type is a "07", a step 132 receives the client request for the network tree, and the process places the network tree in the client transmit buffer in a step 134. The process is then completed at 130. If, however, the type is "13", a step 136 deletes the client from the tree and a step 138 determines whether a flag has been set. If not, the process is completed at 130. If, the flag has been set as determined by step 138, a step 140 puts a new client in the tree and the process is then completed at 130.

If decision step 126 determines that the type is "05", a step 142 determines whether the client is authentic. The authentication process, which will be discussed subsequently, keeps unauthorized clients from being added to the network. If the client is not authentic, the process is completed at 130 and the client is not allowed to connect to the server. If step 142 determines that the client is authentic, a step 144 determines whether the client is already in the server tree. If yes, the flag is set in a step 146 and process is control is turned over to step 136 to delete the client from the tree. Since the flag has been set, step 138 branches the process control to step 140 and the new client is placed in the tree, after which the process is completed at 130.

The addition and removal of nodes from trees are well known to those skilled in the art. For example, in the book, incorporated herein by reference, *SNOBOL 4: Techniques* and *Applications*, by Ralph E. Griswald, Department of Computer Science, University of Arizona, Prentiss-Hall, Inc., © 1975, ISBN 0-13-853010-6, algorithms for placing and removing clients from trees are discussed.

Figure 6A:
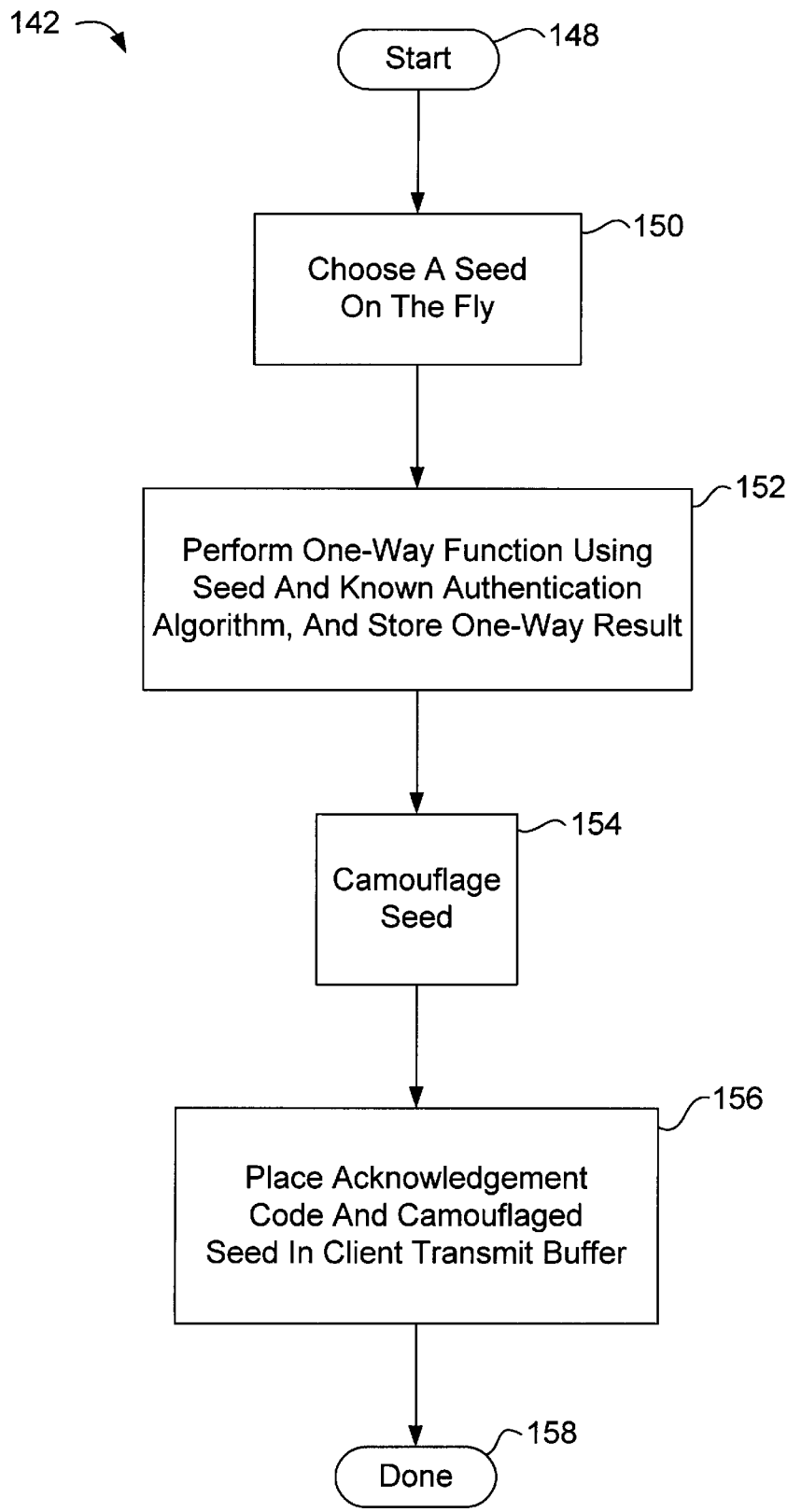
FIG. 6a is a flow diagram illustrating the process "Client Authentic?" of FIG. 6.
Figure 6B:
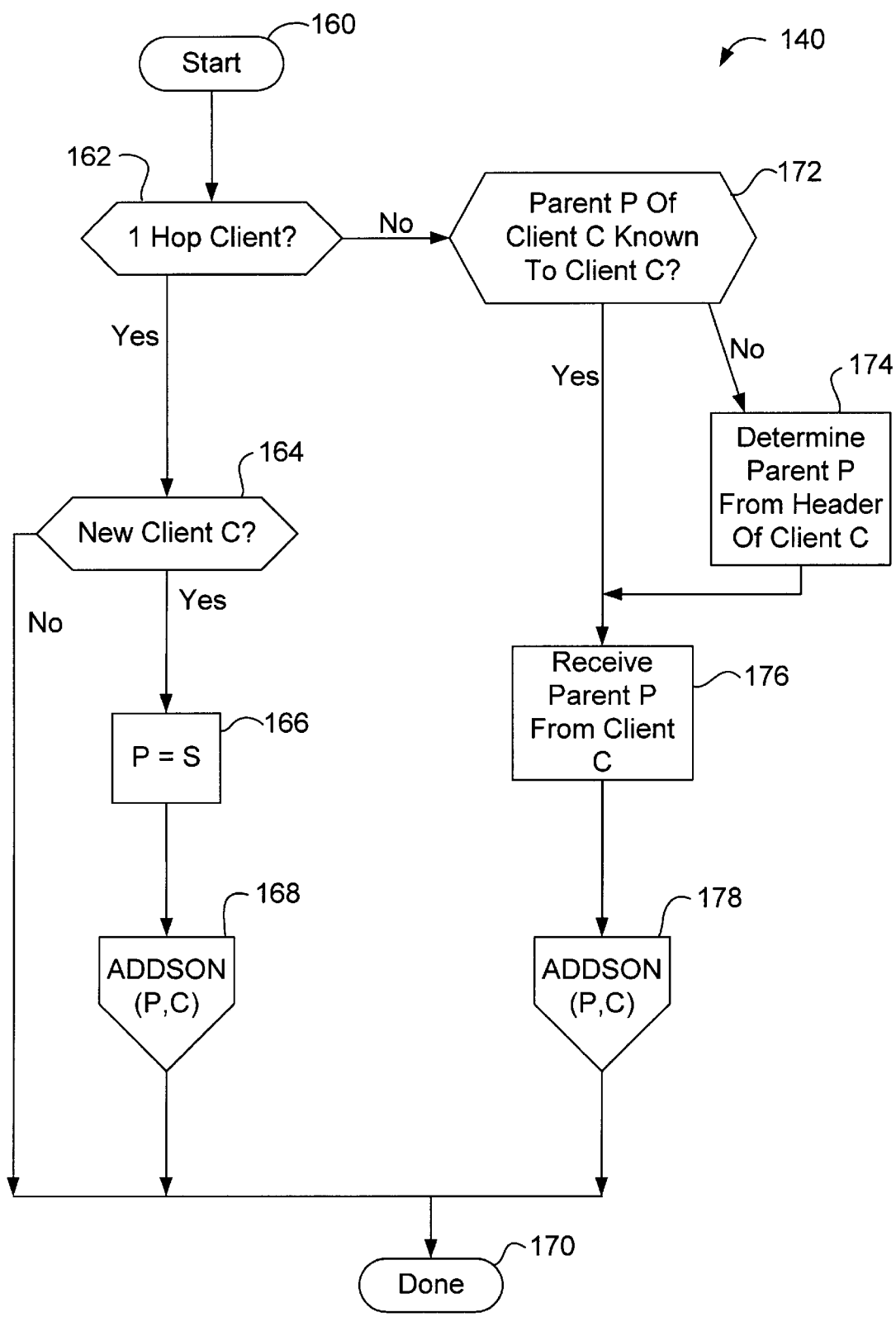
FIG. 6b is a flow diagram illustrating the process "Put New Client In Tree" of FIG. 6.

FIG. 6a illustrates the process 142 of FIG. 6 in greater detail. More particularly, the process 142 begins at 148 and, in a step 150, a "seed" is chosen on the fly. Next, in a step 152, a "one-way" function is performed using the seed and a known authentication algorithm, and a one-way result is stored. Next, found in step 154, the seed is "camouflaged," and in a step 156, places an acknowledgment code and the camouflaged seed in the client transmit buffer. The process is then completed at 158.

The purpose of the process 142 is to prevent unauthorized "clients" from accessing the network. For example, hackers can be prevented from accessing the network unless they can crack the authentication process, which is nearly impossible.

Authentication techniques are well known to those skilled in the art. For example, the book, incorporated herein by reference, *Algorithms in SNOBOL* 4, by James F. Gimpel, Bell Telephone Laboratories, John Wiley & Sons, a Wiley Interscience Publication, © 1976 by Bell Telephone Labs, Inc., ISBN 0-471-30213-9, describes authentication techniques using one-way seeds. See, in particular, pp 348–349 with back-references. In brief, a "seed" is chosen "on the fly", such as by reading the system clock. The one-way function modifies the seed using an algorithm known to both the server and the clients. The one-way result, which in this instance is 4 bytes in length, is stored. The step 154 then "camouflages" the seed by dispersing the 4 bytes among perhaps 26 other bytes prior to transmitting the camouflaged seed. The receiving clients know which of the four bytes to use for their one-way function.

The process 140 "Place New Client In Tree" of FIG. 6 is illustrated in greater detail in FIG. 6d. The process 140 begins at 160 and in a step 162, it is determined whether this is a "1 hop" client. If so, a decision step 164 determines whether it is a new client C. If so, the variable P is set to S and the function "ADDSON" with the variables (P, C) is evoked. S, of course, is the server or root of the tree. If step 64 determines that it is not a new client C, or after the completion of the ADDSON function, the process ends at 170.

If step 162 determines that it is not a 1 hop client (i.e. C is a multi-hop client) a step 162 determines whether the parent P of client C is known to client C. If not, a step 174 determines the parent P from the header of client C. If the client C does know its parent, or after the completion of step 174, a step 176 receives parent P from client C. Next, in a step 178, the function ADDSON(P,C) is evoked, and the process is completed at 170.

Figure 7:
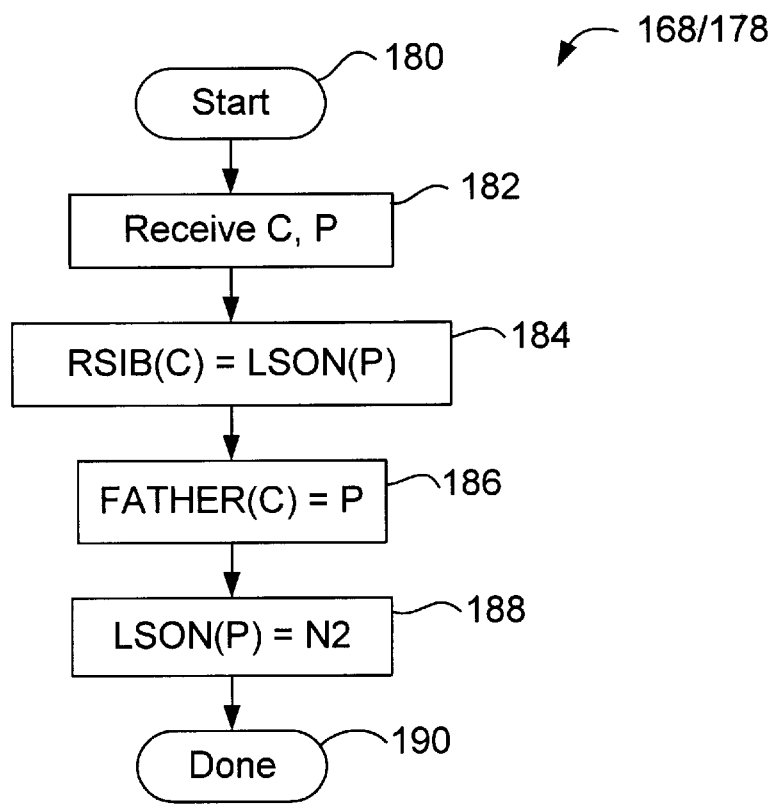
FIG. 7 is a flow diagram illustrating the function "ADDSON(P,C)" of FIG. 6b.

In FIG. 7, the ADDSON(P,C) function is explained in greater detail. More particularly, function steps 168–178 begin at 180 and, in a step 182, the variables C, P are received. In this notation, the string RSIB( ) refers to a string of right siblings, and the notation LSON( ) refers to a string of left sons. A step 184 sets RSIB(C)=LSON(P). A step 186 sets a string FATHER(C)=P and a step 188 sets the string LSON (P)=N2. The variable N2 is an in-memory pointer that points to the memory location of nodes. The string FATHER provides a pointer from a child C to its father, which in this case is P. The process is then completed as indicated at 190.

Figure 7A:
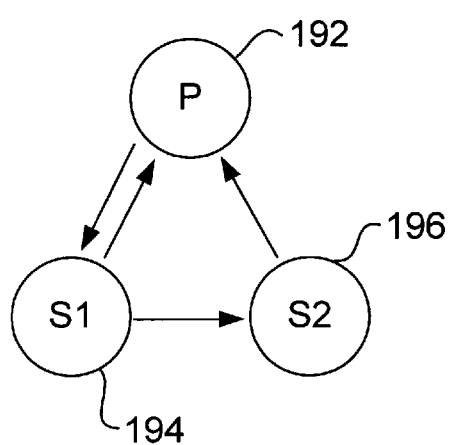
FIGS. 7a and 7b are used to illustrate the operation of the ADDSON function of FIG. 7.
Figure 7B:
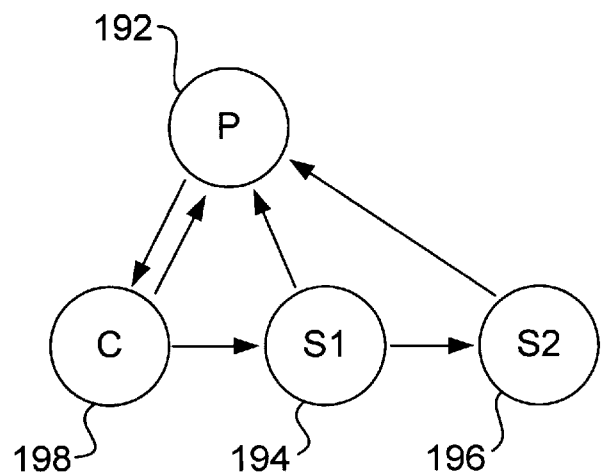

In FIGS. 7a and 7b, the ADDSON function is graphically illustrated. In FIG. 7a, a parent 192 has a left son 194 and a right sibling 196. The parent 192 and left son 194 have mutual pointers to each other, while the right sibling 196 has only a pointer to the parent 192. The left son 194 also has a pointer to the right sibling 196. When the ADDSON function is evoked with the argument (P, C) C is added as the left son 198 and the pointer in the parent 192 is updated to point to the left son 198. The left son 198 has pointers to the parent and to the new right sibling 194. The new right sibling 194 still has a point to the older right sibling 196, and both siblings 194 and 196 have pointers to the parent 192. It should be noted, under all circumstances, that the parent is only directly aware of the left son, in that it only has a pointer to the left son.

Figure 8:
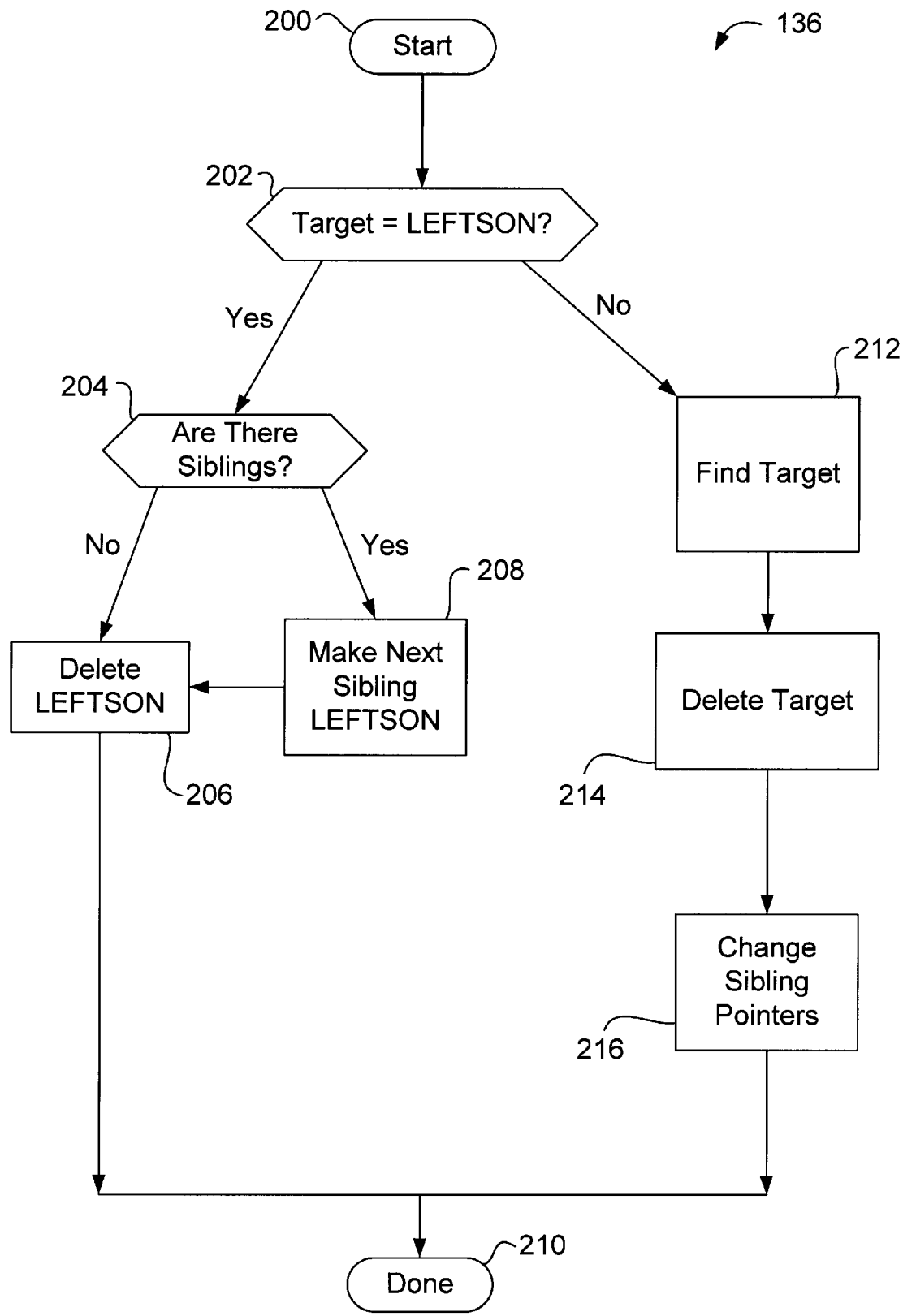
FIG. 8 is a flow diagram illustrating the "Delete Client From Tree" process of FIG. 6.

In FIG. 8, the process 136 "Delete Client From Tree" is illustrated in flow- diagram form. The process 136 begins at 200 and in a step 202, it is determined whether the target is equal to the left son. The "target" is, of course, the client to be deleted. If the target is the left son, a step 204 determines if there are other siblings. If not, the left son is deleted in a step 206. If there are other siblings, a step 208 makes the next sibling the left son, and then the left son is deleted by step 206. The process is then completed at 210. If step 202 determines that the left target is not equal to the left son, the target is found in a step 212, and is then deleted in a step 214. A step 216 then changes the sibling pointers, and he process is completed at 210.

Figure 8A:
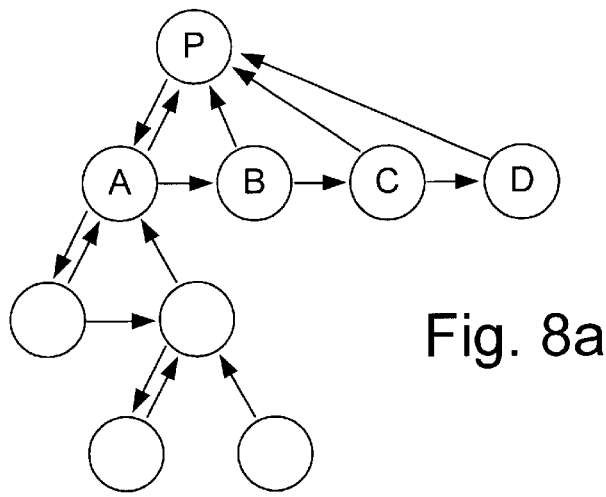
FIGS. 8a–8c illustrate the process of FIG. 8.
Figure 8B:
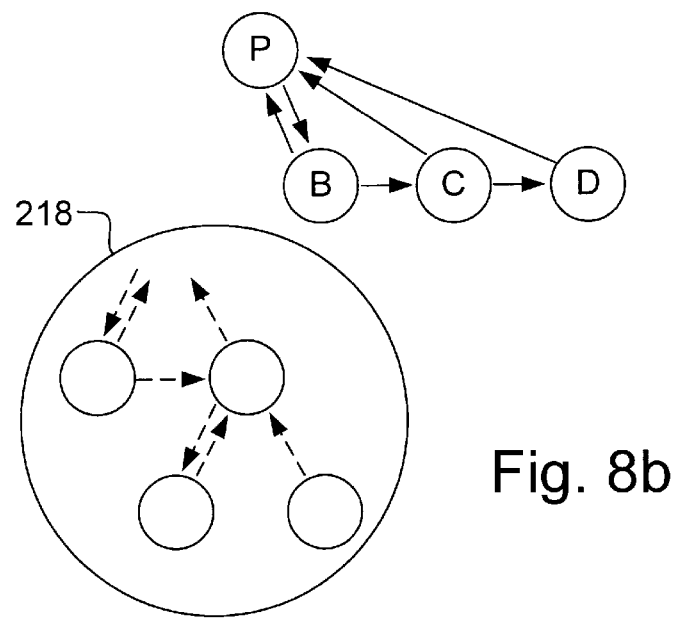
Figure 8C:
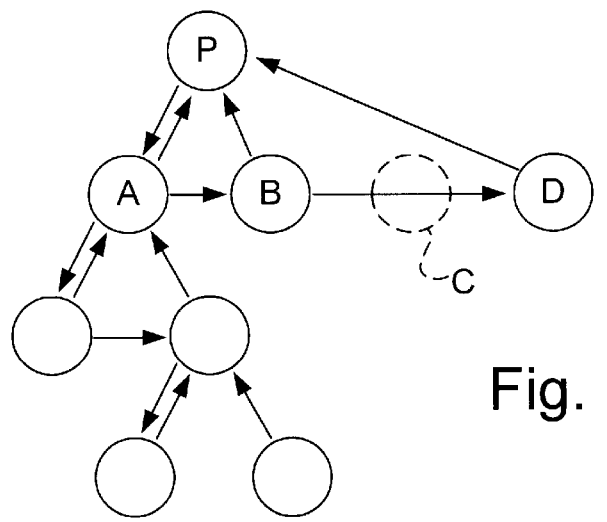

FIGS. 8a–8c are several scenarios used to illustrate the process of FIG. 8. Assume that there is a tree structure as illustrated in FIG. 8a. If the node "A" (i.e. a client A) of FIG. 8a "disappears" all nodes (clients) 218 that used client A as a path to the server P are dropped from the network as illustrated in FIG. 8b. With reference again to FIG. 8a, if the node C disappears, the sibling B will simply reset its pointer to point to sibling D without any loss of service to any of the nodes. The lost nodes 218 of FIG. 8b will need to reestablish themselves into the network as previously described.

Figures 9A, 9B, 9C:
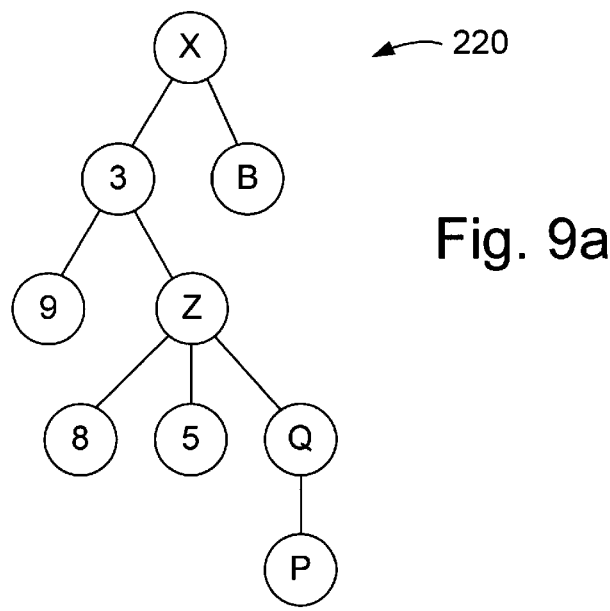
FIGS. 9a–9c illustrate the "Place Network Tree In Client Transmit Buffer" of FIG. 6.

FIG. 9a is a tree structure that will be used to illustrate the step 134 "Place Network Tree In Client Transmit Buffer" of FIG. 6. Since the tree structure 220 is a logical construct, it must be represented in a form suitable for digital transmission. This form is illustrated in FIG. 9b as a string 222. With reference to both FIGS. 9a and 9b, the string 222 represents the tree on a top-to-bottom, left-to-right basis. Therefore, the string 222 indicates for the parent X that its left son is 3 with a right sibling B. For the parent 3, there is a left son 9 with a right sibling Z. For the parent Z, there is a left son 8, a right sibling 5, and another right sibling Q. For the parent Q, there is a left son P. Therefore, the tree structure 220 has been completely and compactly represented by the notation of the string 222.

The converting of trees to strings and the reverse is well known to those skilled in the art In short, a left parenthesis in the string indicates that a left son follows, and a comma in the string indicates that a right sibling follows. For example, the aforementioned book *SNOBOL* 4: *Techniques and Applications* describe the process for converting trees to "prefix form" as described above, and vice versa. The aforementioned book *ALGORITHMS IN SNOBOL* 4 likewise describes the process. While the tree structure 9a is useful for representing and traversing a tree data structure, it is not well-adapted for rapid searching for particular nodes. For this purpose, the table of FIG. 9c is created to implement fast searching and other housekeeping functions. In this illustration, the table of FIG. 9c includes four columns. The first column is the sequential element or "node" number, a second column 226 is the node name, the third column 228 includes the time stamp of the creation of the node, and the fourth column includes the actual physical memory location of the node. In this way, a particular node can be searched by element number, node name, time stamp, or memory location without resorting to the time consuming recursive search algorithms otherwise typically used to search tree structures.

Figure 10:
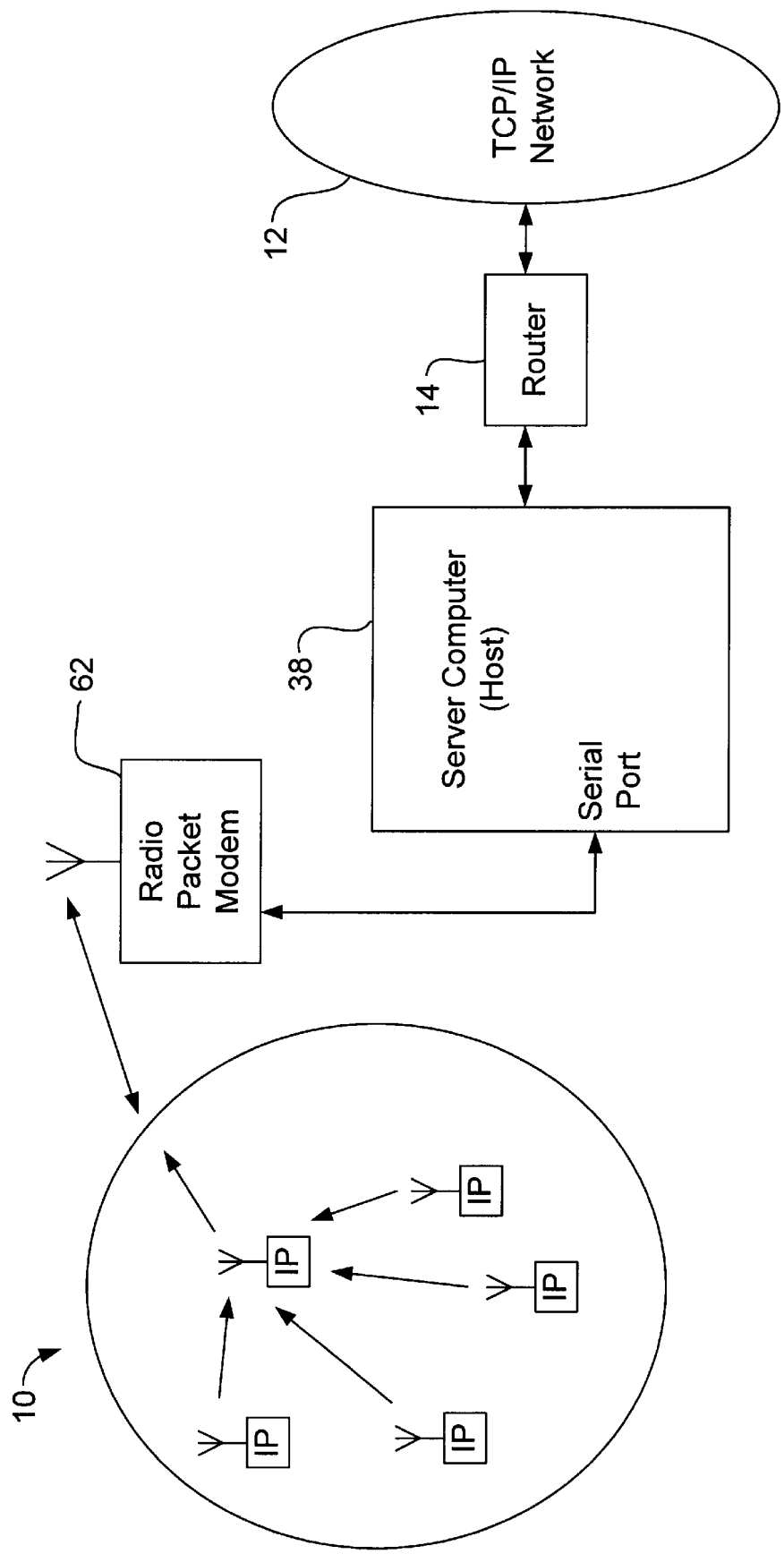
FIG. 10 is a pictorial representation of the "Communicate With Network" process of FIG. 4.

FIG. 10 is a pictorial representation of a portion of the server of FIG. 3 that has been simplified to explain the steps 78 of FIG. 4 "Communicate With Network." The wireless network system 10 includes a number of clients and, perhaps, other servers, each of which has its own IP address. The radio modems of those clients and servers communicate with radio modem 62 of the server which provides digital data to the serial port of a server computer or host 38. A router, bridge or other device is used to connect the server to a network, such as a TCP/IP network 12. Of course, the radio packet modem 62 and the server computer 38 can be considered part of the wireless network system 10 as described previously. The combination of the server and the router or the like performs a "gateway" function, in that it provides translation services between the two networks 10 and 12.

Referring back to FIG. 4, the step 76 "Send Packets" simply involves sending the data packets stored in the client transmit buffer to the network 10 through the radio modem 62. Likewise, and in a straightforward matter, the step 78 "Communicate With Network" simply forwards the data stored in the network transmit buffer to the network through the router 14 or through another route, such as the Ethernet interface 58. The "Send Packets" and "Communicate With Network" processes will be easily understood by those skilled in the art. Again, the server process control 72 allocates system resources among the processes 74–80 on a round-robin basis.

Figure 11:
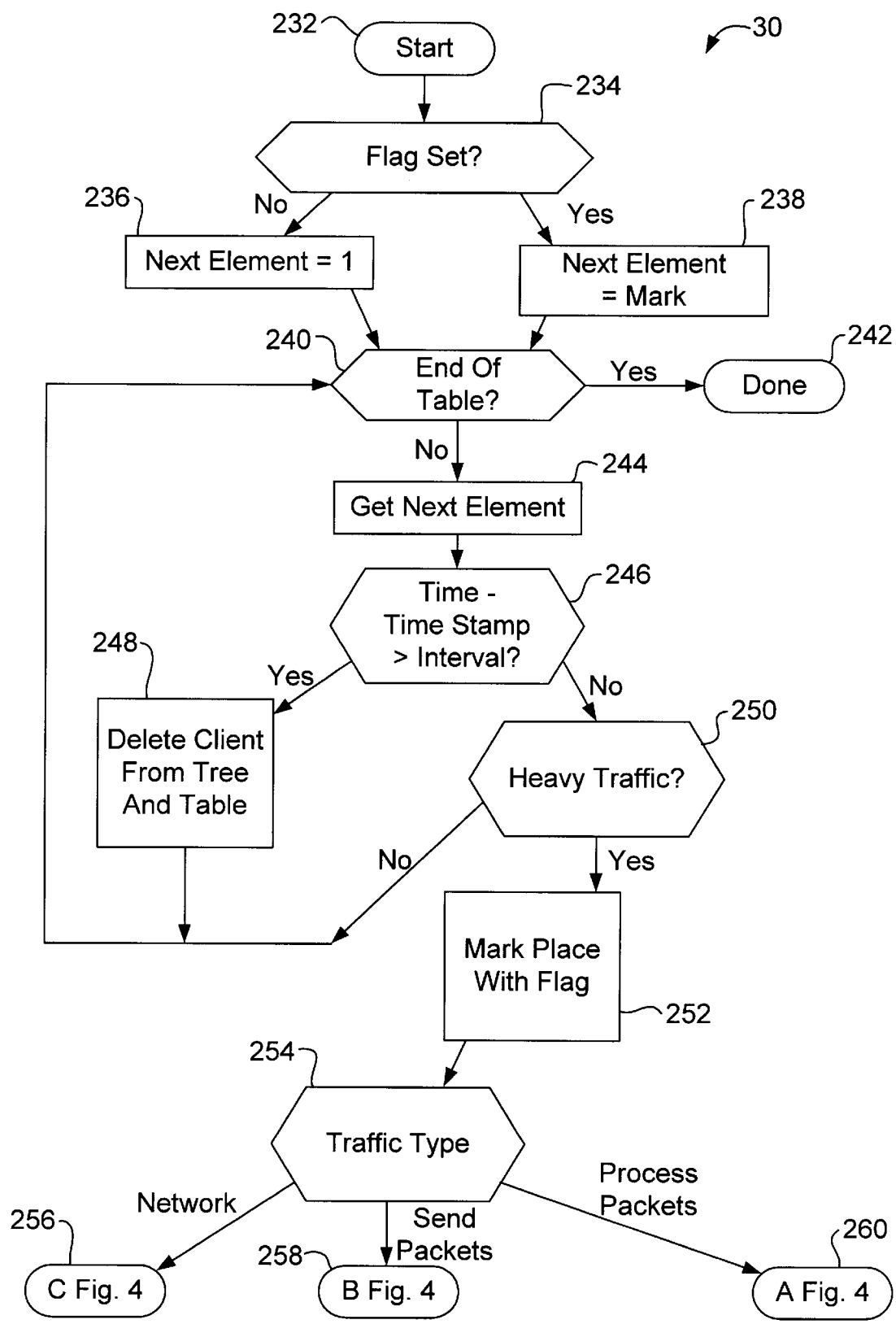
FIG. 11 is a flow diagram of the process "Communicate With Network" of FIG. 4.

In FIG. 11, the housekeeping process 80 of FIG. 4 is illustrated in greater detail. Since the housekeeping function 80 is of generally less importance than the other functions of process 70, it is possible that housekeeping function will be interrupted with a branch to one of function s 74, 76, and 78 of FIG. 4.

More particularly, in FIG. 11, the housekeeping function 80 of FIG. 4 is illustrated in greater detail. The process 80 begins at 232 and, in a decision step 234, it is determined whether a flag is set. If not, the next element is equal to 1, i.e. it is picking the first element on the list. If step 234 determines that a flag is set, the process 80 knows that the housekeeping has been interrupted in the middle of the list and therefore the next element is set equal to the stored mark point as indicated in step 238. Next, a step 240 determines whether if the end of the table has been reached. If so, the process is completed at 242. If the end of the table has not been reached, the next element retrieved in a step 244, and then in a step 246, it is determined whether the current time minus the time stamp is greater than a predetermined interval. If it is, a step 248 deletes the client from the tree and from the table. This step 248 is performed to ensure that a client node that has dropped out the network 10 without informing the server is deleted from the server tree at some point in time. A suitable interval may be 15 minutes, or any desired internal set by a network manager. Process control then returns to step 240.

If step 246 determines that a node (i.e. a client) corresponding to the next element has checked-in within the time INTERVAL, a step 250 determines whether there is heavy traffic on the server. If not, process control is returned to step 240. If there is heavy traffic, a step 252 marks the place in the table corresponding to the current element (i.e. the marked point in the list is stored in memory) and then a step 254 determines the traffic type. Process control then branches to process 256 if it is heavy network traffic, 258 if it is heavy outgoing packet traffic, and process 260 if it is heavy incoming packet traffic.

Figure 12:
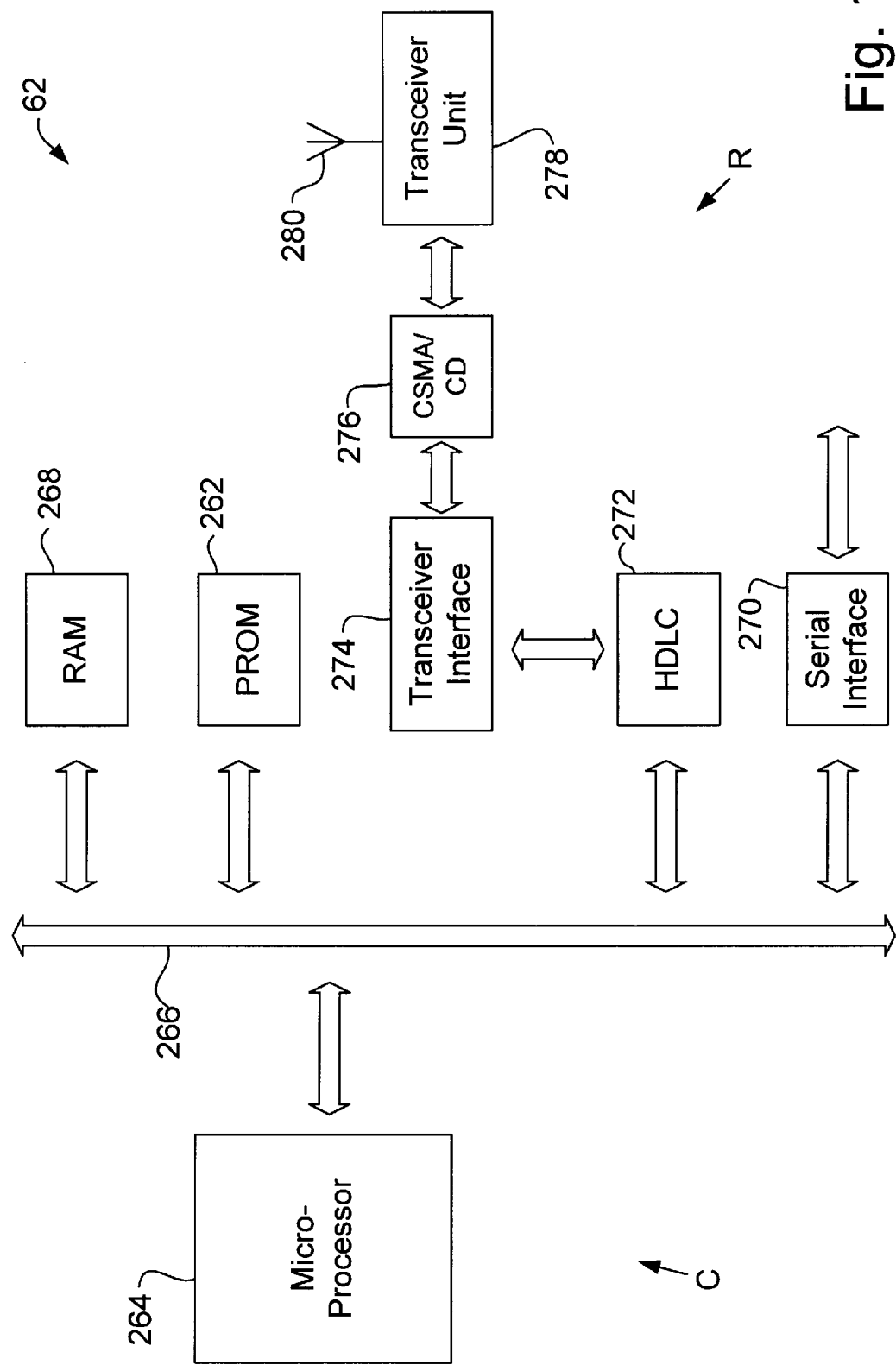
FIG. 12 is a block diagram of a radio packet modem used in the present invention.

In FIG. 12, a radio modem 62 (which can be similar to all of the radio modems described herein) is illustrated in block diagram form. Again, the radio modem 62 is commercially available from GRE America, Inc. as the Gína spread spectrum radio modem, models 6000N-5 or 8000N-5. Spread spectrum technology gives good reliability and some transmission security in that a 127 bit cyclical code must be known by both the transmitting and receiving node. However, for true data security, encryption techniques, well known to those skilled in the art, should be used. Gína modems do include the option of 64 bit built-in encryption as an option.

It should be further noted that the Gína radio modem hardware can be modified to incorporate the server process (or the client process for the client radio modems) of the present invention by storing program steps implementing those processes into a ROM or programmable ROM (PROM) 262 of the radio modem 62.

The radio modem 262 includes a microprocessor 264 coupled to a bus 268. The microprocessor is an Intel 80C188 microprocessor in the present example. The PROM 262 (which currently stores 512 Kbytes of code) is coupled to the bus, as is RAM 268, a serial interface 272, and an HDLC converter 272. Coupled to the HDLC 272 interface is a transceiver interface 274, and coupled to the transceiver interface 274 is a CSMA/CD unit 276. A transceiver unit 278 with an antenna 280 is coupled to the CSMA/CD unit 276.

The devices 272 and 276 are used for error correction and noise cancellation, as will be appreciated by those skilled in the art. The CSMA/CD detects if two packets have "collided" producing indecipherable noise. If so, no acknowledgment of the packet is sent by radio modem 62, and the senders of the two packets will wait a short random period before resending their packets. Since the waiting period is random, there is little likelihood that the packets will collide a second time. The HDLC performs a checksum on the received packets and, if the checksum fails, prevents the sending of the acknowledgment. This will cause the sending node to resend the packet after a random waiting period.

The currently used radio modems operate in the 902–928 MHz frequency range at about 725 mW, and have an outdoor range of up to 12 miles, line-of-sight. These characteristics are a good compromise for a light to moderately dense network. If the network becomes very dense, it may be preferable to reduce the power, since this will reduce the number of clients that hear a given packet. Also, other frequency ranges are also suitable, such as the 2.404 to 2.478 GHz range.

The currently sold Gína spread spectrum radio models have their transmission ("baud") rate artificially limited to 38.4 kHz. However, this artificial limit can be easily removed by a simple change to the program in PROM 262 to allow the modems to operate at 115.2 kHz, or nearly at full ISDN baud rates. At these baud rates, a single server can reasonably support three simultaneous WWW browser sessions and a dozen e-mail sessions. This compares very favorably to cellular networks which, as noted previously, can only support one user at a time. This also compares very favorably to the Ricochet system which, since it is limited to 28.8K baud, is not very useful for WWW browsing.

Figure 13:
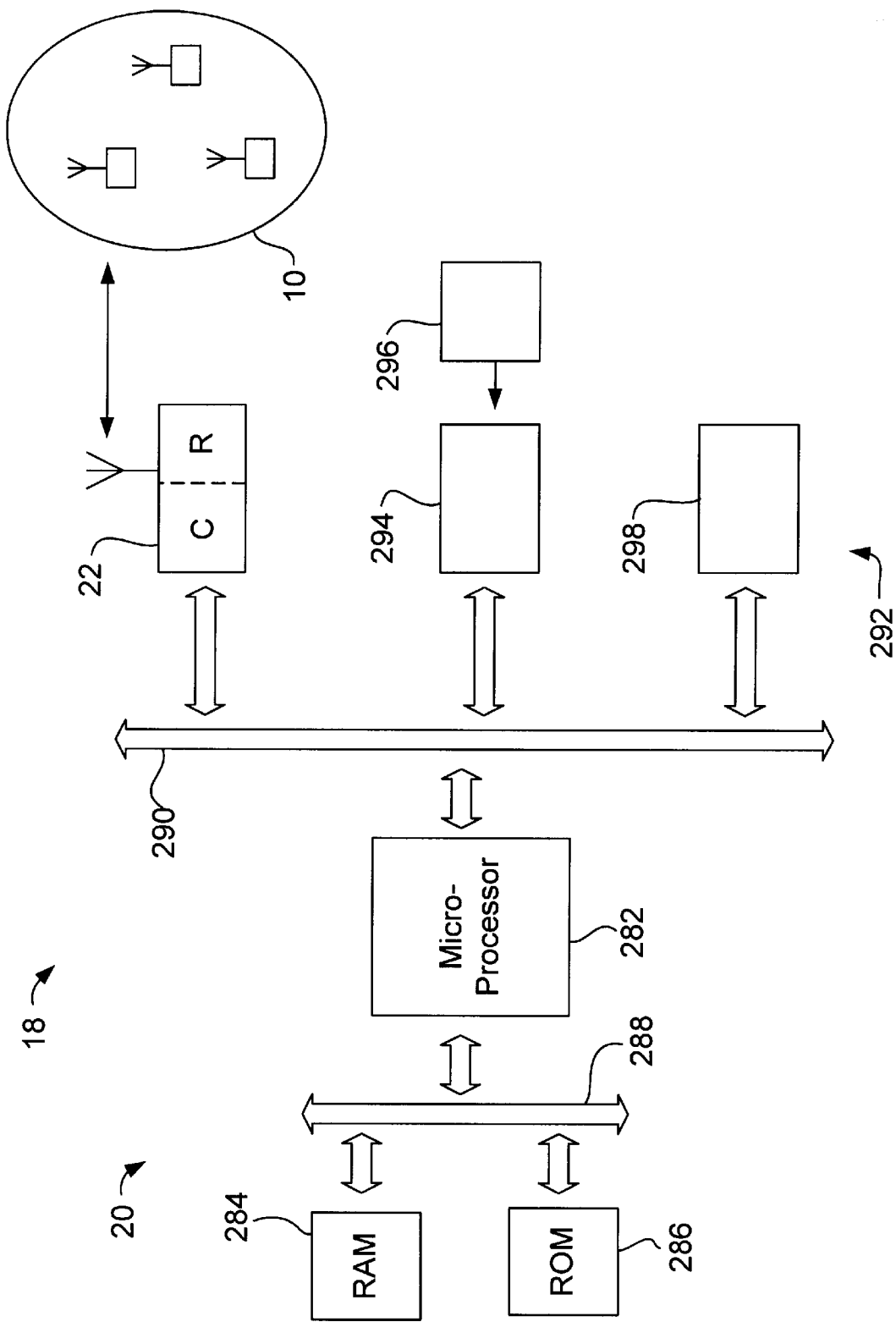
FIG. 13 illustrates a client, such as a client A, B, C, or D of FIG. 1.

In FIG. 13, a client 18 including a computer 20 and a radio modem 22 of FIG. 1 is illustrated in greater detail. Again, the client computer 20 can be any suitable form of digital processor including personal computer, workstation, PDA, etc. A computer 20 includes a microprocessor 282, RAM 284, and ROM 286. The microprocessor is coupled to the RAM 284 and the ROM 286 by a memory bus 288. The microprocessor 282 is also coupled to an input/output (I/O) bus 290 to which a number of peripherals 292 may be attached, including the radio modem 22. As before, the radio modem 22 includes a control C portion and a radio R portion, where the control portion of the radio modem 22 is coupled to the I/O bus 290. With brief reference to FIG. 12, the control portion C is everything but the transceiver unit 278 and the antenna 280, and the radio portion R corresponds to the transceiver unit 278. Also, as before, the client process running on the client 18 can run on the computer 20, in the control C portion of the modem 22, or partially on both processors. The client 18 typically includes other peripherals 292 such as a removable media drive 94 receptive to removable media 296, (such as a floppy disk or a CD ROM) and to a hard disk drive 298. Those skilled in the design of computer system will readily understand how the hardware of client 18 is assembled and used.

In alternate embodiments of the present invention, uninterruptable power supplies and Global Positioning Systems (GPS) are added to the clients 18. The uninterruptable power supplies ensure that the clients stay on the network, and the GPS can be used in conjunction with directional antennas (such as phased array antennas) attached to the radio modems 22 to direct the transmission to the desired next node in the link. This increases the efficiency of the system, and reduces packet "pollution" of the network. The GPS unit can be coupled to I/O bus 290, or can be incorporated into the radio modem 22.

Figure 14:
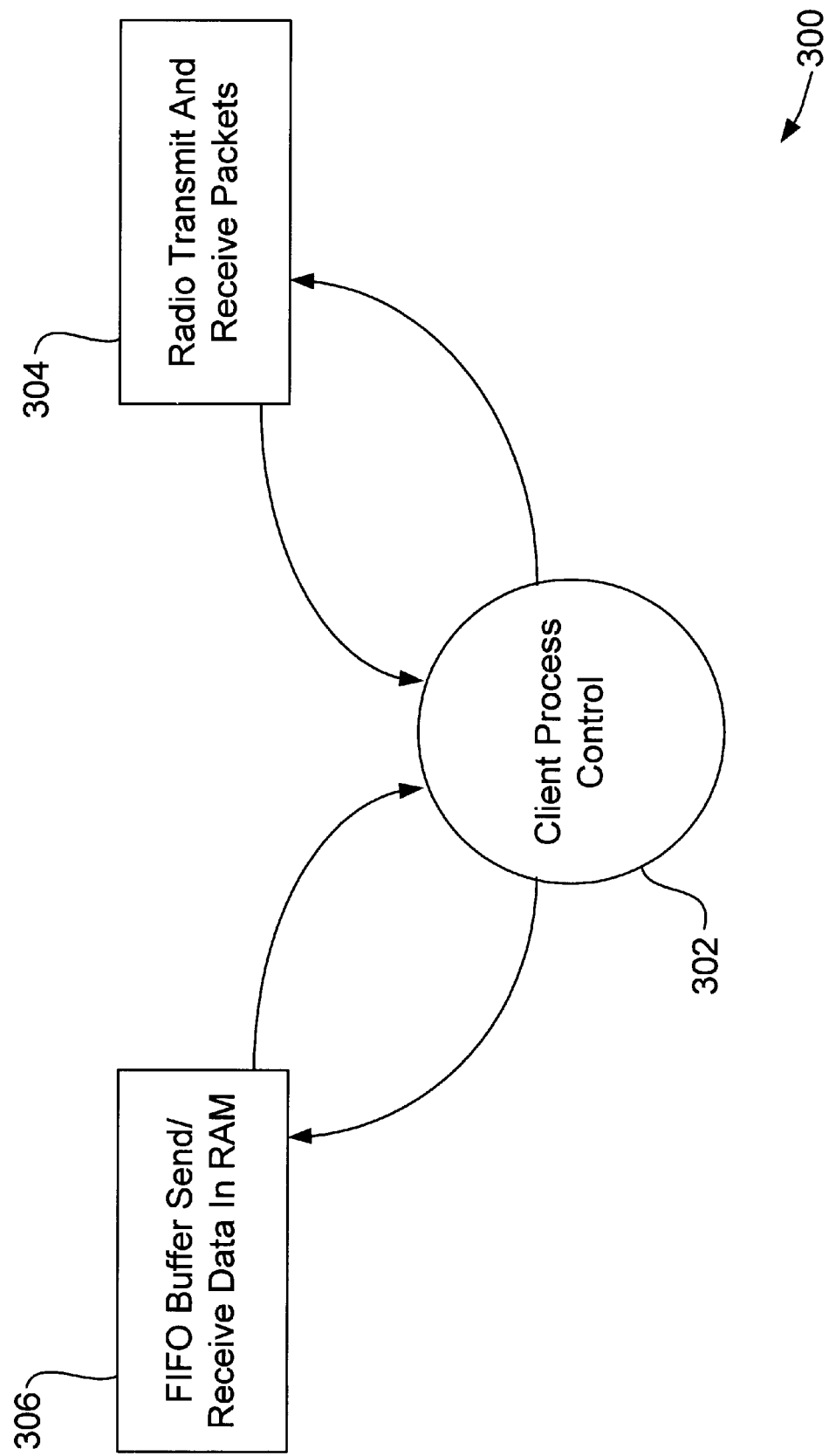
FIG. 14 is a flow diagram of a client process running on the client of FIG. 13.

In FIG. 14, a client process 300 is implemented in the hardware of client 18. Again, this process can run on the microprocessor 282, or it can be partially or wholly run on the microprocessor of the controller C of the radio modem 22. In this current preferred embodiment, the process 300 runs on the computer portion 20 of the client 18. The client process 30 includes a client process control 302, a process 304 for radio transmitting and receiving data packet, and a process 306 for maintaining a first-in-first-out (FIFO) buffer for send and receive data packets in the RAM 284 of the computer 20.

Figure 15:
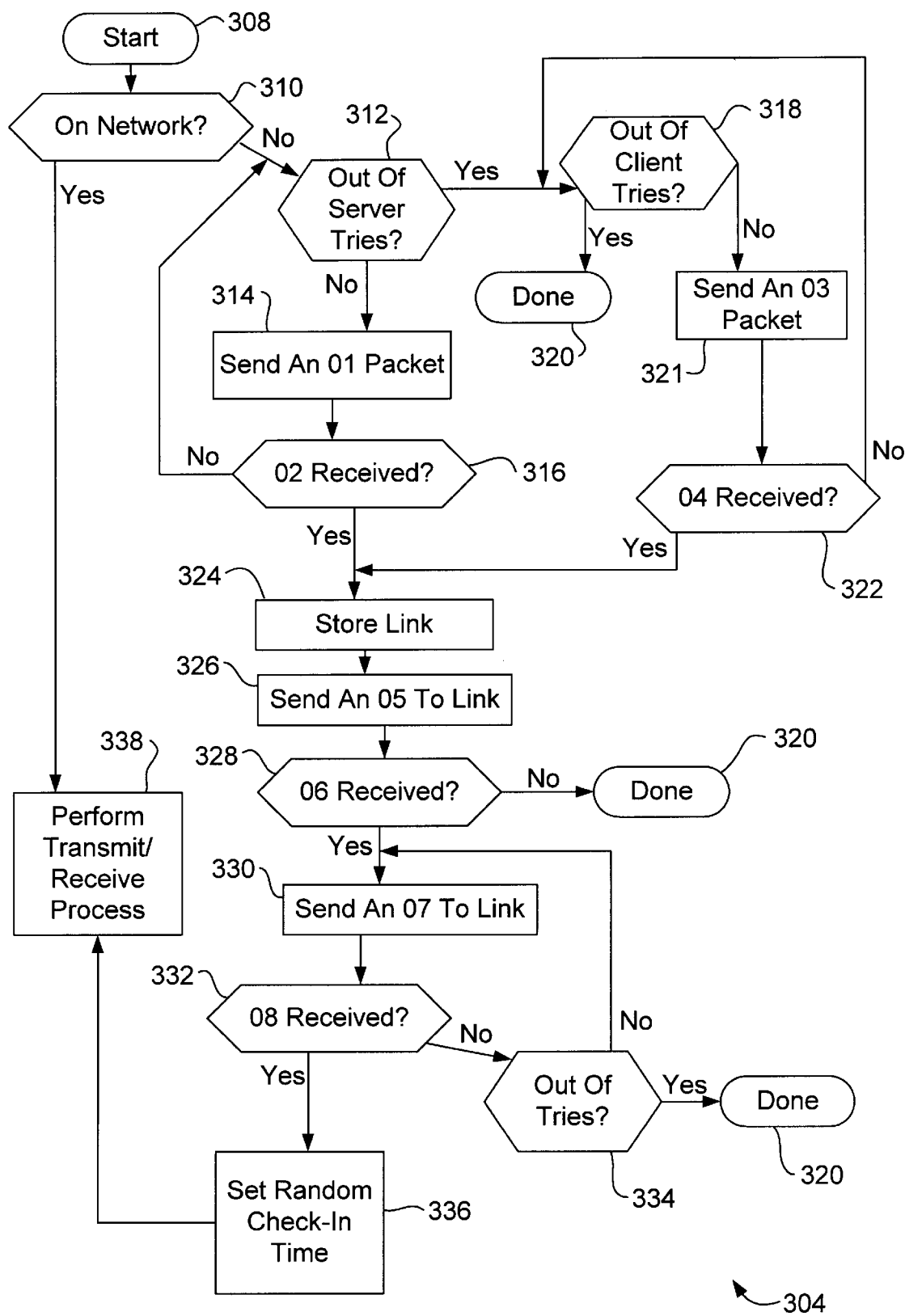
FIG. 15 is a flow diagram of the process "Radio Transmit and Receive Packet" of FIG. 14.

In FIG. 15, the process 304 of FIG. 14 is described in greater detail. The process 304 begins at 308 and, in a step 310, it is determined whether the client is on the network. If not, the client needs to get on the network before it can send data to the server. This connection process begins at 312 to determine whether it is out of tries in trying to reach the server. If not, it sends a 01 packet in a step 314 and waits to receive a 02 packet from the server or another client in a step 316. If it does not receive a 02 packet in response to 01 packet, process control is returned to step 312 until it runs out of server tries. When it does run out of server tries, process control is turned over to a step 318 which determines whether it is out of client tries. If yes, this particular client cannot reach either a server or another client and the process terminates at 320 with a failure. If it is not out of client tries in step 318, a 03 packet is sent in a step 320 and the client waits to receive a 04 from another client in a step 322. If a 04 is not received, the process control is returned to step 318 until they are out of client tries.

If a 02 is received in a step 316 or a 04 is received in a step 322, then the client is in communication with the server or a client, respectively. In either instance, a step 324 stores the "link," i.e. the path to a server, whether it is direct to the server or through one or more intermediate clients. Next, in a step 326, a 05 is sent to the link, and a step 328 determines whether a 06 is returned. If not, the process is terminated as indicated at 320. If a 06 has been received then a 07 is sent to the link in a step 330, and a step 332 determines whether a 08 is returned. If not, a step 334 determines is they are out of tries, and if not, process control is returned to step 330 to send another 07 to the link. If after a certain number of tries, e.g. 3 tries, a 08 is not received in response to 07 transmitted by the client, the process terminates with a failure at a step 320. If a 08 is received as determined by step 332, a random check-in time is set in a step 336. A random check-in time is set so that not all clients will try to check in with the server at the same time. Preferably, the random times will equally distribute the check-in times for the various clients equally within the aforementioned period INTERVAL. Finally, at this point, the client is connected into the network and the transmit/receive process is accomplished in a step 338. Of course, if the client was on the network as determined by step 310, the step 338 can be performed directly. The step 338 will be performed until there is a time-out of the transmit/receive process due to the round-robin scheduling by the client process control 302 (see FIG. 14).

Figure 16:
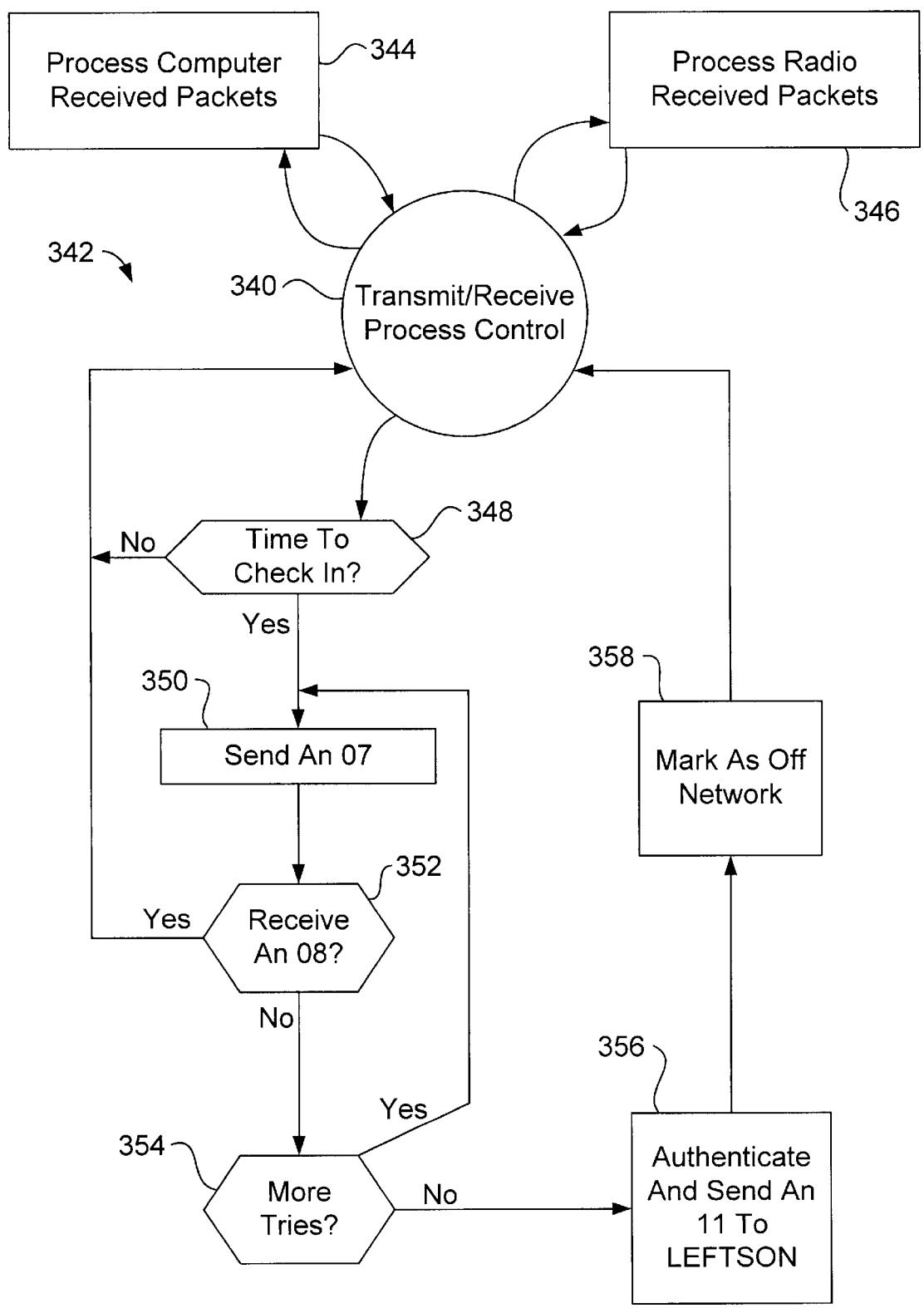
FIG. 16 is a flow diagram of the process "Perform Transmit/Receive Process" of FIG. 15.

In FIG. 16, the process 338 "Perform Transmit/Receive" is illustrated in greater detail. The process 338 has a transmit/receive process control 340 and three subprocesses 342, 344, and 346. Again, time are allocated to the various subprocesses on a round-robin basis.

The subprocess 342 is the check-in routine where the client is required to check in on a periodic basis with the server to avoid being dropped from the server's routing list. As noted previously, the check-in start time is essentially random, and is within a given period INTERVAL. More particularly, the subprocess 342 begins with a decision 348 as to whether it is the proper time to check-in. If not, process control is immediately returned to process control 340. If it is check-in time, a 07 is sent to the server. If a 08 is received from the server, all is well and process control is returned to process control 340. If the expected 08 is not received, decision step 354 determines if there are any more tries. Typically, at least three tries will be allowed. If there are more tries, process control is returned to step 350. If there aren't any more tries, a step 356 will authenticate and send an 11 to the left son of the client that the client is removing itself from the network. Authentication prevents the situation where a "promiscuous" spooler could masquerade as a client and transmit an "11" packet with downstream client addresses, thereby disconnecting those downstream clients from the network. The client then marks itself as being disconnected or "off" of the network in a step 358, and process control is returned to process control 340.

Figure 17:
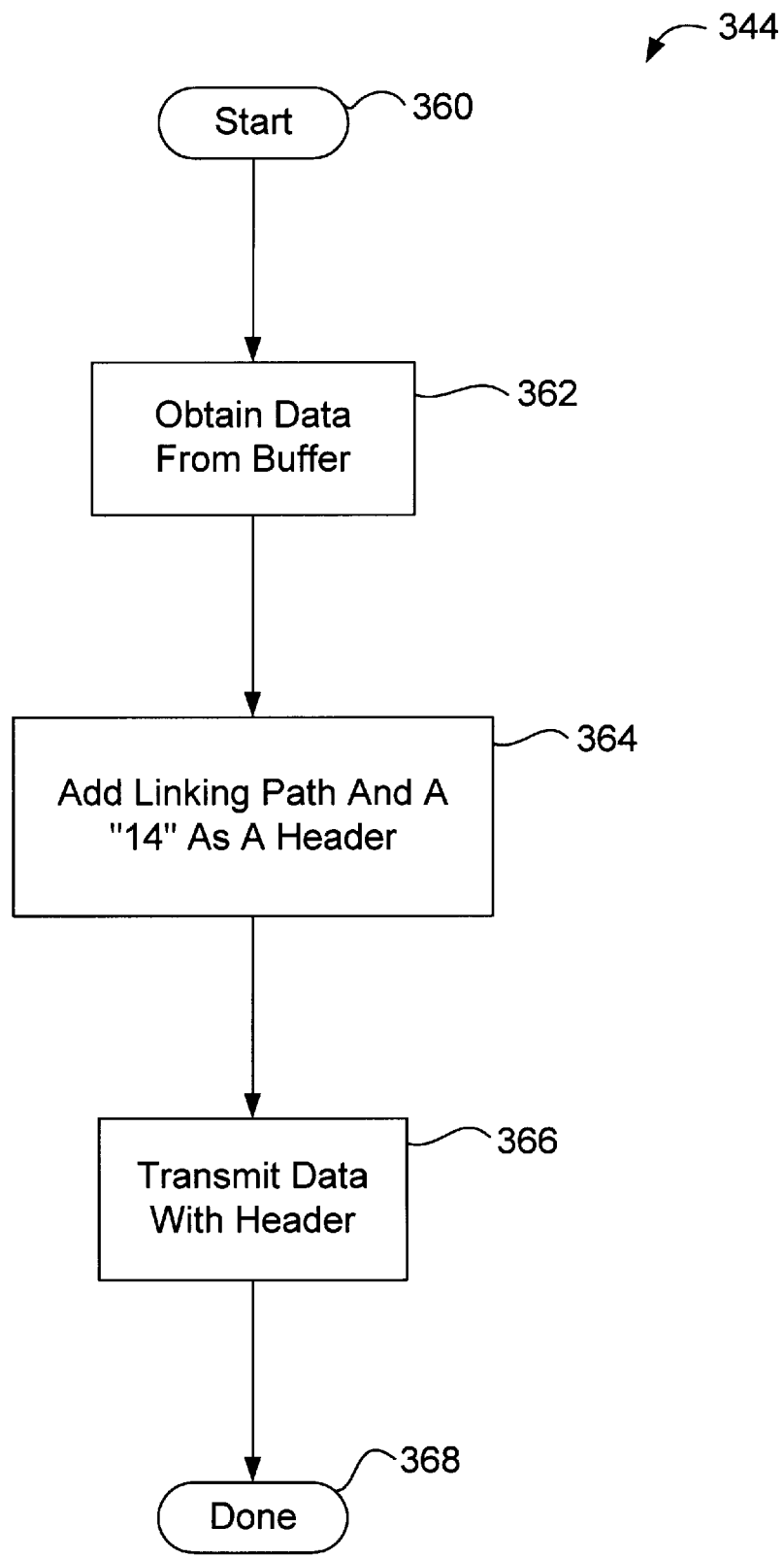
FIG. 17 is a flow diagram of the process "Process Computer Receive Packets" of FIG. 16.

In FIG. 17, the process 344 "Process Computer Received Packets" is shown in flow diagram form. The process 344 begins at 360 and, in a step 362, the data is obtained from a buffer. Next, in a step 364, the header is added to the data, including the link and the packet type "14" to indicate that this is a data-type data packet. Next, the data packet, complete with header, is transmitted. The process is completed at 368.

Figure 18:
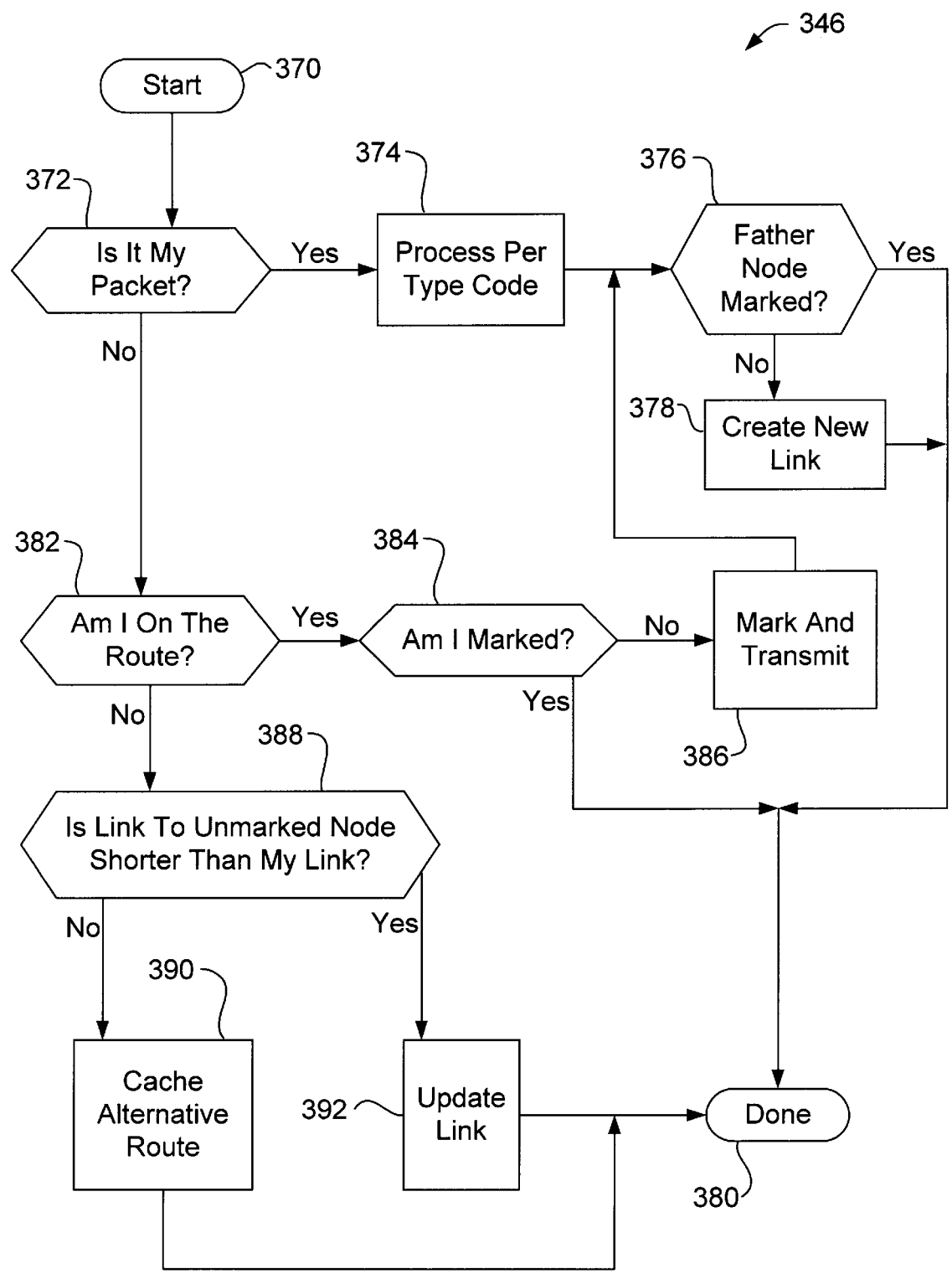
FIG. 18 is a flow diagram of the process "Process Radio Received Packets" of FIG. 16.

FIG. 18 illustrates the process 346 "Process Radio Received Packets" of FIG. 16 in greater detail. The process 346 begins at 370 and, in a step 373, determines if the received packet is for it. If yes, a step 374 will process the packet per the code type, as will be discussed in greater detail subsequently. Then, a step 376 determines if the father node of the client has been marked. Not, a new, shorter link is created since the packet was received without being relayed by the father node. If the father node has been marked, or after a new link has been created, the process terminates at 380.

If step 372 determines that it is not that client's packet, a step 382 determines if that client is on the route for the packet. If yes, a step 384 tests to see if the client is marked. If it is marked, it has already sent that packet and the process is completed at 380. If the client hasn't been marked, it marks itself in the header of the data packet and transmits the packet in a step 386. Process control is then given to step 376 to see if the client's link can be upgraded as discussed previously.

If step 382 determines that the packet is not for that client, and that the client is not part of the link, steps 388–392 still analyze the packet in a process known as "pooning." Since this client can hear this packet, there is an opportunity to upgrade its link. Step 388 determines whether the link to the last marked node plus one (i.e. the distance to the first unmarked node) is shorter than its own link. This is because this client is listening to the last marked node, and the number of hops through that last marked node is the number of hops of that last marked node plus one. If it is, the client's link is updated in a step 392 to this shorter link. If not, the alternative route is cached in case the client's current link becomes inoperative. Therefore, in the pooning process, the client listens to all packets to continuously and dynamically update its link to the best possible path.

Figure 18A:
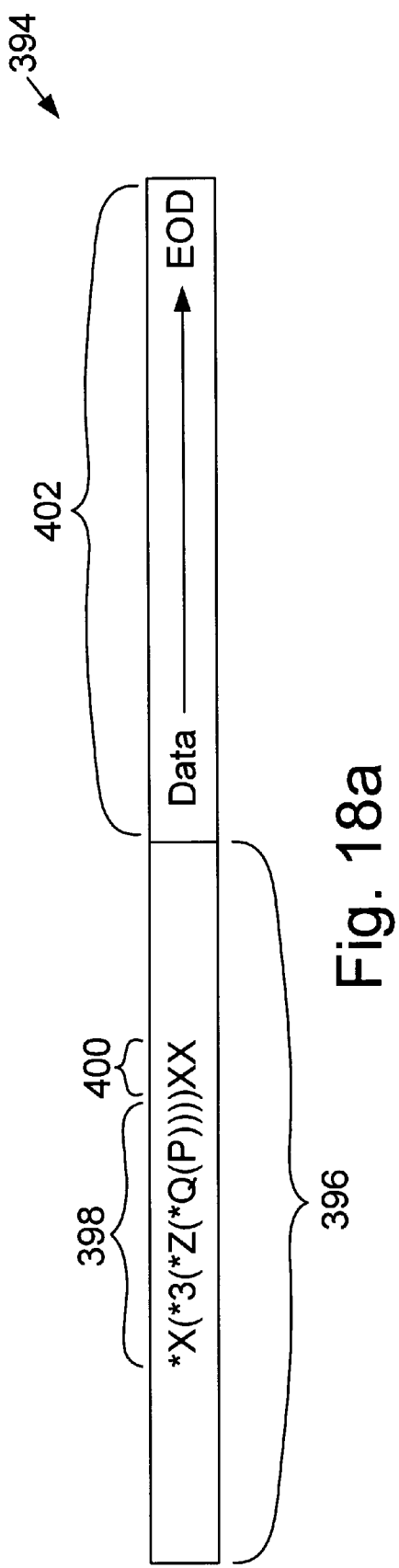
FIGS. 18A and 18B are used to illustrate the process "Is It My Packet?" of FIG. 18.
Figure 18B:
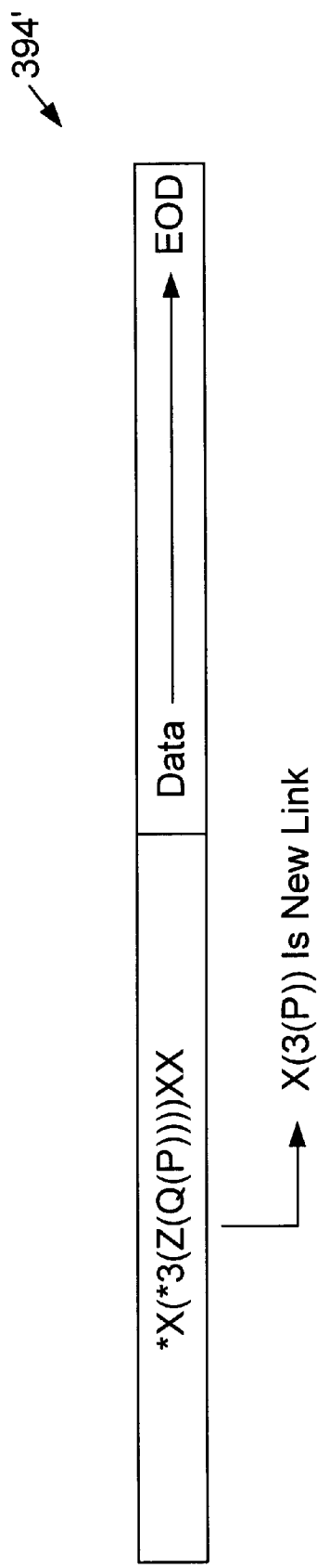

In FIG. 18A, a data packet 394 of the present invention includes a header portion 396 including a link section 398 and a data type section 400, and a data portion 402. The link 398 indicates that the destination of this data packet is the node P. The two digit data type 400 indicates what type of data is being sent, and the data field 402 includes the actual data and is terminated within EOD (end of data) marker. This packet corresponds to the tree of FIG. 9a. Since all upstream nodes (i.e. nodes Q, Z, 3, and X) are marked with asterisks ("*"), it is known that the data packet has passed through and has been marked by each of these nodes before reaching the node P. If, however, the data packet 394' of FIG. 18B is received where in only nodes X and 3 are marked, this means that the node 3 can hear the transmission of node (client) 3 directly. In this instance, there is no need to go through nodes Q and Z to reach the server X. As a result, the new, upgraded link is from node P to node 3 to the server X. This is represented by the notation: X(3((P)).

The table of FIG. 19 is used to illustrate the "Process Per Type Code" step 384 of FIG. 18. The table of FIG. 19 includes three columns 404, 406, and 408. The first column 404, lists the codes that can be received. These codes corresponds to the 2 byte code 400 of the data packet 394 of FIG. 18A. The second column 406 corresponds to the server responses to receiving such codes, and the third column 408 are the client responses to receiving the codes. We will now discuss each of the codes, in sequence.

When the server receives a 01 code, its response is a 02 code plus a one-way seed as discussed previously. Since a 01 code is never intended for a client, it will ignore or "drop" the 01 coded data packets.

For the 02, 03, and 04 codes, the server will ignore or drop those data packets because these data packets are only intended for clients. If a client receives a 02, it responds with a 05 and a one-way response. In response to a 03, a client will send a 04 and a seed or a null. In response to a 04, the client will send a 05 and a one-way seed. Again, one-way seeds and responses to one-way seeds were discussed previously.

When a server receives a 05, if it has previously sent a 02 and if the 05 is authentic, then it will send a 06. Otherwise, it will drop the packet. When a client receives a 05, if it had previously sent a 04, and if the 05 is authentic, then it sends a 06. Otherwise, the client will drop the data packet. If the server receives a 06, it will drop the data packet. If a client receives a 06 after it sent a 05, then it will send a 07. Otherwise, it will drop the packet as well.

When a 07 is received from the server, it will immediately respond with a 08. Since 07 coded packets are never intended for clients, it will be dropped.

Data packets coded with an 08, 09, 10, or 11 are all dropped if received by a server. If a client receives a 08, it will update the tree or repeat the data. In response to a 09, a client will send a 10. In response to a 10, a client will update the tree or repeat the data. In response to a type 11, it send an 11 to the left son with the address the departing node plus a 01 to reconnect to the network.

Data packets of type 12 and 86 are currently reserved. In response to a data packet type 13, a server will delete the sender. Since this is a server destination data packet only, if a client receives a data packet of type 13, it will drop the data packet.

Finally, if a server receives a data packet of type 14, it will send it to the network transmit buffer. If a client receives a data packet of type 14, it will send it to the computer transmit buffer.

Figure 20:
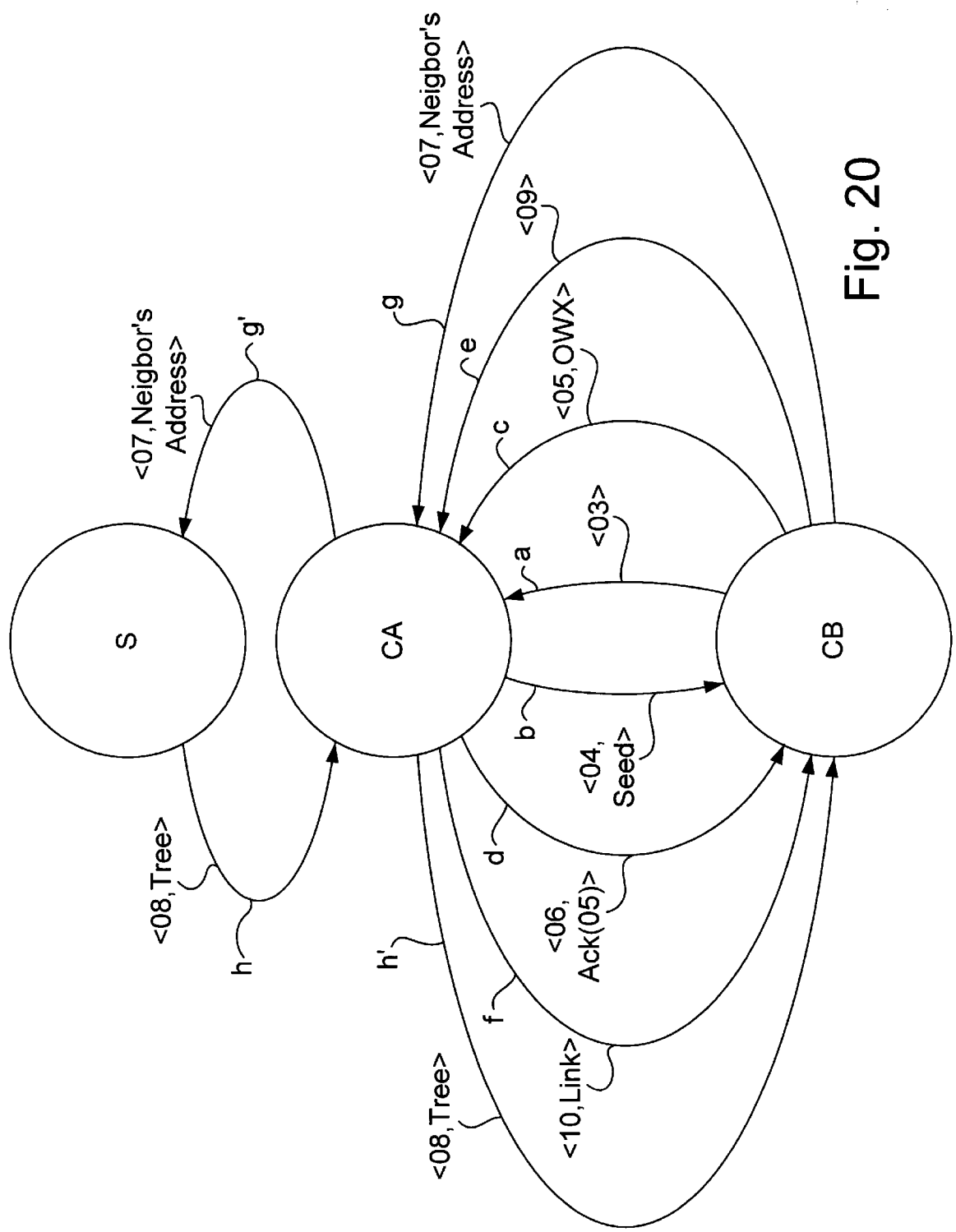
FIG. 20 illustrates an initialization routine of the client process of the present invention.

FIG. 20 illustrates an initialization routine which connects a client CB to a server S through another client CA. The sequence is as follows. As indicated by arrow a, client CB sends a 03 to client CA. In return, the client CA sends a 04 and a seed back to client CB as indicated by arrow b. Client CB then sends a 05 and a one-way response as indicated by arrow c to client CA, and client CA sends a 06 and an acknowledgment with a 05 to client CD as indicated by arrow d. Then, client CB sends a 09 to client CA as indicated by arrow e, and client CA sends a 10 and the link to the client CB as indicated by arrow f. Client CB then sends a 07 and the neighbor's addresses to the client CA as indicated by arrow g, and a client CA relays the 07 and the neighbor's address to the server S as indicated by arrow g'. The server S then sends a 08 and the tree to the client CA as indicated by arrow h, and the client CA relays the 08 and the tree to the client CB as indicated by the arrow h'. At this point, the client CB has the link to the server S and the complete tree of the network in its memory.

Figure 21B:
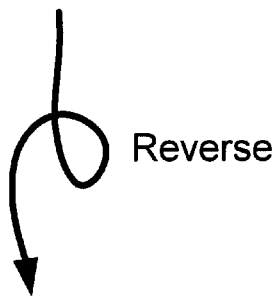
Figure 21D:
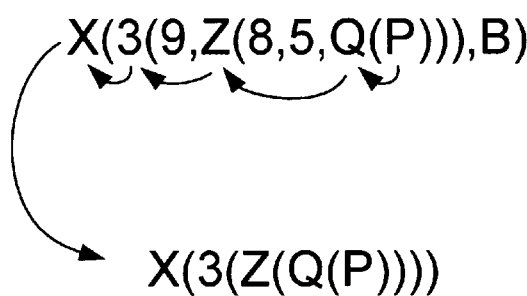

FIGS. 21a–21d illustrate a portion of the server process which deals with determining a return path from a received data packet at a server. Assume, for example, the tree is known to the server is as illustrated in FIG. 21a. This is the same tree as was illustrated in an example of FIGS. 9a and 9b. Then, assume that the server X receives the packet from a client P as illustrated in FIG. 21b. The simplest way of determining the reverse address is simply reverse the link section of the header portion of the data packet of FIG. 21b to provide a return address of 21c. However, if the part of the address of the header of the data packet of FIG. 21b has been lost or corrupted during the transition process, the tree of FIG. 21a can be used to reconstruct the return path. This is accomplished by jumping from parent to parent in reverse order as indicated to determine the return path. In this example, the reverse order parent jumping indicates that the original path the server X was P>Q>Z>3>X, which, when reversed, gives us the proper reverse path, namely X(3(Z(Q (P)))). As will be appreciated by those skilled in the art, this type of reverse tree traversal is easily accomplished with a recursive function.

While this invention has been described in terms of several preferred embodiments, there are alterations, permutations, and equivalents which fall within the scope of this invention. It should also be noted that there are may alternative ways of implementing both the process and apparatus of the present invention. It is therefore intended that the following appended claims be interpreted as including all such alterations, permutations, and equivalents as fall within the true spirit and scope of the present invention.

We claim:

1. A wireless network system comprising:
    a server including a server controller and a server radio modem, said server controller implementing a server process that includes the control of said server radio modem, said server process including the receipt and transmission of data packets via said server radio modem;
    a plurality of clients each including a client controller and a client radio modem, said client controller implementing a client process that includes the control of said client radio modem, said client process including the receipt and transmission of data packets via said client radio modem, wherein said client process of each of said clients initiates and selects a radio transmission path to said server that is one of a direct link to said server and an indirect link to said server through at least one the remainder of said plurality of clients; and
    wherein said selected link to said server is a link utilizing the least number of other clients,
    whereby said transmission path from said client to said server is optimized.

2. A wireless network system comprising:
    a server including a server controller and a server radio modem, said server controller implementing a server process that includes the control of said server radio modem, said server process including the receipt and transmission of data packets via said server radio modem; and
    a plurality of clients each including a client controller and a client radio modem, said client controller implementing a client process that includes the control of said client radio modem, said client process including the receipt and transmission of data packets via said client radio modem, wherein said client process of each of said clients initiates and selects a radio transmission path to said server that is one of a direct link to said server and an indirect link to said server through at least one the remainder of said plurality of clients,
    wherein said server process further includes logic that maintains a client link tree having client link entries.

3. A wireless network system as recited in claim 2, wherein said server process further comprises:
    logic that compares a selected link from said client to said server to a current client link entry in said client link tree; and
    logic that updates said client link tree when said comparison meets predetermined conditions.

4. A wireless network system as recited in claim 3, wherein said server process further comprises:
    logic that determines if said client is authentic;
    logic that determines if said client is already in said client link tree if client is determined to be authentic;
    logic that deletes said client from said client link tree if said client is already in said client link tree; and
    logic that inserts said client in said client link tree if said client is authentic.

5. A wireless network system comprising:
    server means providing a server process including receiving data packets via a server wireless communication means, sending data packets via said wireless communication means, communicating with a network, and performing housekeeping functions;
    a plurality of client means, each client means providing a client process including sending and receiving data packet via a client wireless communication means, maintaining a send/receive data buffer in digital memory, and selecting a link to said server means that is one of a direct link to said server and an indirect link to said server through at least one of the remainder of said plurality of client means; and
    wherein said selected link to said server is a link utilizing the least number of other clients,
    whereby said transmission path from said client to said server is optimized.

6. A wireless network system comprising:
    server means providing a server process including receiving data packets via a server wireless communication means, sending data packets via said wireless communication means, communicating with a network, and performing housekeeping functions; and
    a plurality of client means, each client means providing a client process including sending and receiving data packet via a client wireless communication means, maintaining a send/receive data buffer in digital memory, and selecting a link to said server means that is one of a direct link to said server and an indirect link to said server through at least one of the remainder of said plurality of client means,
    wherein said server process further comprises a means for maintaining a client link tree having client link entries.

7. A wireless network system as recited in claim 6, wherein said server process further comprises:
    a means for comparing a selected link from said client to said server to a current client link entry in said client link tree; and
    a means for updating said client link tree when said comparison meets predetermined conditions.

8. A wireless network system as recited in claim 7, wherein said server process further includes:
    a means for determining if said client is authentic;
    a means for determining if said client is already in said client link tree if client is determined to be authentic;
    a means for deleting said client from said client link tree if said client is already in said client link tree; and
    a means for inserting said client in said client link tree if said client is authentic.

9. A method for providing wireless network communication comprising:
    providing a server implementing a server process including receiving data packets via r.f. transmission, sending data packets via r.f. transmission, communicating with a network, and performing housekeeping functions; and
    providing a plurality of clients, each client providing a client process including sending and receiving data packet via r.f transmission, maintaining a send/receive data buffer in digital memory, and selecting a transmission path to said server via that is one of a direct link to said server and an indirect link to said server through at least one of the remainder of said plurality of clients; and wherein said selected link to said server is a link utilizing the least number of other clients, whereby said transmission path from said client to said server is optimized.

10. A method for providing wireless network communication comprising:

providing a server implementing a server process including receiving data packets via r.f. transmission, sending data packets via r.f. transmission, communicating with a network, and performing housekeeping functions; and providing a plurality of clients, each client providing a client process including sending and receiving data packet via r.f transmission, maintaining a send/receive data buffer in digital memory, and selecting a transmission path to said server via that is one of a direct link to said server and an indirect link to said server through at least one of the remainder of said plurality of clients, wherein said server process further includes maintaining a client link tree having client link entries.

11. A method as recited in claim 10, wherein said server process further includes:

comparing a selected link from said client to said server to a current client link entry in said client link tree; and updating said client link tree when said comparison meets predetermined conditions.

12. A method as recited in claim 11, wherein said server process further includes:

determining is said client is authentic;

determining if said client is already in said client link tree if client is determined to be authentic;

deleting said client from said client link tree if said client is already in said client link tree; and inserting said client in said client link tree if said client is authentic.

13. A method for providing wireless network communication comprising the steps of:

a server process including a data packet reception step, a data packet transmission step, a network communication step, and a housekeeping step; and a plurality of clients each providing a client process including a data sending and receiving step, a send and receive data buffer maintenance step, and a link selection step that is one of a direct link to a server and an indirect link to said server through at least one of the remainder of said plurality of clients; and wherein said selected link to said server is a link utilizing the least number of other clients, whereby said transmission path from said client to said server is optimized.

14. A method for providing wireless network communication comprising the steps of:

a server process including a data packet reception step, a data packet transmission step, a network communication step, and a housekeeping step; and a plurality of clients each providing a client process including a data sending and receiving step, a send and receive data buffer maintenance step, and a link selection step that is one of a direct link to a server and an indirect link to said server through at least one of the remainder of said plurality of clients, wherein said server process further comprising the step of maintaining a client link tree having client link entries.

15. A method as recited in claim 14, wherein said server process further comprises the steps of:

comparing a selected link from said client to said server to a currect client link entry in said client link tree; and updating said client link tree when said comparison meets predetermined conditions.

16. A method as recited in claim 15, wherein said server process further comprises steps of:

determining if said client is authentic;

determining if said client is already in said client link tree if client is determined to be authentic;

deleting said client from said client link tree if said client is already in said client link tree; and inserting said client into said client link tree if said client is authentic.

* * * * *

UNITED STATES PATENT AND TRADEMARK OFFICE
CERTIFICATE OF CORRECTION

PATENT NO. : 6,044,062
DATED : March 28, 2000
INVENTOR(S) : Brownrigg et al.

It is certified that error appears in the above-identified patent and that said Letters Patent is hereby corrected as shown below:

Title page,
Item [57], ABSTRACT,
Line 10, reads "maintains a radio trasmission path to the server that is either"; it should read -- maintains a radio transmission path to the server that is either --;

Column 2,
Line 39, reads "modem of a particular personal computer in radio transmis-"; it should read -- modem of a particular personal computer is in radio transmis- --;

Column 3,
Line 30, reads " "Control Using Pacing in a Packet Radio Network", N."; it should read -- "Congestion Control Using Pacing in a Packet Radio Network", N. --;

Column 5,
Line 11, reads "each including a client controller and a client radio modern"; it should read -- each including a client controller and a client radio modem --;

Column 13,
Line 51, reads "those skilled in the art However, it should be noted that at"; it should read -- those skilled in the art. However, it should be noted that at --;

Column 17,
Line 60, reads "desired internal set by a network manager. Process control"; it should read -- desired interval set by a network manager. Process control --;

UNITED STATES PATENT AND TRADEMARK OFFICE
CERTIFICATE OF CORRECTION

PATENT NO.   : 6,044,062
DATED        : March 28, 2000
INVENTOR(S)  : Brownrigg et al.

It is certified that error appears in the above-identified patent and that said Letters Patent is hereby corrected as shown below:

Column 26,
Line 28, reads "to a currect client link entry in said client link tree; and"; it should read -- to a current client link entry in said client link tree; and --;

Signed and Sealed this

Twenty-first Day of May, 2002

*Attest:*

*Attesting Officer*

JAMES E. ROGAN
*Director of the United States Patent and Trademark Office*

(12) EX PARTE REEXAMINATION CERTIFICATE (8193rd)
United States Patent
Brownrigg et al.

(10) Number: US 6,044,062 C1
(45) Certificate Issued: May 3, 2011

(54) WIRELESS NETWORK SYSTEM AND METHOD FOR PROVIDING SAME

(75) Inventors: Edwin B. Brownrigg, Roseville, CA (US); Thomas W. Wilson, Alameda, CA (US)

(73) Assignee: IPCO, LLC, Atlanta, GA (US)

Reexamination Request:
No. 90/008,011, Apr. 17, 2006

Reexamination Certificate for:
Patent No.: 6,044,062
Issued: Mar. 28, 2000
Appl. No.: 08/760,895
Filed: Dec. 6, 1996

Certificate of Correction issued May 21, 2002.

(51) Int. Cl.
*H04L 29/06* (2006.01)
*H04Q 7/22* (2006.01)

(52) U.S. Cl. .................. 370/238; 370/315; 455/11.1; 455/445

(58) Field of Classification Search .................. None
See application file for complete search history.

(56) References Cited

U.S. PATENT DOCUMENTS

| | | | |
|---|---|---|---|
| 3,575,558 A | 4/1971 | Leyburn et al. |
| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wootton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |

(Continued)

FOREIGN PATENT DOCUMENTS

| EP | 0 483 547 A1 | 5/1992 |
|---|---|---|
| EP | 0 578 041 B1 | 1/1994 |
| EP | 0 663 746 B1 | 7/1995 |
| EP | 0718954 A1 | 6/1996 |
| EP | 0 740 873 B1 | 11/1996 |

(Continued)

OTHER PUBLICATIONS

Office Action dated Jun. 4, 2008, in co-pending U.S. Appl. No. 11/300,902, filed Dec. 15, 2005.

(Continued)

*Primary Examiner*—Scott L. Weaver

(57) ABSTRACT

A wireless network system includes a server having a server controller and a server radio modem, and a number of clients each including a client controller and a client radio modem. The server controller implements a server process that includes the receipt and the transmission of data packets via the radio modem. The client controllers of each of the clients implements a client process that includes the receipt and transmission of data packets via the client radio modem. The client process of each of the clients initiates, selects, and maintains a radio trasmission path to the server that is either a direct path to the server, or is an indirect path or "link" to the server through at least one of the remainder of the clients. A method for providing wireless network communication includes providing a server implementing a server process including receiving data packets via a radio modem, sending data packets via the server radio modem, communicating with the network, and performing housekeeping functions, and further includes providing a number of clients, each implementing a client process sending and receiving data packets via a client radio modem, maintaining a send/receive data buffer, and selecting a radio transmission path to the server. The radio transmission path or "link" is either a direct path to the server, or an indirect path to the server through at least one of the remainder of the clients. The process preferably optimizes the link to minimize the number of "hops" to the server.

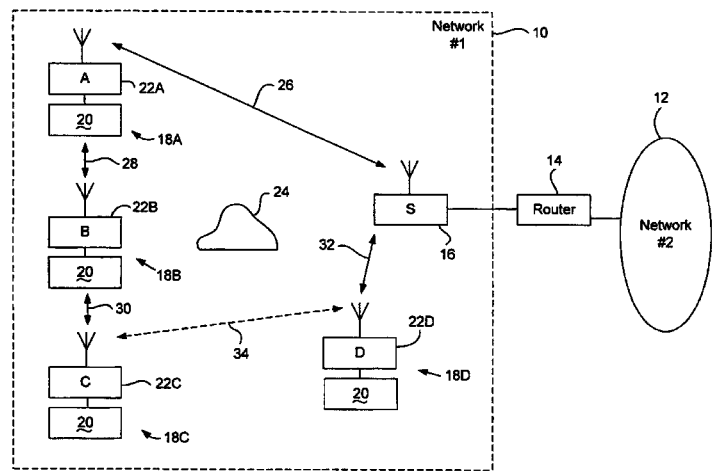

U.S. PATENT DOCUMENTS

| | | |
|---|---|---|
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,336,524 A | 6/1982 | Levine |
| 4,345,116 A | 8/1982 | Ash et al. |
| 4,354,181 A | 10/1982 | Spletzer |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,833,618 A | 5/1989 | Verma et al. |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley et al. |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,993,059 A | 2/1991 | Smith et al. |
| 5,007,052 A | 4/1991 | Flammer |
| 5,079,768 A | 1/1992 | Flammer |
| 5,088,032 A | 2/1992 | Bosack |
| 5,115,433 A | 5/1992 | Baran et al. |
| 5,117,422 A | 5/1992 | Hauptschein et al. |
| 5,130,987 A | 7/1992 | Flammer |
| 5,138,615 A | 8/1992 | Lamport et al. |
| 5,142,694 A | 8/1992 | Jackson et al. |
| 5,159,592 A | 10/1992 | Perkins |
| 5,170,393 A | 12/1992 | Peterson et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,383,187 A | 1/1995 | Vardakas et al. |
| 5,390,206 A | 2/1995 | Rein et al. |
| 5,406,619 A | 4/1995 | Akhteruzzaman et al. |
| 5,412,192 A | 5/1995 | Hoss |

| | | |
|---|---|---|
| 5,412,654 A | 5/1995 | Perkins |
| 5,412,760 A | 5/1995 | Peitz |
| 5,416,475 A | 5/1995 | Tolbert et al. |
| 5,418,812 A | 5/1995 | Reyes et al. |
| 5,420,910 A | 5/1995 | Rudokas et al. |
| 5,424,708 A | 6/1995 | Ballesty et al. |
| 5,430,729 A | 7/1995 | Rahnema |
| 5,432,507 A | 7/1995 | Mussino et al. |
| 5,438,329 A | 8/1995 | Gastouniotis et al. |
| 5,439,414 A | 8/1995 | Jacob |
| 5,440,545 A | 8/1995 | Buchholz et al. |
| 5,442,553 A | 8/1995 | Parrillo |
| 5,442,633 A | 8/1995 | Perkins et al. |
| 5,445,287 A | 8/1995 | Center et al. |
| 5,445,347 A | 8/1995 | Ng |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,455,569 A | 10/1995 | Sherman et al. |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,479,400 A | 12/1995 | Dilworth et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer |
| 5,493,273 A | 2/1996 | Smurlo et al. |
| 5,493,287 A | 2/1996 | Bane |
| 5,502,726 A | 3/1996 | Fischer |
| 5,504,746 A | 4/1996 | Meier |
| 5,506,837 A | 4/1996 | Sollner et al. |
| 5,508,412 A | 4/1996 | Kast et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Carroll et al. |
| 5,522,089 A | 5/1996 | Kikinis et al. |
| 5,528,215 A | 6/1996 | Siu et al. |
| 5,528,507 A | 6/1996 | McNamara et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson et al. |
| 5,555,258 A | 9/1996 | Snelling et al. |
| 5,555,286 A | 9/1996 | Tendler |
| 5,557,320 A | 9/1996 | Krebs |
| 5,557,748 A | 9/1996 | Norris |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,528 A | 11/1996 | Shuen |
| 5,573,181 A | 11/1996 | Ahmed |
| 5,574,111 A | 11/1996 | Brichta et al. |
| 5,583,914 A | 12/1996 | Chang et al. |
| 5,588,005 A | 12/1996 | Ali et al. |
| 5,589,878 A | 12/1996 | Cortjens et al. |
| 5,590,038 A | 12/1996 | Pitroda |
| 5,596,719 A | 1/1997 | Ramakrishnan et al. |
| 5,596,722 A | 1/1997 | Rahnema |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,721 A | 3/1997 | Natarajan et al. |
| 5,608,786 A | 3/1997 | Gordon |
| 5,613,620 A | 3/1997 | Center et al. |
| 5,615,227 A | 3/1997 | Schumacher, Jr. et al. |
| 5,617,084 A | 4/1997 | Sears |
| 5,623,495 A | 4/1997 | Eng et al. |
| 5,625,410 A | 4/1997 | Washino et al. |
| 5,628,050 A | 5/1997 | McGraw et al. |
| 5,629,687 A | 5/1997 | Sutton et al. |
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,691,980 A | 11/1997 | Welles, II et al. |
| 5,696,695 A | 12/1997 | Ehlers et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |
| 5,704,517 A | 1/1998 | Lancaster, Jr. |
| 5,706,976 A | 1/1998 | Purkey |
| 5,708,223 A | 1/1998 | Wyss |
| 5,708,655 A | 1/1998 | Toth et al. |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Rowsell et al. |
| 5,726,534 A | 3/1998 | Seo |
| 5,726,544 A | 3/1998 | Lee |
| 5,726,644 A | 3/1998 | Jednacz et al. |
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,737,318 A | 4/1998 | Melnik |
| 5,740,232 A | 4/1998 | Pailles et al. |
| 5,740,366 A | 4/1998 | Mahany et al. |
| 5,742,509 A | 4/1998 | Goldberg et al. |
| 5,745,849 A | 4/1998 | Britton |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |
| 5,790,644 A | 8/1998 | Kikinis |
| 5,790,662 A | 8/1998 | Valerij et al. |
| 5,796,727 A | 8/1998 | Harrison et al. |

| | | |
|---|---|---|
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,924 A | 4/1999 | Lyon et al. |
| 5,896,097 A | 4/1999 | Cardozo |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,946,631 A | 8/1999 | Melnik |
| 5,948,040 A | 9/1999 | DeLorme et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,578 A | 11/1999 | Azarya et al. |
| 5,987,011 A | 11/1999 | Toh |
| 5,987,421 A | 11/1999 | Chuang |
| 5,991,625 A | 11/1999 | Vanderpool |
| 5,991,639 A | 11/1999 | Rautiola et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,046,978 A | 4/2000 | Melnik |
| 6,054,920 A | 4/2000 | Smith et al. |
| 6,055,561 A | 4/2000 | Feldman et al. |
| 6,060,994 A | 5/2000 | Chen |
| 6,064,318 A | 5/2000 | Kirchner et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,094,622 A | 7/2000 | Hubbard et al. |
| 6,097,703 A | 8/2000 | Larsen et al. |
| 6,100,817 A | 8/2000 | Mason, Jr. et al. |
| 6,101,427 A | 8/2000 | Yang |
| 6,101,445 A | 8/2000 | Alvarado et al. |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,885 A | 9/2000 | Masone et al. |
| 6,122,759 A | 9/2000 | Ayanoglu et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,167,239 A | 12/2000 | Wright et al. |
| 6,172,616 B1 | 1/2001 | Johnson et al. |
| 6,173,159 B1 | 1/2001 | Wright et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |

| Patent | Date | Inventor |
|---|---|---|
| 6,181,981 B1 | 1/2001 | Varga et al. |
| 6,188,354 B1 | 2/2001 | Soliman et al. |
| 6,188,675 B1 | 2/2001 | Casper et al. |
| 6,192,282 B1 | 2/2001 | Smith et al. |
| 6,192,390 B1 | 2/2001 | Berger et al. |
| 6,195,018 B1 | 2/2001 | Ragle et al. |
| 6,198,390 B1 | 3/2001 | Schlager et al. |
| 6,199,068 B1 | 3/2001 | Carpenter |
| 6,201,962 B1 | 3/2001 | Sturniolo et al. |
| 6,205,143 B1 | 3/2001 | Lemieux |
| 6,208,247 B1 | 3/2001 | Agre et al. |
| 6,208,266 B1 | 3/2001 | Lyons et al. |
| 6,212,175 B1 | 4/2001 | Harsch |
| 6,218,953 B1 | 4/2001 | Petite |
| 6,218,958 B1 | 4/2001 | Eichstaedt et al. |
| 6,218,983 B1 | 4/2001 | Kerry et al. |
| 6,233,327 B1 | 5/2001 | Petite |
| 6,234,111 B1 | 5/2001 | Ulman et al. |
| 6,236,332 B1 | 5/2001 | Conkright et al. |
| 6,243,010 B1 | 6/2001 | Addy et al. |
| 6,246,886 B1 | 6/2001 | Oliva |
| 6,249,516 B1 | 6/2001 | Brownrigg et al. |
| 6,259,369 B1 | 7/2001 | Monico |
| 6,271,752 B1 | 8/2001 | Vaios |
| 6,275,166 B1 | 8/2001 | del Castillo et al. |
| 6,275,707 B1 | 8/2001 | Reed et al. |
| 6,286,050 B1 | 9/2001 | Pullen et al. |
| 6,286,756 B1 | 9/2001 | Stinson et al. |
| 6,288,634 B1 | 9/2001 | Weiss et al. |
| 6,288,641 B1 | 9/2001 | Casais |
| 6,295,291 B1 | 9/2001 | Larkins |
| 6,301,514 B1 | 10/2001 | Canada et al. |
| 6,304,556 B1 | 10/2001 | Haas |
| 6,305,602 B1 | 10/2001 | Grabowski et al. |
| 6,307,843 B1 | 10/2001 | Okanoue |
| 6,308,111 B1 | 10/2001 | Koga |
| 6,311,167 B1 | 10/2001 | Davis et al. |
| 6,314,169 B1 | 11/2001 | Schelberg, Jr. et al. |
| 6,317,029 B1 | 11/2001 | Fleeter |
| 6,327,245 B1 | 12/2001 | Satyanarayana et al. |
| 6,329,902 B1 | 12/2001 | Lee et al. |
| 6,334,117 B1 | 12/2001 | Covert et al. |
| 6,351,223 B1 | 2/2002 | DeWeerd et al. |
| 6,356,205 B1 | 3/2002 | Salvo et al. |
| 6,357,034 B1 | 3/2002 | Muller et al. |
| 6,362,745 B1 | 3/2002 | Davis |
| 6,363,057 B1 | 3/2002 | Ardalan et al. |
| 6,366,217 B1 | 4/2002 | Cunningham et al. |
| 6,366,622 B1 | 4/2002 | Brown et al. |
| 6,369,769 B1 | 4/2002 | Nap et al. |
| 6,370,489 B1 | 4/2002 | Williams et al. |
| 6,373,399 B1 | 4/2002 | Johnson et al. |
| 6,380,851 B1 | 4/2002 | Gilbert et al. |
| 6,384,722 B1 | 5/2002 | Williams |
| 6,392,692 B1 | 5/2002 | Monroe |
| 6,393,341 B1 | 5/2002 | Lawrence et al. |
| 6,393,381 B1 | 5/2002 | Williams et al. |
| 6,393,382 B1 | 5/2002 | Williams et al. |
| 6,400,819 B1 | 6/2002 | Nakano et al. |
| 6,401,081 B1 | 6/2002 | Montgomery et al. |
| 6,405,018 B1 | 6/2002 | Reudink et al. |
| 6,411,889 B1 | 6/2002 | Mizunuma et al. |
| 6,415,245 B2 | 7/2002 | Williams et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,665,278 B2 | 12/2003 | Grayson |
| 6,671,586 B2 | 12/2003 | Davis et al. |
| 6,674,403 B2 | 1/2004 | Gray et al. |
| 6,678,255 B1 | 1/2004 | Kuriyan |
| 6,678,285 B1 | 1/2004 | Garg |
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,859,831 B1 | 2/2005 | Gelvin et al. |
| 6,891,838 B1 | 5/2005 | Petite et al. |
| 6,900,737 B1 | 5/2005 | Ardalan et al. |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,137,550 B1 | 11/2006 | Petite |
| 7,349,682 B1 | 3/2008 | Bennett, III et al. |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |

| | | | | | | |
|---|---|---|---|---|---|---|
| 7,739,378 | B2 | 6/2010 | Petite | GB | 2352004 A | 1/2001 |
| 2001/0002210 | A1 | 5/2001 | Petite | GB | 2352590 A | 1/2001 |
| 2001/0003479 | A1 | 6/2001 | Fujiwara | JP | 60261288 A | 12/1985 |
| 2001/0021646 | A1 | 9/2001 | Antonucci et al. | JP | 01255100 A | 10/1989 |
| 2001/0024163 | A1 | 9/2001 | Petite | JP | 11353573 A | 12/1999 |
| 2001/0034223 | A1 | 10/2001 | Rieser et al. | JP | 2000113590 A | 4/2000 |
| 2001/0038343 | A1 | 11/2001 | Meyer et al. | JP | 2001063425 A | 3/2001 |
| 2002/0002444 | A1 | 1/2002 | Williams et al. | JP | 2001088401 A | 4/2001 |
| 2002/0012323 | A1 | 1/2002 | Petite et al. | JP | 2001309069 A | 11/2001 |
| 2002/0013679 | A1 | 1/2002 | Petite | JP | 2001319284 A | 11/2001 |
| 2002/0019725 | A1 | 2/2002 | Petite | JP | 2001357483 A | 12/2001 |
| 2002/0027504 | A1 | 3/2002 | Davis et al. | JP | 2002007672 A | 1/2002 |
| 2002/0031101 | A1 | 3/2002 | Petite et al. | JP | 2002007826 A | 1/2002 |
| 2002/0032746 | A1 | 3/2002 | Lazaridis | JP | 2002085354 A | 3/2002 |
| 2002/0061031 | A1 | 5/2002 | Sugar et al. | JP | 2002171354 A | 6/2002 |
| 2002/0072348 | A1 | 6/2002 | Wheeler et al. | KR | 2001025431 A | 4/2001 |
| 2002/0089428 | A1 | 7/2002 | Walden et al. | WO | WO 90/13197 | 11/1990 |
| 2002/0095399 | A1 | 7/2002 | Devine et al. | WO | WO 95/12942 | 5/1995 |
| 2002/0098858 | A1 | 7/2002 | Struhsaker | WO | WO 95/24177 | 9/1995 |
| 2002/0109607 | A1 | 8/2002 | Cumeralto et al. | WO | WO 95/34177 | 12/1995 |
| 2002/0136233 | A1 | 9/2002 | Chen et al. | WO | WO 96/10307 | 4/1996 |
| 2002/0158774 | A1 | 10/2002 | Johnson et al. | WO | WO 98/00056 | 1/1998 |
| 2002/0163442 | A1 | 11/2002 | Fischer | WO | WO 98/37528 | 8/1998 |
| 2002/0169643 | A1 | 11/2002 | Petite et al. | WO | WO 98/45717 | 10/1998 |
| 2002/0193144 | A1 | 12/2002 | Belski et al. | WO | WO 99/13426 | 3/1999 |
| 2003/0001754 | A1 | 1/2003 | Johnson et al. | WO | WO 00/23956 | 4/2000 |
| 2003/0028632 | A1 | 2/2003 | Davis | WO | WO 01/15114 | 3/2001 |
| 2003/0030926 | A1 | 2/2003 | Aguren et al. | WO | WO 01/24109 | 4/2001 |
| 2003/0034900 | A1 | 2/2003 | Han | WO | WO 02/08725 | 1/2002 |
| 2003/0036822 | A1 | 2/2003 | Davis et al. | WO | WO 02/08866 | 1/2002 |
| 2003/0046377 | A1 | 3/2003 | Daum et al. | WO | WO 02/052521 | 7/2002 |
| 2003/0058818 | A1 | 3/2003 | Wilkes et al. | WO | WO 03/007264 | 1/2003 |
| 2003/0069002 | A1 | 4/2003 | Hunter et al. | WO | WO 03/021877 | 3/2003 |
| 2003/0073406 | A1 | 4/2003 | Benjamin et al. | WO | WO 04/002014 | 12/2003 |
| 2003/0078029 | A1 | 4/2003 | Petite | | | |
| 2003/0093484 | A1 | 5/2003 | Petite | | | |
| 2003/0133473 | A1 | 7/2003 | Manis et al. | | | |
| 2003/0169710 | A1 | 9/2003 | Fan et al. | | | |
| 2003/0185204 | A1 | 10/2003 | Murdock | | | |
| 2003/0210638 | A1 | 11/2003 | Yoo et al. | | | |
| 2004/0047324 | A1 | 3/2004 | Diener | | | |
| 2004/0053639 | A1 | 3/2004 | Petite et al. | | | |
| 2004/0131125 | A1 | 7/2004 | Sanderford et al. | | | |
| 2004/0183687 | A1 | 9/2004 | Petite et al. | | | |
| 2004/0228330 | A1 | 11/2004 | Kubler et al. | | | |
| 2005/0190055 | A1 | 9/2005 | Petite | | | |
| 2005/0195768 | A1 | 9/2005 | Petite | | | |
| 2005/0195775 | A1 | 9/2005 | Petite et al. | | | |
| 2005/0201397 | A1 | 9/2005 | Petite | | | |
| 2005/0243867 | A1 | 11/2005 | Petite | | | |
| 2006/0095876 | A1 | 5/2006 | Chandra et al. | | | |
| 2009/0006617 | A1 | 1/2009 | Petite | | | |
| 2009/0243840 | A1 | 10/2009 | Petite et al. | | | |

FOREIGN PATENT DOCUMENTS

| | | | |
|---|---|---|---|
| EP | 0 749 259 | A2 | 12/1996 |
| EP | 0 749 260 | A2 | 12/1996 |
| EP | 0 766 489 | A2 | 4/1997 |
| EP | 0 768 777 | A2 | 4/1997 |
| EP | 0 812 502 | B1 | 12/1997 |
| EP | 0825577 | A1 | 2/1998 |
| EP | 0 999 717 | A2 | 5/2000 |
| EP | 1096454 | A2 | 5/2001 |
| FR | 2817110 | A1 | 5/2002 |
| GB | 2229302 | A | 9/1990 |
| GB | 2247761 | A | 3/1992 |
| GB | 2262683 | A | 6/1993 |
| GB | 2297663 | A | 8/1996 |
| GB | 2310779 | A | 9/1997 |
| GB | 2326002 | A | 12/1998 |
| GB | 2336272 | A | 10/1999 |

OTHER PUBLICATIONS

Baba et al., "Wireless Medium Access Control Protocol For CAN," 4th Int'l CAN Conf., Berlin, Germany, available at http://www.can–cia.org/fileadmin/cia/files/icc/4/baba1.pdf (1997).

Corbell et al., "Technical Implementation in Support Of The IAEA's Remote Monitoring Field Trial At The Oak Ridge Y–12 Plant," Dept. of Energy, Office of Scientific and Technical Information, Report No. Sand–096–1934C, available at http://www.osti.gov/bridge/product.biblio.jsp?query_id=1&page=0&osti_id=270678 (1996).

Corbell et al., "Technical Results Of Y–12/IAEA Field Trial Of Remote Monitoring System," Dept. of Energy, Office of Scientific and Technical Information, Report No. Sand–97–1781C, available at http://www.osti.gov/bridge/product.biblio.jsp?query_id=0&page=0&osti_id=505711 (1997).

Echelon Corp., "LonTalk® Protocol Specification," available at http://ww w.enerlon.com/JobAids/Lontalk%20Protocol%20Spec.pdf (1994).

Echelon Corp., "Series 90™–30 PLC LonWorks® Bus Interface Module User's Manual," available at http://www.pdfsupply.co m/pdfs/gfk1322a.pdf (1997).

Frank, Randy, "Understanding Smart Sensors," Artech House (1996).

Nilsen et al., "Storage Monitoring Systems For The Year 2000," Dept. of Energy, Office of Scientific and Technical Information, Report No. Sand–97–8532C, available at http://www.osti.gov/bridge/product.biblio.jsp?query_id=3&page=0&osti_id=303988 (1997).

Poor, Robert D., "Hyphos: A Self–Organizing, Wireless Network," Massachusetts Institute of Technology (Jun. 1997).

Raji, Reza S., "Control Networks and the Internet," Echelon Corp., Rev. 2.0, available at http://www.echelon.com/solutions/opensystems/papers/Control_In ternet.pdf (1998).

Ross et al., "PNC/DOE Remote Monitoring Project at Japan's Joyo Facility," Office of Scientific and Technical Information, Report No. Sand—96–1937C, available at http://www.osti.gov/bridge/product.biblio.jsp?query_id= &pa ge=0&osti_id=270680 (1996).

Saffo, Paul, "Sensors: The Next Wave of Infotech Innovation," Institute for the Future (1997).

Schneider et al., "International Remote Monitoring Project Argentina Nuclear Power Station Spent Fuel Transfer Remote Monitoring System," Dept. of Energy, Office of Scientific and Technical Information, Report No. Sand—97–1784C, available at http://www.osti.gov/bridge/product.biblio.jsp?query_id=1&page= &osti_id =505674 (1997).

Tanenbaum, Andrew S., "Computer Networks," chapters 1, 5 (3d ed. Prentice Hall 1996).

Thomas, "Extending CAN Networks By Incorporating Remote Bridging," 4th Int–CAN Conf., Berlin, Germany, available at http://www.can–cia.org/fileadm in/cia/files/icc/4/thom as.pdf (1997).

"Engineering Report—Johnson Controls Interface," ESTeem Radios (Nov. 1994).

ESTeem Application Paper—AgriNorthwest Employee's Provide Wireless Control System (describing a system that was in use prior to Mar. 1999).

ESTeem Application Paper—Allen–Bradley Goes Wireless on Alaska's North Slope (describing a system that was in use prior to Mar. 1999).

ESTeem Application Paper—Wireless Control of Polluted Water (describing a system that was in use prior to Mar. 1999).

ESTeem Application Paper—Wireless Networking for Natural Gas Extraction (describing a system that was in use prior to Mar. 1999).

ESTeem Application Paper—Build Your Own Wireless Power Distribution System (describing a system that was in use prior to Mar. 1999).

ESTeem Application Paper—Lost Cabin Gas Plant Uses Wireless Control to Enhance Production & Safety (describing a system that was in use prior to Mar. 1999).

ESTeem Application Paper—Northwest Farm Applies Wireless Solution (describing a system that was in use prior to Mar. 1999).

ESTeem Application Paper—Wireless Networking for Kodiak's Coast Guard Station (describing a system that was in use prior to Mar. 1999).

ESTeem Application Paper—Wireless Mobile Mapping System (describing a system that was in use prior to Mar. 1999).

"ESTeem Engineering Report, Johnson Controls Interface No: 91–102" (Nov. 1994).

ESTeem Models 85, 95, 96, & 98 User's Manual (describing the ESTeem 96C and 96F radios used prior to 1999).

"ESTeem Model 96C," ESTeem Radios (describing a system that was for sale at least as early as 1994).

"ESTeem Model 96F," ESTeem Radios (describing a system that was for sale at least as early as 1994).

"Site Survey Report," ESTeem Radios (Sep. 24, 1993).

"Technical Bulletin—Johnson Controls," ESTeem Radios (Jan. 29, 1998).

1997 Project Summary, Held Untethered Nodes, University of California at Los Angeles, available at http://web.archive.org/web/199812052324758/http://www.darpa.mil/leaving.asp?url=http://www.janet.ucla.edu/glomo, Jul. 25, 2008, pp. 1–5.

1997 Project Summary, Mobile Versatile Radios (MoVeR), University of California at Los Angeles, available at http://web.archive.org/web/19990222140122/http://www.darpa.mil/leaving.asp?url=http://www.janet.ucla.edu/, Jul. 25, 2008, pp. 1–4.

1997 Project Summary, Towards a Wireless Overlay Internetworking Architecture, University of California at Berkeley, available at http://web.archive.org/web/19990202065939/http://www.darpa.mil/leaving.asp?url=http://daedalus.cs.berkeley.edu, Jul. 25, 2008, pp. 1–8.

3Com Invests in Coactive Networks, *Coactive* (press release), Author: unknown, Dec. 14, 1999, pp. 1–4.

5808 Photoelectric Smoke/Heat Detector with Built–in Wireless Transmitter Installation Instructions, *ADEMCO*; Author: unknown; 1998.

*ABB Kent–Taylor Interfacing*, Author: unknown, *Engineering Report*, No. 93–011, Jun. 18, 1996, pp. 1–9.

Abbott et al., *Wireless Product Applications for Utilities, Electric Power Research Institute*, Feb. 1996, pp. 1–137.

About AES Corporation, *AES IntelliNet*, Author: unknown, available at http://web.archive.org/web/19990127093116/www.aes–intellinet.com/ae, on Mar. 5, 2009, pp. 1–2.

ADEMCO Group, 4110DL Security System, Installation Instructions, Oct. 1996, *ADEMCO Group*, Author: unknown, pp. 1–15.

ADEMCO Group, 4110XM Security System, Installation Instructions, Jul. 1996, *ADEMCO Group*, Author: unknown, pp. 1–20.

ADEMCO Group, 4120EC Security System, Installation Instructions, Nov. 1990, *ADEMCO Group*, Author: unknown, pp. 1–17.

ADEMCO Group, 4120XM Security System, Installation Instructions, Oct. 1993, *ADEMCO Group*, Author: unknown, pp. 1–80.

ADEMCO Group, 4140XMPT2 Partitioned Security System with Scheduling User's Manual, May 1993, *ADEMCO Group*, Author: unknown; pp. 1–54.

ADEMCO Group, 4281, 5881 and 5882 Series RF Receivers Installation Instructions, Oct. 1996, *ADEMCO Group*, Author: unknown; pp. 1–6.

ADEMCO Group, 5330 Alpha Console, Installation Instructions, May 90, *ADEMCO Group*, Author: unknown, pp. 1–24.

ADEMCO Group, 5706 Smoke Detector with Built–in Wireless Transmitter, Installation Instructions, Dec. 1991, *ADEMCO Group*, Author: unknown, pp. 1–8.

ADEMCO Group, 5707 Smoke Detector with Built–in Wireless Transmitter, Installation Instructions, Aug. 1992, *ADEMCO Group*, Author: unknown, pp. 1–12.

ADEMCO Group, 5715 Universal Transmitter, Installation Instructions, Mar. 1989, *ADEMCO Group*, Author: unknown, pp. 1–4.

ADEMCO Group, 5775 Passive Infrared Motion Detector/Transmitter, Installation Instructions, Jul. 1991, *ADEMCO Group*; Author: unknown; pp. 1–4.

ADEMCO Group, 58008C Photoelectronic Smoke/Detector with Built–In Wireless Transmitter Installation Instructions, 1998, *ADEMCO Group*, Author: unknown; pp. 1–4.

ADEMCO Group, 5800TM Transmitter Module Installation Instructions, Apr. 1994, *ADEMCO Group*, Author: unknown; pp. 1.

ADEMCO Group, 5801 Remote Wireless Panic Transmitter Installation Instructions, Apr. 1994, *ADEMCO Group*, Author: unknown: pp. 2.

ADEMCO Group, 5802CP Belt Clip Transmitter Installation Instructions, Nov. 1994, *ADEMCO Group*, Author: unknown; pp. 1.

ADEMCO Group, 5802MN Supervised Miniature Transmitter Installation Instructions, Jan. 1995, *ADEMCO Group*, Author: unknown; pp. 1.

ADEMCO Group, 5802MN2 Supervised Miniature Transmitter Installation Instructions, Jun. 1997, *ADEMCO Group*, Author: unknown; pp. 1.

ADEMCO Group, 5803 Wireless Key Transmitter Installation Instructions, Nov. 1994, *ADEMCO Group*, Author: unknown; pp. 2.

ADEMCO Group, 5804 Wireless Key Transmitter Installation Instructions, Jul. 1995, *ADEMCO Group*, Author: unknown; pp. 3.

ADEMCO Group, 5804BD Bi–Directional Wireless Key Installation Instructions, Apr. 1997, *ADEMCO Group*, Author: unknown; pp. 4.

ADEMCO Group, 5086 Smoke Detector with Built–In Wireless Transmitter Installation Instructions, May 1998, *ADEMCO Group*, Author: unknown; pp. 1–4.

ADEMCO Group, 5807 Smoke Detector with Built–In Wireless Transmitter Installation Instructions, May 1998, *ADEMCO Group*, Author: unknown; pp. 1–6.

ADEMCO Group, 5808 Photoelectronic Smoke/Heat Detector with Built–In Wireless Transmitter Installation Instructions, 1998, *ADEMCO Group*, Author: unknown; pp. 1–8.

ADEMCO Group, 5808 Wireless Smoke Detector, 1999, available at http://web.archive.org/web/20000118015507/www.ademco.com/ademco on Mar. 5, 2009, pp. 1–4.

ADEMCO Group, 5089 Rate–of–Rise Heat Detector/Transmitter Installation Instructions, May 1995, *ADEMCO Group*, Author: unknown; pp. 1–2.

ADEMCO Group, 5816 Door/Window Transmitter Installation Instructions, Nov. 1994, *ADEMCO Group*, Author: unknown; pp. 1–2.

ADEMCO Group, 5816TEMP Low Temperature Transmitter Installation Instructions May 1998, *ADEMCO Group*, Author: unknown; pp. 1–2.

ADEMCO Group, 5818 Recessed Transmitter, Installation Instruction, Jan. 1994, *ADEMCO Group*, Author: unknown; pp. 1–2.

ADEMCO Group, 5819 Shock Processor Transmitter Installation Instructions, May 1998, *ADEMCO Group*, Author: unknown; pp. 1–2.

ADEMCO Group, 5819 WHS Wireless Shock Sensor and Processor, 1997, available at http://web.archive.org/web/19990428164624/www.ademco.com /ademco on Mar. 5, 2009, pp. 1–1.

ADEMCO Group, 5819WHS/5819BRS Shock Processor Transmitter Installation Instructions, May 1998, *ADEMCO Group*, Author: unknown; pp. 1–2.

ADEMCO Group, 5827 Remote Wireless Keypad/Transmitter Installation Instructions, Apr. 1994, *ADEMCO Group*, Author: unknown; pp. 1.

ADEMCO Group, 5827BD and 5827BDE Wireless Bi–Directional Keypads Installation Instructions and Operating Guide, Mar. 1996, *ADEMCO Group*, Author: unknown; pp. 1–6.

ADEMCO Group, 5849 Glass Break Detector/Transmitter Installation Instructions, Oct. 1997, *ADEMCO Group*, Author: unknown; pp. 1–4.

ADEMCO Group, 5850 Glass Break Detector/Transmitter Installation Instructions, May 1998, *ADEMCO Group*, Author: unknown; pp. 1–4.

ADEMCO Group, 5890 Passive Infrared Motion Detector/Transmitter Installation Instructions, May 1998, *ADEMCO Group*, Author: unknown; pp. 1–8.

ADEMCO Group, 5890 Wireless PIR Motion Detector, 1997, available at http://web.archive.org/web/19990429054256/www.ademco.com/asc/ on Mar. 5, 2009, pp. 1–3.

ADEMCO Group, 5890PI Passive Infrared Motion Detector/Transmitter Installation Instructions, Mar. 1998, *ADEMCO Group*, Author: unknown; pp. 1–4.

ADEMCO Group, 6128RF Keypad/Receiver—full wireless capability, 1997, *ADEMCO Group*, Author: unknown, available at http://web.archive.org/web/19981206111450/www.ademco.com/ademco on Mar. 5, 2009, pp. 1–2.

ADEMCO Group, 6128RF Keypad/Transceiver, Installation Instructions, Jul. 1998, *ADEMCO Group*, Author: unknown, pp. 1–8.

ADEMCO Group, 6128RF Keypad/Transceiver, User Guide, May 1998, *ADEMCO Group*, Author: unknown, pp. 1.

ADEMCO Group, 6128WL Keypad/Receiver, Installation Instructions, Oct. 1998, *ADEMCO Group*, Author: unknown, pp. 1–8.

ADEMCO Group, 6128WL Keypad/Receiver, User Guide, Oct. 1998, *ADEMCO Group*, Author: unknown, pp. 1.

ADEMCO Group, 7715DF MicroFAST Installation Tool, User Manual, Feb. 1998, *ADEMCO Group*, Author: unknown, pp. 1–32.

ADEMCO Group, 7720 Subscriber Radio, Installation Instructions, Jan. 1992, *ADEMCO Group*, Author: unknown, available at http://www.guardian alarms.net, pp. 1–18.

ADEMCO Group, 7720NX Network Extender, 1997, *ADEMCO Group*, Author: unknown, available at http://web.archive.org/web/19990220035 932/www.ademco.com/ademco on Mar. 5, 2009, pp. 1–3.

ADEMCO Group, 7720NX Network Extender, *ADEMCO Group*, Author: unknown, 1998, pp. 1–2.

ADEMCO Group, 7720P Programming Tool, User Guide, Mar. 1992, *ADEMCO Group*, Author: unknown, available at http://www.guardianalarms.net, pp. 1–8.

ADEMCO Group, 7720Plus Subscriber Radio, Installation Instructions, Oct. 1996, *ADEMCO Group*, Author: unknown, available at http://www.guardianalarms.net, pp. 1–100.

ADEMCO Group, 7720ULF Combination Fire Control and Long Range Radio Transmitter, 1997, *ADEMCO Group*, Author: unknown, available at http://web.archive.org/web/19990501210612/www.ademco.com/ademco on Mar. 5, 2009, pp. 1–1.

ADEMCO Group, 7720ULF Subscriber Radio, Installation Instructions, Mar. 1995, *ADEMCO Group*, Author: unknown, available at http://www.guardian alarms.net, pp. 1–20.

ADEMCO Group, 7720V2 Self–Contained Long Range Radio Transmitter, 1997, *ADEMCO Group*, Author: unknown, available at http://web.archi ve.org/web/19990501212349/www.ademco.com/ademco on Mar. 5, 2009, pp. 1–4.

ADEMCO Group, 7720V2 Subscriber Radio, Installation Instructions, Jun. 1996, *ADEMCO Group*, Author: unknown, available at http://www.guardian alarms.net, pp. 1–24.

ADEMCO Group, 7810iR Internet Receiver, Installation and Setup Guide, May 2002, *ADEMCO Group*, Author: unknown, available at http://www.guardian alarms.net, pp. 1–58.

ADEMCO Group, 7820 Appendices, *ADEMCO Group*, Author: unknown, Date: unknown, available at http://www.guardian alarms.net, pp. 1–2.

ADEMCO Group, 7820 Integrated Radio Transmitter, Installation Instructions, Aug. 1995, *ADEMCO Group*, Author: unknown, available at http://www.guardian alarms.net, pp. 1–52.

ADEMCO Group, 7825 Outdoor Antenna with Bracket, Installation Instructions, Feb. 1995, *ADEMCO Group*, Author: unknown, available at http://www.guardian alarms.net, pp. 1–2.

ADEMCO Group, 7830R SafetyNet Subscriber Radio, Installation Instructions, Jun. 1996, *ADEMCO Group*, Author: unknown, available at http://www.guardian alarms.net, pp. 1–32.

ADEMCO Group, 7830R Subscriber Transmitter, 1997, available at http://web.archive.org/web/1999050125427/www.ademco.com/ademco on Mar. 5, 2009, pp. 1–3.

ADEMCO Group, 7835C Cellular Control Channel Transceiver, Installation and Setup Guide, Sep. 1998, *ADEMCO Group*, Author: unknown, available at http://www.guardian alarms.net, pp. 1–32.

ADEMCO Group, 7835C Cellular SafetyNet Subscriber Radio Transceiver, 1997, *ADEMCO Group*, Author: unknown, available at http://web.archive.org/web/19990801221202/www.ademco.com/ on Mar. 5, 2009, pp. 1–3.

ADEMCO Group, 7845C Cellular Control Channel Transceiver, Installation and Setup Guide, Sep. 1990, *ADEMCO Group*, Author: unknown, available at http://www.guardian alarms.net, pp. 1–104.

ADEMCO Group, 7845CZ Seven Zone Cellular Control Channel Transceiver, Installation and Setup Guide, Sep. 2001, *ADEMCO Group*, Author: unknown, available at http://www.guardian alarms.net, pp. 1–64.

ADEMCO Group, 7845i Internet Communications Module, Installation and Setup Guide, May 2002, *ADEMCO Group*, Author: unknown, available at http://www.guardian alarms.net, pp. 1–42.

ADEMCO Group, 7920SE 900MHz Fully Synthesized Transceiver, 1997, *ADEMCO Group*, Author: unknown, available at http:web.archive.org/ web/19990501222639/www.ademco.com/ on Mar. 5, 2009, pp. 1–3.

ADEMCO Group, 7920SE Transceiver, Installation Instructions, Apr. 1995, *ADEMCO Group*, Author: unknown, available at http://www.guardian alarms.net, pp. 1–80.

ADEMCO Group, ADEMCO World Leader in Home Security Products, 1997, *ADEMCO Group*, Author: unknown, available at http://web.archi ve.org/web/19990428164624/www.ademco.com/ademco on Mar. 5, 2009, pp. 1–2.

ADEMCO Group, AlarmNet Introduces Control Channel Cellular for Commercial Fire/Burglary Applications, *ADEMCO Group*, (press release), Aug. 31, 1999, available at http://web.arquive.org/web/20000119053724/www.ademco.com/pr0831 on Mar. 31, 2009, pp. 1.

ADEMCO Group, AlarmNet, 1997, *ADEMCO Group*, Author: unknown, available at http://web.archive.org/web/19990420234130/www.ademco.c om/ademco on Mar. 5, 2009, pp. 1–3.

ADEMCO Group, Alpha Vista No. 5130XT Security System, Installation Instructions, Mar. 1989, *ADEMCO Group*, Author: unknown, pp. 1–96.

ADEMCO Group, Compass Network Downloader, *ADEMCO Group*, Author: unknown, Date: unknown, available at http://www.guardianalar ms.net pp. 1–109.

ADEMCO Group, Compass, 1997, *ADEMCO Group*, Author: unknown, available at http://web.archive.org/web/19990209094401/www.ademco.c om/ademco on Mar. 5, 2009, pp. 1–3.

ADEMCO Group, Control/Communicator 5110XM, Installation Instructions, Apr. 1996, *ADEMCO Group*, Author: unknown, pp. 1–76.

ADEMCO Group, Fire Alarm Control/Communicator Model 5110XM User's Manual, Apr. 1996, *ADEMCO Group*, Author: unknown; pp. 1–30.

ADEMCO Group, Fire and Burglary System Model 5120XM User's Manual, Jun. 1996, *ADEMCO Group*, Author: unknown; pp. 1–40.

Ademco Group, Home Page, *ADEMCO Group*, Author: unknown, available at http://web.archive.org/web/19961023204954/http://ademco.c om/ on Mar. 5, 2009, pp. 1.

ADEMCO Group, Lynx—Quick Install Security System, 1997, *ADEMCO Group*, Author: unknown, available at http://web.archive.org/web/19990116225005/www.ademco.com/ademco on Mar. 5, 2009, pp. 1–3.

ADEMCO Group, Lynx Quick Star Guide, Oct. 1998, *ADEMCO Group*, Author: unknown, pp. 1–4.

ADEMCO Group, Lynx Security System Programming Form & Summary of Connections, Oct. 1998, *ADEMCO Group*, Author: unknown, pp. 1–16.

ADEMCO Group, Lynx Security System User Guide, Oct. 1998, *ADEMCO Group*, Author: unknown; pp. 1–40.

ADEMCO Group, Lynx Security System, Installation and Setup Guide, Oct. 1998, *ADEMCO Group*, Author: unknown, pp. 1–48.

ADEMCO Group, Powerline Carrier Device Modules, 1997 *ADEMCO Group*, Author: unknown, available at http://web.archive.org/web/199902 18035115/www.ademco.com/ademco on Mar. 5, 2009, pp. 1–2.

ADEMCO Group, Remote Keypads 6128, 6137, 6137R, 6138, 6139 & 6139R, Installation Guide, Aug. 1998, *ADEMCO Group*, Author: unknown, pp. 1–2.

ADEMCO Group, Security System Model 4110DL Programming Form, Oct. 1996, *ADEMCO Group*, Author: unknown, pp. 1–8.

ADEMCO Group, Security System Model 4110XM Programming Form, Jul. 1996, *ADEMCO Group*, Author: unknown, pp. 1–4.

ADEMCO Group, Security System Model 4120EC Programming Form, Sep. 1993, *ADEMCO Group*, Author: unknown, pp. 1–2.

ADEMCO Group, Security System Model 4120XM Programming Form, Sep. 1992, *ADEMCO Group*, Author: unknown, pp. 1–4.
ADEMCO Group, Security System Model 4130XM, 4140XM, 5130XM Programming Form, *ADEMCO Group*, Author: unknown, Date: unknown, pp. 1–4.
ADEMCO Group, Security System Model 4130XT/4140/5130XT Programming Form, Jul. 1989, *ADEMCO Group*, Author: unknown, pp. 1–2.
ADEMCO Group, Security System Model 4140XMP Programming Form, Jan. 1992, *ADEMCO Group*, Author: unknown, pp. 1–4.
ADEMCO Group, Security System Model 4140XMPT Programming Form, *ADEMCO Group*, Author: unknown, Date: unknown, pp. 1.
ADEMCO Group, Security System Model 4140XMPT2 Programming Form, Apr. 1996, *ADEMCO Group*, Author: unknown, pp. 1–4.
ADEMCO Group, Security System Model 5110XM Programming Form, Apr. 1996, *ADEMCO Group*, Author: unknown, pp. 1–4.
ADEMCO Group, Security System Model 5120XM Programming Form, Jun. 1996, *ADEMCO Group*, Author: unknown, pp. 1–4.
ADEMCO Group, Security System Model 5140XM Programming Form, Jun. 1993, *ADEMCO Group*, Author: unknown, pp. 1–4.
ADEMCO Group, Security System Model Vista–10 Programming Form, Sep. 1994, *ADEMCO Group*, Author: unknown, pp. 1–4.
ADEMCO Group, Security System Model Vista–$10_{SE}$ Programming Guide, Apr. 1997, *ADEMCO Group*, Author: unknown, pp. 1–24.
ADEMCO Group, Security System Model Vista–128B Commercial Burglary Partitioned Security System with Scheduling, Quick Start Guide, Jul. 1998, *ADEMCO Group*, Author: unknown, pp. 1–39.
ADEMCO Group, Security System User's Manual, Sep. 1996, *ADEMCO Group*, Author: unknown; pp. 1–88.
ADEMCO Group, The Vista–100 Series, 1997, *ADEMCO Group*, Author: unknown, available at http://web.archive.org/web/19970620010543/ www.ademco.com/ademco on Mar. 5, 2009, pp. 1–7.
ADEMCO Group, The Vista–10SE, 1997, *ADEMCO Group*, Author: unknown, available at http://web.archive.org/web/19990502214402/ www.ademco.com/ademco on Mar. 5, 2009, pp. 1–4.
ADEMCO Group, via16 Programming Form, Jul. 1993, *ADEMCO Group*, Author: unknown, pp. 1–2.
ADEMCO Group, Via–16 Security System, Installation Instructions, Jan. 1992, *ADEMCO Group*, Author: unknown, pp. 1–24.
ADEMCO Group, Via–30+, Vista 10, 4111XM Security System User's Manual, Jul. 1994, *ADEMCO Group*, Author: unknown, pp. 1–44.
ADEMCO Group, Via–30PSE and Vista–$10_{SE}$ Security System User's Manual, Jan. 1997, *ADEMCO Group*, Author: unknown; pp. 1–88.
ADEMCO Group, Via–$30P_{SE}$ Security System, Programming Guide, Apr. 1997, *ADEMCO Group*, Author: unknown, pp. 1–24.
ADEMCO Group, Vista 4120XM and 4140XMP Security System User's Manual, Jan. 1994, *ADEMCO Group*, Author: unknown; pp. 1–60.
ADEMCO Group, Vista 4130XT Security System, Installation Instructions, Oct. 1988, *ADEMCO Group*, Author: unknown, pp. 1–84.
ADEMCO Group, Vista 4140XMPT2 Partitioned Security System with Scheduling, Installation Instructions, May 1993, *ADEMCO Group*, Author: unknown, pp. 1–68.
ADEMCO Group, Vista 5140XM Commercial Fire and Burglary Alarm System, Installation Instructions, Jun. 1993, *ADEMCO Group*, Author: unknown, pp. 1–74.
ADEMCO Group, Vista AT 4140 Security System, Installation Instructions, Sep. 1988, *ADEMCO Group*, Author: unknown, pp. 1–68.
ADEMCO Group, Vista Series 4120EC Security System User's Manual, Sep. 1992, *ADEMCO Group*, Author: unknown; pp. 1–28.
ADEMCO Group, Vista Series 4130XM, 5130XM, 4140XMP Security System User's Manual, Feb. 1992, *ADEMCO Group*, Author: unknown; pp. 1–32.
ADEMCO Group, Vista Series 4140XMP, Installation Instructions, Jan. 1992, *ADEMCO Group*, Author: unknown, pp. 1–52.
ADEMCO Group, Vista Series 4140XMPT/4140XMPT–UL Partitioned Security System User's Manual, Jun. 1993, *ADEMCO Group*, Author: unknown; pp. 1–32.
ADEMCO Group, Vista Series 5140XM User's Manual, Aug. 1992, *ADEMCO Group*, Author: unknown; pp. 1–28.
ADEMCO Group, Vista Series Partitioned Security Systems Model 4140XMPT, Installation Instructions, Feb. 1992, *ADEMCO Group*, Author: unknown, pp. 1–60.
ADEMCO Group, Vista XM Series 4140XM, 5130XM, 4130XM, Installation Instructions, Jul. 1990, *ADEMCO Group*, Author: unknown, pp. 1–26.
ADEMCO Group, Vista XM Series, Installation Instructions, *ADEMCO Group*, Author: unknown, Oct. 1991, pp. 1–16.
ADEMCO Group, Vista–10 Security System, Installation Instructions, Sep. 1994, *ADEMCO Group*, Author: unknown, pp. 1–56.
ADEMCO Group, Vista–100 Commercial Fire & Burglary Alarm System User's Manual, Nov. 1995, *ADEMCO Group*, Author: unknown; pp. 1–66.
ADEMCO Group, Vista–100 Commercial Fire & Burglary Alarm System with Scheduling Quick Start, Apr. 1996, *ADEMCO Group*, Author: unknown; pp. 1–24.
ADEMCO Group, Vista–100 Commercial Fire and Burglary Partitioned Security System with Scheduling, Installation Instructions and Programming Guide, Jan. 1998, *ADEMCO Group*, Author: unknown, pp. 1–233.
ADEMCO Group, Vista–$10_{SE}$, Installation Instructions, May 1997, *ADEMCO Group*, Author: unknown, pp. 1–88.
ADEMCO Group, Vista–128B Commercial Burglary Partitioned Security System with Scheduling, Installation and Setup Guide, Jul. 1998, *ADEMCO Group*, Author: unknown, pp. 1–252.
ADEMCO Group, Vista–128FB Commercial Fire and Burglary Partitioned Security System User Guide, Oct. 1998, *ADEMCO Group*, Author: unknown; pp. 1–80.
ADEMCO Group, Vista–128FB Commercial Fire and Burglary Partitioned Security System with Scheduling, Installation and Setup Guide, Oct. 1998, *ADEMCO Group*, Author: unknown, pp. 1–220.

ADEMCO Group, Vista–20 2–Partitioned Security System, Installation Instructions, Nov. 1995, *ADEMCO Group*, Author: unknown, pp. 1–120.

ADEMCO Group, Vista–20 2–Partitioned Security System, Programming Form, Apr. 1996, *ADEMCO Group*, Author: unknown, pp. 1–8.

ADEMCO Group, Vista–20 Security System User's Manual, Apr. 1995, *ADEMCO Group*, Author: unknown; pp. 1–52.

ADEMCO Group, Vista–20HW 2–Partitioned Security System, Installation Instructions, Apr. 1996, *ADEMCO Group*, Author: unknown, pp. 1–100.

ADEMCO Group, Vista–20HW 2–Partitioned Security System, Programming Form, Apr. 1996, *ADEMCO Group*, Author: unknown, pp. 1–8.

ADEMCO Group, Vista–20HW$_{SE}$ 2–Partitioned Security System, Installation Instructions, Aug. 1997, *ADEMCO Group*, Author: unknown, pp. 1–84.

ADEMCO Group, Vista–20HW$_{SE}$ 2–Partitioned Security System, Programming Form, Aug. 1997, *ADEMCO Group*, Author: unknown, pp. 1–8.

ADEMCO Group, Vista–20$_{SE}$ 2–Partitioned Security System, Installation Instructions, Aug. 1997, *ADEMCO Group*, Author: unknown, pp. 1–100.

ADEMCO Group, Vista–20$_{SE}$ 2–Partitioned Security System, Programming Form, Aug. 1997, *ADEMCO Group*, Author: unknown, pp. 1–8.

ADEMCO Group, Vista–20$_{SE}$/Vista–20HW$_{SE}$ Security System User's Manual, Jun. 1997, *ADEMCO Group*, Author: unknown; pp. 1–52.

ADEMCO Group, Vista–30P$_{SE}$ Security System, Installation Instructions, Apr. 1997, *ADEMCO Group*, Author: unknown, pp. 1–104.

ADEMCO Group, Vista–40 2–Partition Security System, Programming Guide, Jul. 1998, *ADEMCO Group*, Author: unknown, pp. 1–24.

ADEMCO Group, Vista–40 2–Partitioned Security System, Installation and Setup Guide, Jul. 1998, *ADEMCO Group*, Author: unknown, pp. 1–380.

ADEMCO Group, Vista–40 Programming Guide, Jun. 1997, *ADEMCO Group*, Author: unknown, available at http://www.guardianalarms.net, pp. 1–20.

ADEMCO Group, Vista–40 Security System User's Guide, Jul. 1998, *ADEMCO Group*, Author: unknown, pp. 1–60.

ADEMCO Group, Vista–50, Vista–50UL Security System, Nov. 1994, *ADEMCO Group*, Author: unknown, pp. 1–66.

ADEMCO Group, Vista–50P, Vista–50PUL Partitioned Security System with Scheduling, Installation Instructions and Programming Guide, Oct. 1997, *ADEMCO Group*, Author: unknown, pp. 1–199.

ADEMCO Group, Vista–50P, Vista–50PUL Security System User's Manual, Jul. 1995, *ADEMCO Group*, Author: unknown, pp. 1–66.

ADEMCO Group, Vista–50P, Vista–50PUL, Partitioned Security System with Scheduling, Quick Start, Aug. 1995, *ADEMCO Group*, Author: unknown, pp. 1–28.

ADEMCO Group, Vista–AT Security System User's Manual, Sep. 1988, *ADEMCO Group*, Author: unknown, pp. 1–56.

ADEMCO Group, V–Link Downloading Software User's Guide, Jun. 1994, *ADEMCO Group*, Author: unknown, available at http://guardianala rms.net, pp. 1–126.

ADEMCO Group, V–Plex Security Technology, 1997, *ADEMCO Group*, Author: unknown, available at http://web.archive.org/web/1999042111 0527/www.ademco.com/ademco on Mar. 5, 2009, pp. 1–6.

ADEMCO Group, Wireless Transmitters/Receivers: 5700 Wireless Transmitters, 1997, *ADEMCO Group*, Author: unknown, available at http://web.archive.org/web/199901271 20423/www.ademco.com/ademco on Mar. 5, 2009, pp. 1–2.

ADEMCO Group, Wireless Transmitters/Receivers: 5800 Wireless Transmitters, 1997, *ADEMCO Group*, Author: unknown, available at http://web.archive.org/web/1999021818 1254/www.ademco.com/ademco on Mar. 5, 2009, pp. 1–2.

ADEMCO Group, Wireless User Interface Devices, 1997, *ADEMCO Group*, Author: unknown, available at http://web.archive.org/web/19990421190353/www.ademco.com/ademco on Mar. 5, 2009, pp. 1–4.

AES • 7700 Central Station, Installation & Operation Manual, Document 40–0551u, *AES Corporation*, Author: unknown, Dec. 1996, pp. 1–40.

AES • *Intelli*Guard 7470, *AES IntelliNet*, Author: unknown, Nov. 2003, pp. 1–15.

AES • *IntelliNet* Theory of Operation, *AES IntelliNet*; Author: unknown, Dec. 1996, downloaded from http://www.guardianalarms.net, pp. 1–18.

AES • *Intelli*Net Wireless Network Glossary of Terms, document 40–0551u, *AES IntelliNet*, Author: unknown, Dec. 1996, pp. 1–15.

AES 700 Smart Central Station InstaCentral Station Installation & Operation Manual, Document No. 40–0551e, *AES Intellinet*, Author: unknown; Nov. 20, 1996, pp. 1–57.

AES 7067 IntelliTap–II Digital Dialer Interface: A Supplemental Alarm Supporting Device, *AES IntellNet*, Author: unknown; Aug. 5, 2004, pp. 1–4.

AES 7099 Central Station Installation & Operation Manual, Document No. 40–0050, *AES Intellinet*, Author: unknown; 1998, pp. 1–20.

AES 7450 RF Subscriber Unit Installation Manual, *AES IntelliNet*, Author: unknown; Jun. 21, 2000, pp. 1–8.

AES 7750–F RF Smart Subscriber Unit Version 2, Including 7750–F–4×4 and 7750–F–8, Installation & Operation Manual, *AES IntelliNet*, Author: unknown, Apr. 2001 (Updated Nov. 2003), pp. 1–60.

AES 7750–F RF Smart Subscriber Unit Version 2, Installation & Operation Manual, *AES IntelliNet*, Author: unknown, Aug. 2000, pp. 1–30.

AES Central Alarm Monitoring, Author: unknown, available at http://web.archive.org/web/19990225163745/www.aes–intellinet.com/ae, on Mar. 5, 2009, pp. 1–3.

AES *IntelliNet* Model 7440 & 7440–XL RF Subscriber Unit, *Addendum, AES Intellinet*, Author: unknown, Aug. 29, 2002, pp. 1.

AES *Intelli*Net 7450 *Addendum, AES Corporation*, Author: unknown, Jul. 9, 2002, pp. 1–2.

AES *Intelli*Net Dealer's List By State, Author: unknown, available at http://web.archive.org/web/20010216234026/www.aes–intellinet.com/list on Mar. 5, 2009, pp. 1–13.

AES *IntelliNet* Model 7003 Central Station, Installation & Operation Manual, *AES IntelliNet*, Author: unknown, Jan. 9, 2001, available at www.guardianalarms.net, pp. 1–25.

AES IntelliNet Model 7050, 7750, Subscriber Unit, Version 1.62, Installation & Operation Manual, *AES IntelliNet*, Author: unknown, Dec. 1996, available at www.guardianalarms.net, pp. 1–110.

AES IntelliNet Model 7050–E & 7750–E, RF Subscriber Unit, Version 1.71, Installation & Operation Manual, *AES IntelliNet*, Author: unknown, Feb. 24, 1997, available at www.guardianalarms.net, pp. 1–54.

AES IntelliNet Model 7050–E Radio Subscriber Unit Installation Manual, *AES IntelliNet*, Author: unknown, Jul. 17, 2000, available at www.guardianalarms.net, pp. 1–4.

AES IntelliNet Net 77 Version 1.48.30, Installation & Operation Manual, Document 40–0551u, *AES Corporation*, Author: unknown, Jun. 1999, pp. 1–30.

AES IntelliNet Net 77 Version 1.48.4, Installation & Operation Manual, Document 40–0551u, *AES Corporation*, Author: unknown, Nov. 2000, pp. 1–36.

AES IntelliNet Net7K Version 1.48.4, Installation & Operation Manual, Document 40–0551, *AES Corporation*, Nov. 2000, pp. 1–36.

AES IntelliNet Radio Communication Subscriber Unit 7050, Sep. 16, 1997, available at http://web.archive.org/web/1999020361203/www.aes–intellinet.com/sp on Mar. 5, 2009, pp. 1–2.

AES IntelliNotes Universal Serial Data Interface/ USDI, Bulletin No. 55, *AES Corporation*, Author: unknown, Apr. 5, 2001, pp. 1–12.

AES IntelliTAP Model 7068, Version 1.08, Installation Guide, *AES IntelliNet*, Author: unknown, Jun. 15, 2000, pp. 1–11.

AES IntelliTRAK 7555–RT GPS Based Vehicle Tracking Unit, Version 2.12, *AES IntelliNet*, Author: unknown, Nov. 6, 2002, pp. 1–16.

AES IntelliTRAK 7555–RT GPS Based Vehicle Tracking Unit, Version 2.0a, *AES IntelliNet*, Author: unknown, Feb. 20, 2001, pp. 1–16.

AES Net7000, Installation & Operation Manual, *AES IntellNet*, Author: unknown; Nov. 24, 1996, pp. 1–76.

AES Net77 Wireless Network Management Software Installation & Operation ManuCentral Station Manual, Section 3, *AES Intellinet*; Author: unknown; Dec. 1996, pp. 1–87.

AES UL/ULC System Configuration, *AES Corporation*, Author: unknown, May 1, 2003, pp. 1.

Agre et al., Autoconfigurable Distributed Control Systems, *ISADS*, Apr. 25–27, 1995, pp. 162–168.

Agre et al., Development Platform for Self–Organizing Wireless Sensor Networks, *UCLA, Rockwell Science Center*; Date: unknown, pp. 1–25.

Agre et al., *Development Platform for Self–Organizing Wireless Sensor Networks*, Publisher: unknown, Date: unknown; pp. 1–10.

Agre et al., *Development Platform for Self–Organizing Wireless Sensor Networks, SPIE*, vol. 3713, Apr. 1999, pp. 257–268.

Agre et al., Technical and Management Proposal for Adaptive Wireless Arrays for Interactive Reconnaissance, Surveillance and Target Acquisition in Small Unit Operations (AWAIRS), Defense Advanced Research Projects Agency Broad Agency Announcement 96–26, UCLA, Date: unknown, pp. 1–50.

AlarmLink, Inc., *A Brief History*, available at http://www.alarmlink.com/ Default.aspx?tabid=28, on Mar. 23, 2009, pp. 1.

AlarmLink, Inc., *Alarm Over IP Products*, available at http://www.alarmlink.com/ Default.aspx?tabid=38, on Mar. 24, 2009, pp. 1.

AlarmLink, Inc., *Central Stations*, available at http://www.alarmlink.com /Default.aspx?tabid=35, on Mar. 24, 2009, pp. 1–3.

AlarmLink, Inc., *Home Page*, available at http://www.alarmlink.com/, on Mar. 24, 2009, pp. 1–2.

AlarmLink, Inc., *MeshWorks of Los Angeles*, available at http://www.alarmlink.com/Default.aspx?tabid=39, on Mar. 24, 2009, pp. 1.

AlarmNet–C Service Shutdown, *Honneywell, Inc.*, Author: unknown, Date: unknown, pp. 1.

*Allen–Bradley Interfacing*, Author: unknown, *Engineering Report*, No. 90–023, Jul. 21, 1999, pp. 1–11.

Alwan et al., Adaptive Mobile Multimedia Networks, IEEE Personal Communications, Apr. 1996, pp. 34–51.

American National Standards Institute, Inc., *ANSI C12.18–1996: Protocol Specification for ANSI Type 2 Optical Port, National Electrical Manufactures Association*, 1996.

American National Standards Institute, Inc., *ANSI C12.19–1997: Utility Industry End Device Data Tables, National Electrical Manufactures Association*, 1997.

Amir, *The Riochet System Architecture*, available at http://www.lariat.or g/B erkeley/node2.html, on May 1996, pp. 1–5.

Amir et al., An Evaluation of the Metricom Ricochet Wireless Network, CS 294–7 Class Project, Department of Electrical Engineering and Computer Science of the University of California at Berkeley, Publisher: unknown, May 7, 1996, pp. 1–20.

Amir, The Ricochet System Architecture (May 7, 1996), available at http://www.lariat.org/Berkeley/node2.html, Sep. 17, 2009, pp. 1–4.

*AN/TSQ–129 Position Location Reporting System (PLRS)*, Author: unknown, available at http://www.fas.org/man/dod–101/sys/land/plrs.htm on Feb. 22, 2010, pp. 1–3.

Asada et al., Low Power Wireless Communication and Signal Processing Circuits for Distributed Microsensors; Proceedings of the International Circuits and Systems Symposium, ISCAS '97; *UCLA, Rockwell Science Center*; Jun. 1997, pp. 1–5.

Asada, Wireless Integrated Network Sensors (WINS), *UCLA, SPIE* vol. 3673, Mar. 1999, pp. 11–18.

Asada et al., Wireless Integrated Network Sensors: Low Power Systems on a Chip, *UCLA, Rockwell Science Center*; Date: unknown, pp. 1–24.

Asada et al., *Wireless Integrated Network Sensors: Low Power Systems on a Chip, UCLA*, 1998, pp. 1–16.

Asada et al., *Wireless Integrated Sensors Network: Low Power Systems on a Chip*, Publisher: unknown, Date: unknown, pp. 1–8.

Atlanta Building News, The Voice of the Greater Atlanta Home Builders Association, vol. 7, No. 5, May 2006, pp. 1–60.

Bagby, Calypso Ventures Inc.—WLAN background, 2 pages.

Baker et al., The Architectural Organization of a Mobile Radio Network via a Distributed Algorithm, *IEEE*; Nov. 1981, pp. 1694–1701.

Ball et al., Reliability of Packet Switching Broadcast Radio Networks, IEEE Transactions on Circuits and Systems, vol. CAS–23, No. 12, Dec. 1976, pp. 806–813.

Bapna et al., Antenna Pointing for High Bandwidth Communications from Mobile Robots, *Paper, Field Robotics Center, The Robotics Institute, Carnegie Mellon University*, Date: unknown, pp. 1–6.

*Barrington Interface*, Author: unknown, *Engineering Report*, No. 90–013, Revised: Oct. 1994, pp. 1.

Beech et al., *AX.25 Link Access Protocol for Amateur Packet Radio*, Version 2.2, *American Relay & Tucson Amateur Packet Radio Corporation*, Jul. 1993, Revised Jul. 1998, pp. 1–143.

BGE, 5743 Wireless Dual Switch™ Glass Break Detector, Installation and Operating Instructions, *BGE*, Author: unknown; Date: unknown, pp. 1–2.

BGE, 5746 Wireless Audio Switch™ Glass Break Detector, Installation and Operating Instructions, *BGE*, Author: unknown; Date: unknown, pp. 1–10.

Bhatnagear et al., Layer netNet: A New Self–Organizing Network Protocol, *Dept. of Electrical Engineering, SUNY; IEEE*; 1990, pp. 1–5.

Black, Lutron RF Technology, Reliable, First, Forward Thinking, *Lutron Electronics Co. Inc.*, Aug. 2006, pp. 1–16.

Blaney, HomeRF™ Working Group, $4^{th}$ Liaison Report, *IEEE* 802.11–98/360, Nov. 1998, Slides 1–12.

Brain, *How Motes Work: Ad hoc Networks*, available at http://computer.h owstuffworks.com/mote3.htm on Feb. 25, 2010, pp. 1–3.

Brain, *How Motes Work*, available at http://computer.howstuffworks.co m/mote.htm, on Feb. 25, 2010, pp. 1–2.

Brain, *How Motes Work: The Basic Idea*, available at http://compute r.howstuff works.com/motel.htm, on Feb. 25, 2010, pp. 1–2.

Brain, *How Motes Work: Typical Applications*, available at http://compute r.howstuff works.com/mote2.htm, on Feb. 25, 2010, pp. 1–2.

Brain, *How Motes Work: A Typical Mote*, available at http://compute r.howstuff works.com/mote4htm, on Feb. 25, 2010, pp. 1–2.

Brayer, Implementation and Performance of Survivable Computer Communication with Autonomous Decentralized Control, IEEE Communications Magazine, Jul. 1983, pp. 34–41.

*Bristol Babcock Interfacing*, Author: unknown, *Engineering Report*, No. 95–001, Revised: Apr. 17, 1996, pp. 1–4.

Brownrigg et al., Development of a Packet–Switching Network for Library Automation, Proceedings of The National Online Meeting Apr. 12–14, 1983), pp. 67–74.

Brownrigg et al., Electrons, Electronic Publishing, and Electronic Display, Information Technology and Libraries (Sep. 1985), pp. 201–207.

Brownrigg et al., Implementing Library Automation Plans in a University Computing Environment, Planning for Computing in Higher Education 5, EDUCOM Series in Computing and Telecommunications in Higher Education, 1980, pp. 215–225.

Brownrigg et al., Online Catalogues: Through a Glass Darkly, Information Technology and Libraries, Mar. 1983, pp. 104–115.

Brownrigg et al., Packet Radio for Library Automation, Information Technology and Libraries 3 (Sep. 1984), pp. 229–244.

Brownrigg et al., Packet Radio Networks; Architectures, Protocols, Technologies and Applications (1987), (introduction pp. ix–xviii); pp. 3–274.

Brownrigg et al., Packet Switching and Library Automation: A Management Perspective, Proceedings of the $45^{th}$ ASIS Annual Meeting Oct. 17–21, 1982, vol. 19, pp. 54–57.

Brownrigg et al., Technical Services in the Age of Electronic Publishing, Library Resource & Technical Services, Jan./Mar. 1984, pp. 59–67.

Brownrigg, The Organization of Computer Resources into a Packet Radio Network, *IEEE*, Jan. 1977, vol. Com–25 No. 1, pp. 169–178.

Brownrigg et al., User Provided Access to the Internet, available at http://web.simmons.edu/~chen/nit/NIT'92/033–bro.htm, Jun. 9, 2005, pp. 1–6.

Brownrigg, Continuing Development of California State Radio Packet Project, Proceedings of the ASIS 1992 Mid–Year Meeting (Silver–Spring, MD: American Society for Information Science, 1992), pp. 97–100.

Bruninga, A Worldwide Packet Radio Network, Signal, vol. 42, No. 10, Jun. 1988, pp. 221–230.

Bryan, *Man–Portable Networked Sensor System*, Publisher: unknown, Date: unknown, pp. 1–10.

Bult et al., A Distributed, Wireless MEMS Technology for Condition Based mMaintenance, *EED, Defense Technical Information Center, UCLA, Electrical Engineering Department, Rockwell Science Center*; Apr. 22–26, 1996.

Bult et al., *A Distributed, Wireless MEMS Technology for Condition Based Maintenance*, Publisher: unknown; Nov. 1997, pp. 1–8.

Bult et al. Low Power Systems for Wireless Microsensors, UCLA Electrical Engineering Department, 1996 ISLPED, pp. 1–5.

Bult et al., Low Power Systems for Wireless Microsensors, EED, *UCLA; ILSPED*; 1996, pp. 1–15.

Bult et al., Wireless Integrated Microsensors, *EED, UCLA Electrical Engineering Department, Rockwell Science Center, TRF*; Jun. 6, 1996, pp. 205–210.

Caddx Controls, Inc., NetworX Caddx NetworX NX–8 Control/Communicator Installation Manual, *Caddx Controls*; Author: unknown; 1996Jul. 15, 1999, pp. 1–116.

Caddx Installation Instructions Package, document No. 466–1786,*Caddx Installation Controls, Inc., Caddx Controls*; Author: unknown; Aug. 1998, pp. 1–58.

Caddx–Caddi Controls, Inc., Ranger 9000E, *User's Manual*, downloaded from http://www..guardian alarms.net, May 17, 1996, pp. 1–9.

Carlisle, Edison's Netcomm Project (Sep. 1988), 1989 IEEE, pp. B5–1 to B5–4.

Case Study: Genentech Uses Coactive's Technology to Centralize Monitor and Control Functions in a Mixed Legacy and New Equipment Environment, *Coactive*, Author: unknown, 1998, pp. 1–4.

Case Study: Ingham Regional Medical Center Uses Coactive Technology to Monitor and Control Critical Power Generations in a Multi–Campus Environment, *Coactive*, 1998, pp. 1–4.

Chen, Emerging Home Digital Networking Needs, *Paper, DSP Solutions R&D Center, Texas Instruments*, Inc., pp. 1–6.

Chen et al., Route Optimization and Location Updates for Mobile Hosts, 1996 IEEE, Proceedings of the $16^{th}$ ICDCS, pp. 319–326.

Circon Systems Partners with Coative Networks to Deliver Circon WebControl™, *Coactive* (press release), Author: unknown; Feb. 7, 2000, pp. 1–4.

Circon Technology Connects Building Management Systems to the Internet Using Coactive Routers, *Coactive* (press release); Author: unknown; May 20, 1997.

Circon Technology Connects Building Management Systems to the Internet Using Coactive Routers, *Coactive* (press release), Author: unknown, May 20, 1997, pp. 3.

Cisco Systems, Inc., Enhanced Interior Gateway Routing Protocol, Cisco Systems, Inc., Updated Sep. 9, 2005, pp. 1–44.

Cisco's John Chambers Discusses the Internet Consumer Revolution at CES Using Demo Based on Echelon's LonWorks Technology, *Home Toys* (press release); Author: unknown; Jan. 8, 1999, available at http://hometoy s.com/htinews/dec98/releases/echelon04.htm on Apr. 22, 2009, pp. 1–6.

Cisco Systems, RFC1812–Requirements for IP Version 4 Routers, Fred Baker ed. (Jun. 1995), available at http://www.faqs.org/rfcs/rfc1812.html, Sep. 14, 2009, pp. 1–129.

Clare et al., Self–Organizing Distributed Sensor Networks, *EED, UCLA, Rockwell Science Center*; Date: unknown, pp. 1–9.

Clare, Awairs Progress Review: Planned Milestones, *UCLA: Rockwell Science Center*, Nov. 20, 1998, pp. 1–12.

Clement, Scada System Using Packet Radios Helps to Lower Cincinnati's Telemetry Costs, *Water/ Engineering & Management*, Aug. 1996, pp. 18–20.

Cleveland, Performance and Design Considerations for Mobile Mesh Networks, Milcom '96 Conference Proceedings, vol. 1 of 3, Oct. 22–24, 1996, pp. 245–249.

*Clever Solutions—Metricom offers wireless data networks—includes related articles on Metricom's technology and the SONeTech company—Company Profile*, available at http://findarticles.com/p/articles/mi_m0REL/is_n 11_v93/ai_147 70465/?tag=content;coll, on Nov. 22, 1993 (3 pages).

Coactive Bridges Gap between Control Systems and Corporate Data Networks with New Off–the–Shelf Router Family, *Coactive* (press release); Author: unknown; Jun. 8, 1998.

Coactive Enhances Residential Getaway to Enable Multiple Home Networks, *Coactive* (press release), Author: unknown, Jan. 6, 2000, pp. 1–4.

Coactive Joins 3Com to Demonstrate Convergence of Control and Enterprise Networks at Retail Systems '98, *Coactive* (press release), Author: unknown, Jun. 16, 1998, pp. 1–4.

Coactive Launches First Architecture to Support the Convergence Between Control and IP Networks, *Coactive* (press release), Author: unknown, May 20, 1998, pp. 1–4.

Coactive Leads Standardization Effort for LonTalk Routers, *Coactive* (press release); Author: unknown; May 20, 1997.

Coactive Leads Standardization Effort for LonTalk/IP Routers, *Coactive* (press release), Author: unknown, May 20, 1997, pp. 3.

Coactive Networks and Diverse Networks Team to Deliver End–to–End Infrastructure for Enabling the Digital Home, *Coactive* (press release), Author: unknown, Aug. 28, 2000, pp. 1–4.

Coactive Networks and Innovex Technologies Deliver Internet Access to Home Security, Lighting and Climate Control, *Coactive* (press release), Author: unknown, Feb. 29, 2000, pp. 1–4.

Coactive Networks and Silicon Energy Partner to Deliver an End–to–End Solution for Internet–Based Energy Monitoring and Analysis, *Coactive* (press release), Author: unknown, Sep. 19, 2000, pp. 1–4.

Coactive Networks and Vicinium Systems Team to Deliver a Complete Television–Based Interface to Digital Homes and Neighborhoods, *Coactive* (press release), Author: unknown, Jun. 19, 2000, pp. 1–4.

Coactive Networks Announces First Shipments of Internet Gateway to Home Control Systems, *Coactive* (press release), Author: unknown, May 3, 1999, pp. 1–4.

Coactive Networks Announces Formation of Technical Advisory Board, *Coactive* (press release), Author: unknown, Oct. 5, 1998, pp. 1–4.

Coactive Networks Announces System Provider Partner Program, *Coactive* (press release), Author: unknown, Jan. 25, 1999, pp. 1–4.

Coactive Networks Bridges Gap between Control Systems and Corporate Data Networks with New Off–the–Shelf Router Family, *Coactive* (press release), Author: unknown, Jun. 8, 1998, pp. 1–6.

Coactive Networks Expands Support for Management and HMI Applications, *Coactive* (press release), Author: unknown, Nov. 2, 1998, pp. 1–4.

Coactive Networks Introduces Multi–Service Home Control Network Access to U.S. Market, *Coactive* (press release), Author: unknown, Feb. 16, 1999, pp. 1–4.

Coactive Networks Names Gus Ezcurra Vice President of Sales, *Coactive* (press release), Author: unknown, Jul. 20, 1998, pp. 2.

Coactive Networks Names Janice Roberts, 3Com Senior VP, to Board of Directors, *Coactive* (press release), Author: unknown, Jun. 2, 1998, pp. 2.

Coactive Networks Powers Innovative Energy Management Solution, *Coactive* (press release), Author: unknown, Jan. 5, 2001, pp. 1–4.

Coactive Networks President Named to LonMark Board of Directors;, *Coactive* (press release), *Coactive* (press release); Author: unknown; Jun. 14, 1998, pp. 1–3.

Coactive Networks Shatters Price Barriers with New IP Gateway to Home Control Systems, *Coactive* (press release), Author: unknown, Oct. 26, 1998, pp. 1–4.

Coactive Networks to Supply Internet–Based Home Gateways for up to 400,000 Customers; First Phase of Deliveries Valued at US$22 Million, *Coactive* (press release), Author: unknown, Oct. 25, 1999, pp. 1–8.

Coactive Networks Unveils the First Full–Service Residential Getaway, *Coactive* (press release), Author: unknown, May 3, 2000, pp. 1–4.

Coactive Networks, Inc., A New Solution for Offering Multiple Telemetry Services to the Home, *Coactive*, 1999, pp. 1–8.

Coactive Networks, Inc., Coactive Connector® 1000 Series, *Coactive*, 2000, pp. 1–4.

Coactive Networks, Inc., Coactive Connector® 2000 Series, *Coactive*, Date: unknown, pp. 1–8.

Coactive Networks, Inc., Connecting Networks to the Real World™, *Coactive*, Date: unknown, pp. 1–4.

Coactive Networks, Inc., Corporate Backgrounder, *Coactive*, 2001, pp. 1–6.

Coactive Networks, Inc., Corporate Fact Sheet, *Coactive*, 2001, pp. 2.

Coactive Networks, Inc., Router–LE: Remote Access to LonWorks Over Ethernet, *Coactive*, 1998, pp. 1–4.

Coactive Networks, Inc., Router–LL: Connect LonWOrks Networks Across Internet Protocol, *Coactive*, 1998, pp. 1–4.

Coactive Networks, Inc., The Coactive Connector® Residential Gateway, Date: unknown, pp. 1–10.

Coactive Receives $2 Million in Funding, *Coactive* (press release), *Coactive* (press release); Author: unknown; Oct. 15, 1997, pp. 3.

Coactive Receives First Round of Venture Funding Investors Embrace Control Network Connectivity Technology, *Coactive* (press release), Author: unknown, Dec. 1, 1997, pp. 2.

Cohen et al., IP Addressing and Routing in a Local Wireless Network, 1992 IEEE, 1992, pp. 626–632.

Cook et al., *Water Distribution and Control by Wireless Networking, Electronic Systems Technology*; Date: unknown, pp. 1–3.

Corcoran et al., Browser–Style Interfaces to a Home Automation Network, *IEEE Transactions on Consumer Electronics*, vol. 43, No. 4, Nov. 1997, pp. 1063–1069.

Corcoran et al., CEBus Network Access via the World–Wide–Web, available at http://ieeexploreieee.org/xpl/free-abs_all.jsp?arnumber=517285, on Mar. 29, 2009, *Paper* Published on *Consumer Electronics*, 1996, Digest of Technical Papers, pp. 236.

Corcoran et al., *CEBus Network Sccess via the World–Wide–Web, IEEE*, 1996.

Corcoran et al., *CEBus Network Access via the World–Wide–Web, IEEE*, 1996, pp. 236–237.

Corson et al., Architectural Considerations for Mobile Mesh Networking, Milcom '96 Conference Proceedings vol. 1 of 3, Oct. 22–24, 1996, pp. 225–229.

Corson et al., Internet–Based Mobile *Ad Hoc* Networking, *IEEE Internet Computing*, Jul.–Aug. 1999, pp. 63–70.

Custom Solutions, Inc., Acessories, available at http://web.archive.org/web/ 19981206221844/www.csi3.com/hv_p4.htm on Feb. 27, 2009, pp. 1–3.

Custom Solutions, Inc., HomAtion 2000 for HomeVision, *Press Release*, available at http://web.archive.org/web/19981207075734/www.c si3.com/HV_PR_0 on Feb. 27, 2009, pp. 1–2.

Custom Solutions, Inc., HomeVision 2.7 "How To" Information, Date: unknown; pp. 1–146.

Custom Solutions, Inc., HomeVision 2.7 Auto Report Feature, Date: unknown; pp. 1–10.

Custom Solutions, Inc., HomeVision 2.7 Interface Command Protocol, Date: unknown; pp. 1–40.

Custom Solutions, Inc., HomeVision 2.7, Date: unknown; pp. 1–42.

Custom Solutions, Inc., HomeVision 2.7, *Document Purpose*, Date: unknown; pp. 1–28.

Custom Solutions, Inc., HomeVision 2.7, *Summary of Changes*—2.7, Date: unknown; pp. 1–26.

Custom Solutions, Inc., HomeVision 2.7, *Welcome to Home Vision*, Date: unknown; pp. 1–18.

Custom Solutions, Inc., HomeVision 2.7e, *Owner's Manual* (1999) Date: unknown; pp. 1–596.

Custom Solutions, Inc., HomeVision 2.7e, *Version History Overview*, Date: unknown; pp. 1–38.

Custom Solutions, Inc., HomeVision Description, available at http://web.archive.org/web/19981206004955/http://www.csi3.com/HV.htm on Mar. 2, 2009, pp. 1–14.

Custom Solutions, Inc., HomeVision–PC 2.62 Interface Command Protocol, Date: unknown; pp. 1–36.

Custom Solutions, Inc., HomeVision–PC 2.62, *Document Purpose*, Date: unknown; pp. 1–24.

Custom Solutions, Inc., HomeVision–PC 2.62, *Summary of Changes*—2.62, Date: unknown; pp. 1–8.

Custom Solutions, Inc., HomeVision–PC 2.62, *Version History Overview*, Date: unknown; pp. 1–6.

Custom Solutions, Inc., HomeVision–PC 2.62, *Welcome to HomeVision PC*, Date: unknown; pp. 1–12.

Custom Solutions, Inc., HomeVision–PC Description, available at http://web.archive.org/web/19981205094024/http://www.csi3.com/hv_pc.htm on Mar. 2, 2009, pp. 1–6.

Custom Solutions, Inc., HomeVision–PC Software, available at http://web.archive.org/web/19990224053817/http://www.csi3.com/hv_p3pc.htm on Feb. 27, 2009, pp. 1–2.

Custom Solutions, Inc., HomVision–PC Version 2.62, *Owner's Manual* (1997) pp. 1–234.

Custom Solutions, Inc., Media Information, Feb. 16, 1999, available at http://web.archive.com/web/19990502073249/www.csi3.com/hv_media.htm on Feb. 27, 2009, pp. 1.

Custom Solutions, Inc., Using Enerzone StatNet Thermostats with HomeVision (1998) pp. 1–16.

Davies et al., The Application of Packet Switching Techniques to Combat Net Radio, Proceedings of the IEEE, vol. 75, No. 1, Jan. 1987, pp. 43–55.

Davies, et al., Internetworking in the Military Environment, Proceedings of IEEE Infocom '82 (1982) pp. 19–29.

Davis et al., Knowledge–Based Management of Cellular Clone Fraud, IEEE (1992), pp. 230–234.

Deering et al., *Internet Protocol, Version 6(IPv6) Specification*, RFC 2460, *The Internet Security*, Dec. 1998 (40 pages).

Distributions, Networks, and Networking: Options for Dissemination; Workshop on Electronic Texts, Session III, available at http://palimpsest.standford.edu/byorg/lc/etextw/sess3.html, Jul. 17, 2007, pp. 1–10, Author: unknown.

Dixon et al., Addressing, Bridging and Source Routing, IEEE Network, Jan. 1988, vol. 2, No. 1, pp. 25–32.

Dong et al., Low Power Signal Processing Architectures for Network Microsensors; *UCLA*; Date: unknown; pp. 1–6.

Dong et al., *Low Power Signal Processing Architectures for Network Microsensors, ACM*, 1997, pp. 173–177.

*DSC–3500 Meeting the Control and Conservation Challenge, Johnson Controls*, 1984, pp. 1–6.

DTE Energy Technologies Selects Coactive Networks Internet Getaways to Roll Out New Class of E–Services to Businesses, *Coactive* (press release), Author: unknown, May 3, 2000, pp. 1–4.

DTE Energy Technologies Selects Coactive Networks to Power Distributed Generation Solutions Worldwide, *Coactive* (press release), Author: unknown, Aug. 1, 2001, pp. 1–4.

Echelon Corporation Demonstrates Internet Connectivity in Digital Home Applications at 1999 International Consumer Electronics Show, *Home Toys* (press release); Author: unknown; Dec. 15, 1998, available at http://hometoys.com/htinews/dec98/releases/echelon03.htm on Apr. 22, 2009, pp. 1–4.

Eight Leading Controls Companies Join Coactive Partner Program, *Coactive* (press release), Author: unknown, Aug. 21, 2000, pp. 1–4.

Elson et al., Fine–Grained Nnetwork Time Synchronization Using Reference Broadcasts; *UCLA Computer Science Department*; May 17, 2002, pp. 1–14.

Eng et al., Bahama: A Broadband Ad–Hoc Wireless ATM Local–Area Network, 1995 IEEE International Conference on Communications, Jun. 18–22, 1995, pp. 1216–1223.

*Enhanced Position Location Reporting System (EPLRS)*, Author: unknown, available at http://www.globalsecurity.org/military/systems/ground/epl rs.htm on Feb. 22, 2010, pp. 1–3.

Ephremides et al., A Design Concept for Reliable Mobile Radio Networks with a Frequency Hopping Signaling, *IEEE*; 1987, pp. 56–73.

*ESTeem Engineering Report, Johnson Controls Interface No. 91–102*, Author: unknown, Publisher: unknown, Nov. 1994.

*ESTeem Model 96F*, Author: unknown, *ESTeem Radios*; Sep. 6, 1996 (2 pages).

Estrin et al., Next Century Challenges: Scalable Coordination in Sensor Networks, *ACM*, 1999, pp. 263–270.

Estrin et al., RFC1940–Source Demand Routing: Packet Format and Forwarding Specification (Version 1), Network Working Group, May 1996, available at http://www.faqs.org/rfcs/rfc1940.html, Sep. 14, 2009, pp. 1–20.

Estrin et al., Source Demand Routing: Packet Format and Forwarding Specification (Version 1), Network Working Group, *Internet Draft*, Jan. 19, 1995, pp. 1–28.

Expert Report of Randy H. Katz, Ph. D, of *SIPCO, LLC et al.* v. *The Toro Company et al.*, Case No. 2:08–cv–00505.

*Fort Riley Water Distribution Monitoring Control System Drawings 1–30*, Author: unknown; Publisher: unknown; Date: unknown.

*Foxboro Interfacing*, Author: unknown, *Engineering Report*, No. 91–023, Revised: Jun. 19, 1996, pp. 1–5.

Frank, Transmission of IP Datagrams Over NET/ROM Networks, ARRL Amateur Radio $7^{th}$ Computer Networking Conference, Oct. 1988, pp. 65–70.

Frankel, Packet Radios Provide Link for Distributed Survivable Command Control Communications in Post–Attack Scenarios, Microwave System News, Jun. 1983, Circle Reader Service No. 77, pp. 80–108.

Franz, HiperLAN—Der ETSI–Standard fur locale Funknetze, *NTZ*, Sep. 1995, 10 pages.

Fullmer, Collison Avoidance Techniques for Packet–Radio Networks, *Dissertation*, University of California at Santa Cruz , Jun. 1998, pp. 1–162.

Gale et al., The Impact of Optical Media on Information Publishing, Bulletin of the American Society For Information Science, vol. 12, No. 6, Aug./Sep. 1986, pp. 12–14.

Garbee, Thoughts on the Issues of Address Resolution and Routing in Amateur Packet Radio TCP/IP Networks, ARRL Amateur Radio $6^{th}$ Computer Networking Conference, Aug. 1987, pp. 56–58.

Garcia–Luna–Aceves et al., Wireless Internet Gateways (Wings), 1997 IEEE, pp. 1271–1276.

Garcia–Luna–Aceves, A Fail–Safe Routing Algorithm for Multishop Packet–Radio Networks, IEEE Infocom '86, Technical Sessions: Apr. 8–10, 1986, pp. 434–442.

Garcia–Luna–Aceves, A Minimum–hop Routing Algorithm Based on Distributed Information, Elsevier Science Publishers, B.V. (North Holland), 1989, pp. 367–382.

Garcia–Luna–Aceves, Routing Management in Very Large Scale Networks, Elsevier Science Publishers, B.V. (North Holland), 1988, pp. 81–93.

*GE Fanuc Interfacing*, Author: unknown, *Engineering Report*, No. 91–010, Revised: Apr. 11, 1996, pp. 1–8.

*General PLC/RTU Interfacing*, Author: unknown, *Engineering Report*, No. 92–010, Revised: Jun. 18, 1996, pp. 1–5.

GE Security, NetworX NX–4, 2004, pp. 1–2.

GE Security, NetworX NX–548E, 2006, pp. 1–2.

Geier et al., Networking Routing Techniques and their Relevance to Packet Radio Networks, ARRL/CRRL Amateur Radio $6^{th}$ Computer Networking Conference, London, Ontario, Canada, Sep. 1990, pp. 105–117.

Gerla et al., Multicluster, mobile, multimedia radio network, *CSD, UCLA; Blatzer Journals*; Jul. 12, 1995, pp. 1–26.

Gerla et al., Multicluster, Mobile, Multimedia Radio Network, UCLA Computer Science Department; Baltzer Journals; Wireless Networks; Jul. 12, 1995, pp. 255–265.

Golden Power Manufacturing, 6030 PCT Programmable Communicating Thermostat, Author: unknown, 2007, pp. 1–3.

Golden Power Manufacturing, Ritetemp Universal Wireless Thermostat, Author: unknown, 2007, pp. 1–2.

Goldman et al., *Impact of Information and Communications Technologies on Residential Customer Energy Services*, Paper, *Berkeley: UCLA*, Oct. 1996, pp. 1–89.

Grady et al., *Telemetry Options for Small Water Systems*, Special Report SR14–1999, Publisher: unknown, Sep. 1999, pp. 1–23.

Guardian Alarms, Inc., Home Security System—Model 7068 Digital Dialer Interface, Author: unknown, available at www.guardianalarms.net, 2007, pp. 1.

Guardian Alarms, Inc., Security Company—Home Alarm System Monitoring—AES 7067 IntelliTap–II Digital Dialer Interface, Author: unknown, available at www.guardianalarms.net, 2007, pp. 1.

Guardian Alarms, Inc., Security System—Alarm System Monitoring—7160 EZ Router, Author: unknown, available at www.guardianalarms.net, 2007, pp. 1.

Guardian Alarms, Inc., Security System—Alarm System Monitoring—Net 7000, Author: unknown, available at http://www.guardi analarms.net, 2007, pp. 1.

Guardian Alarms, Inc., Security System—Alarm System Monitoring—Radionics FDX, Author: unknown, available at www.guardianalarms.net, 2007, pp. 1.

Haartsen, Bluetooth—*The Universal Radio Interface for Ad Hoc, Wireless Connectivity, Ericsson Review*, No. 3, 1998, pp. 110–117.

Haartsen et al., *Bluetooth: Vision, Goals and Architecture, Mobile Computing and Communications Review*, vol. 1, No. 2, Date: unknown, pp. 1–8.

Hahn et al., Packet Radio Network Routing Algorithms: A Survey, IEEE Communications Magazine, vol. 22, No. 11, Nov. 1984, pp. 41–47.

Hai Omni, Features & Specifications, *Home Automation, Inc.*, available at http://web.archive.org/web/19970216055832/www.homeauto.com/omni on Feb. 17, 2009, pp. 1–6.

Hall, Tactical Internet System Architecture for Task Force XXI, 1996 IEEE, pp. 219–230.

Hamilton et al., Optimal Routing in Multihop Packet Radio Networks, 1990 IEEE, pp. 389–396.

Harrison, Microwave Radio In The British Telecom Access Network, Second IEE National Conference on Telecommunications, Conference Publication No. 300, Date: unknown, pp. 208–213.

Hedrick, An Introduction To IGRP, Rutgers, The State University of New Jersey, Center for Computers and Information Services, Laboratory for Computer Science Research, Aug. 22, 1991 (Updated Aug. 10, 2005), pp. 1–21.

Hedrick, Routing Information Protocol (Jun. 1988), RFC 1058, available at Http://Tools.Ietf.Org/Html/Rfc1058, Jun. 24, 2009, pp. 1–34.

Hinden et al., The DARPA Internet Gateway, RFC 823, Publisher: unknown, Sep. 1982, pp. 1–43.

Holtsville et al., *Symbol Technologies, Telxon and Aironet Commit to Future Interoperability of Their Wireless Local Area Networks Based on the IEEE 802.11 Specification*, Business Wire, Jun. 24, 1996, available at http://www.thefreelibrary.com/_/print/PrintArticle.aspx?id=18414624, pp. 1–3.

Hsu et al., *Wireless Communications for Smart Dust, Berkeley: UCLA*, Jan. 30, 1998, pp. 1–20.

Home Automation, Inc., *Home Page*, HAI Omni: Features & Specifications, *Home Automation, Inc.* available at http://web.arquive.org/web/19961219004403/http://www.home auto.com(archived web page) on Feb. 17, 2009; Author: unknown; pp. 1.

Home Automation, Inc., HAI Company Background; Publisher: Unknown; Date: unknown; pp. 1–2.

Home Toys, Inc., HTINews Review, available at http://www.hometoys.com/htinews/aug97/reviews/homevis/homevis1.htm on Mar. 2, 2009, pp. 1–26.

Honeywell, Inc., Honeywell Home Control Version 2.0 Demonstration, available at http://web.arquive.org/web/19980630195929/www.hbc.honeywell.com/ on Mar. 5, 2009, (7 pages).

Hong et al., U.S. Lighting Market Characterization, vol. II: Energy Efficient Lighting Technology Options, Sep. 30, 2005, *Report* prepared for Building Technologies Program, Office of Energy Efficiency and Renewable Energy, pp. 1–36.

Hotel Technology Next Generation, *A Guide for Understanding Wireless in Hospitality, An HTNG White Paper*, Jun. 2006, (Jayne O'Neill, ed.), pp. 1–77.

How Does the New Power Company Deliver on the Promise of Energy Reconstructing?, *NewPower* (press release), Author: unknown, May 31, 2001, pp. 1–6.

Hruschka et al., Packet Radio, Drahtlose Datenubertragung im Amateurfunk, *Elektor*, Jun. 1991, pp. 54–57 and 84.

Hubner et al., A Distributed Multihop Protocol for Mobile Stations to Contact a Stationary Infrastructure, The Third IEE Conference on Telecommunications, Conference Publication No. 331, Date: unknown, pp. 204–207.

Humpal, *Extended Timers for Fort Riley*, Publisher: unknown; Mar. 1993.

Humpal, *Modified Download Files for Fort Riley*, Publisher: unknown; Apr. 1994.

*IIS—Contract Detail, Project Name: Ft. Riley Radio Expansion*, Author: unknown, *Johnson Controls*, Sep. 1998.

Important Dealer Notification—Honneywell AlarmNet–M Network Alert, Source: unknown; Author: unknown; Apr. 2007, pp. 1.

*Industrial Communications*, Author: unknown, available at http://web.ar chive.org/web/19990222162354/www.metricom.com/industrial/ on May 10, 2010, pp. 1–3.

*Information Technology—Telecommunications and Information Exchange Between Systems—Local and Metropolitan Area Networks—Specific Requirements—Part 11: Wireless LAN Medium Access Control (MAC) and Physical Layer (PHY) Specifications*, Author: unknown, *IEEE*, Std. 802.11–1997, 1997, pp. 1–445.

Information Sciences Institute (UCLA), *Internet Protocol (IPv4) Defense Advanced Research Projects Agency*, Sep. 1981.

IOConnect Architecture™, *Coactive*, 2001, pp. 1–4.

Iwata et al., *Scalable Routing Strategies for Ad Hoc Wireless Networks*, IEEE Journal on Selected Areas in Communications, vol. 17, No. 8, Aug. 1999, pp. 1369–1379.

Jacobsen, The Building Blocks of a Smart Sensor for Distributed Control Networks, *IEEE Technical Applications Conference Northcon*, Nov. 4–6, 1998, pp. 285–290.

*JC/83RF System: Cost–effective Multiple Facility Management by Radio Network, Johnson Controls*, Date: unknown, pp. 2214–2219.

*JC/83RF System: Multiple Facility Management by Radio Network, Johnson Controls*, Publication No. 2161, 1983, pp. 1–4.

JDS Technologies, Infrared Xpander, IR–XP$^2$, *User Manual*, Date: unknown; pp. 1–15.

JDS Technologies, Model: 8R5PR, 8 Channel RS485 Relay Xpander, *Installation Manual*, pp. 1–5.

JDS Technologies, Stargate 8 Channel RS–485 HUB, Publisher: unknown; Date: unknown, pp. 1.

JDS Technologies, Stargate Interactive Automation System, 1998, pp. 1–2.

JDS Technologies, Stargate, *Operation Manual*, Mar. 2000, pp. 1–114.

JDS Technologies, Stargate–IP System Layout, Publisher: unknown; Date: unknown, pp. 1.

JDS Technologies, *Support: Protocol Specifications*, available at http://jdstechnologies.com/protocol.htm, on Feb. 16, 2009, pp. 1–32.

JDS Technologies, TimeCommander, TimeCommander Plus, *User Guide*, Jun. 1998, pp. 1–95.

JDS Technologies, Web Xpander, Installation and Operation Manual, Feb. 2004, pp. 1–34.

Jimenez–Cedeno et al., Centralized Packet Radio Network: A Communication Approach Suited for Data Collection in a Real–Time Flash Flood Prediction System, ACM–SAC 1993, pp. 709–713.

*Johnson Controls Interface*, Author: unknown, *Engineering Report*, No. 91–012, Revised: Nov. 1994, pp. 1–14.

Johnson, Mobile Host Internetworking Using IP Loose Source Routing, Carnegie Mellon University CMU–CS–93–128, DARPA Order No. 7330, Feb. 1993, pp. 1–18.

Johnson, Routing in *Ad Hoc* Networks of Mobile Hosts, 1995 IEEE, pp. 158–163.

Johnson, Scalable and Robust Internetwork Routing for Mobile Hosts, 1994 IEEE, pp. 1–11.

Johnson Controls, Inc., LonWorks®Digital Controller, 1998, pp. 1–12.

Johnson et al., Dynamic Source Routing in *Ad Hoc* Wireless Networks, *Paper*, Publisher: unknown, pp. 1–18.

Johnson et al., Dynamic Source Routing in *Ad Hoc* Wireless Networks, reprinted in Mobile Computing; Tomasz Imielinski and Hank Korth eds., 1996; Kluwer Academic Publishers, pp. 153–181.

Johnson et al., Protocols for Adaptive Wireless and Mobile Networking, IEEE Personal Communications, 3(1), Feb. 1996, pp. 1–18.

Johnson et al., Route Optimization in Mobile IP, *Internet Draft* (Nov. 28, 1994), available at http://www.monarch.cs.rice.edu/internet–drafts/draft–ietf–mobileip–optim–00.txt., Sep. 26, 2009, pp. 1–29.

Jubin et al., The DARPA Packet Radio Network Protocols, Proceedings of the IEEE, vol. 75, No. 1, Jan. 1987, pp. 21–32.

Kaashoek et al., FLIP: An Internetwork Protocol for Supporting Distributed Systems, ACM Transactions on Computer Systems, vol. 11, No. 1, Feb. 1993, pp. 73–106.

Kaiser, *Circuits and Systems for Embedded Wireless Devices: Low Power Sensor, Interface, Signal Processing, Communication, and Network Systems*, École Polytechnique Fédérale de Lausanne, pp. 1–40.

Kaiser, *Embedded Wireless Devices: Sensors*, Outline, École Polytechnique Fédérale de Lausanne, pp. 1–53.

Kaiser, *Embedded Wireless Devices: Signal Processing*, Outline, École Polytechnique Fédérale de Lausanne, pp. 1–19.

Kaiser, *Embedded Wireless Devices: Wireless Networking*, Outline, École Polytechnique Fédérale de Lausanne, pp. 1–16.

Kaiser, *Embedded Wireless Devices: Wireless Physical Layer*, Outline, École Polytechnique Fédérale de Lausanne, pp. 1–29.

Kaiser et al., Low Power Wireless Integrated Microsensor (LWIM), *Progam Mission, UCLA*; Jan. 1997.

Kaiser et al., Low Power Wireless Integrated Microsensors (LWIM), BAA 94–15 Proposal Abstract, UCLA Electrical Engineering Department, Rockwell Science Center, Date: unknown, 15 pages.

Kaiser et al., Low Power Wireless Integrated Microsensors (LWIM), Request for Support to Project, UCLA Electrical Engineering Department, Rockwell Science Center, Sep. 13, 1994, 71 pages.

Kaiser et al., Low Power Wireless Integrated Microsensors (LWIM); UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Karn et al., Packet Radio in the Amateur Service, IEEE Journal on Selected Areas in Communications, vol. SAC–3, No. 3, May 1985, pp. 431–439.

Katz et al., The Bay Area Research Wireless Access Network (BARWAN) (Jun. 1996) (presentation paper), http://daedalus.cs.berkeley.edu/talks/retreat.6.97/BARWAN.597.ppt, pp. 1–66.

Katz et al., The Bay Area Research Wireless Access Network (BARWAN), University of California at Berkeley, available at http://www.cs.berkeley.edu/–randy/Daedalus/BARWAN/BARWAN_index.html, 6 pages.

Keltron's Home Page With Frames, *Index*, available at http://web.archive.org/web/19990831161957//http://www.keltroncorp.com, on Mar. 24, 2009, pp. 1.

Kemp, Home Automation Application Guide, Applications for Home Automation in Any Home, vol. 1, 2000, pp. 1–106.

Khan, Robert E., Issues in Distributed Routing for Mobile Packet Radio Network, IEEE 1982, pp. 233–238.

Kleinrock et al., Hierarchical Routing for Large Networks, Performance Evaluation, and Optimization, *Computer Networks 1* (1977), pp. 155–174.

Kocom, Digital Home Network, Kitchen TV Phone KTD–505, *User's Manual*, pp. 1–7.

Kohno et al., An Adaptive Sensor Network System for Complex Environments, in Intelligent Autonomous Systems (Kakazu et al., eds.), *IOS Press*, 1998, pp. 21–28.

Krishnamachari, *Networking Wireless Sensors, Cambridge University Press*, Date: unknown, pp. 1–10.

Lacoss, *Distributed Sensor Networks*, Final Report, *Lincoln Laboratory at Massachusetts Institute of Technology*, Sep. 30, 1986, pp. 1–225.

Lauer et al., Survivable Protocols for Large Scale Packet Radio Networks, IEEE Global Telecommunications Conference, Nov. 26–29, 1984, vol. 1 of 3, pp. 468–471.

Lauer, Packet–Radio Routing, Routing in Communications Networks, Ch. 11 (1995) pp. 351–396.

Lee et al., Distributed Measurement and Control Based on the IEEE 1451 Smart Transducer Interface Standards, Proceedings of the 16$^{th}$ IEEE Instrumentation and Measurement Technology Conference, vol. 1, May 24–26, 1999, *IEEE*, pp. 608–613.

Leiner et al., *Goals and Challenges of the DARPA GloMo Program*, IEEE Personal Communications, Dec. 1996, pp. 34–43.

Leviton Manufacturing Co., Inc., *The DECORA® Collection of Designer Devices*, 2006, pp. 1–85.

Lewis et al., Packet–Switching Applique for Tactical VHF Radios, 1987 IEEE Military Communications Conference, Oct. 19–22, 1987, Conference Record vol. 2 of 3, pp. 449–455.

Lin et al., Adaptive Clustering for Mobile Wireless Networks; Publisher: unknown; Date: unknown; pp. 1–21.

Lin et al., CMOS Front End Components for Micropower RF Wireless Systems; EED, *UCLA Electrical Engineering Department*; 1998, pp. 1–5.

Lin et al., Wireless Integrated Network Sensors (WINS) for Tactical Information Systems, *UCLA, Rockwell Science Center*; Date: unknown; pp. 1–5.

Linear Corporation, Supervised Digital Security Transmitters TX–91, TX–92, TX–94, *Operation Instructions*, 1993, pp. 1.

Linear Corporation, Supervised Digital Security Transmitter T–90, *Installation Instructions*, 2006, pp. 1–2.

Linear Corporation, Supervised Wireless Receiver and Zone Expander SRX–64A, *Installation Instructions*, 2003, pp. 1–2.

Local and Metropolitan Area Networks: Wireless Medium Access Control (MAC) and Physical (PHY) Specifications, Annex A: Protocol Implementation Conformance Statement (PICS) Proforma, Author: unknown; *IEEE*, Nov. 1997, pp. 1–75.

Local and Metropolitan Area Networks: Wireless Medium Access Control (MAC) and Physical (PHY) Specifications, Author: unknown; *IEEE*, Nov. 1997, pp. 1–98.

Long Range Radio, *AlarmNet®*, Author: unknown; Date: unknown, pp. 1–10.

LonTalk Protocol, LonWorks™ Engineering Bulletin, *Echelon Corp.*; Author: unknown; Apr. 1993, pp. 1–27.

LonWorks® Products, 1998, *Version A, Echelon Corp.*, pp. 1–21.

LonWorks® Router User's Guide, *Echelon Corp.*; Author: unknown; 1995, pp. 1–136.

LonWorks® SMX™ Transceiver, datasheet, *Echelon Corp.*; Author: unknown; 1997, pp. 1–18.

Lougheed et al., A Border Gateway Protocol 3 (BGP–3), RFC 1267, (Oct. 1991), available at http://tools.ietf.org/html/rfc1267, Jun. 24, 2009, pp. 1–36.

Lowe et al., Publishing Bibliographic Data on Optical Disks: A Prototypical Application and Its Implications, Third International Conference on Optical Mass Data Storage, Proceedings of SPIE, vol. 529, pp. 227–236.

Lutron Electronics Co. Inc., *Connecting to a RadioRA System via a Local Area Network*, Application Note #127, unknown, pp. 1–16.

Lutron Electronics Co. Inc., *Homeowner's Guide for the RadioRA® Quick Start Package*, 2004, pp. 1–8.

Lutron Electronics Co. Inc., *How to retrofit RadioRA® Wall–Mounted Master Control into an existing home*, Application #41, 2004, pp. 1–2.

Lutron Electronics Co. Inc., *Interfacing RadioRA® to Security and Fire Alarm Systems*, Application Note #59, pp. 1–4.

Lutron Electronics Co. Inc., *IR/RS232 Interface for Bang & Olufsen® Beo4® Remote Control and RadioRA®*, Application Note #199, 2004, pp. 1–3.

Lutron Electronics Co. Inc., *Level Capture with a RadioRA® Master Control*, Application Note #73, 2003, pp. 1–3.

Lutron Electronics Co. Inc., *Modem Installation for HomeWorks®*, Application Note #9, 1998, pp. 1–4.

Lutron Electronics Co. Inc., *RadioRA® RA–IR–KIT Installation Instructions*, Application Note #61, 2000, pp. 1–4.

Lutron Electronics Co. Inc., *RadioRA® RF Signal Repeater*, 1998, pp. 1–2.

Lutron Electronics Co. Inc., *RadioRA® Single–Location Switch, Controls for Permanently Installed Lighting Loads*, 1998, pp. 1–2.

Lutron Electronics Co. Inc., *RadioRA® Table Lamp Controls, Dimming and Switching Controls for Table and Floor Lamps*, 1999, pp. 1–2.

Lutron Electronics Co. Inc., *Using a Photocell with the RadioRA® System*, Application Note #45, 1998, pp. 1–4.

Lutron Electronics Co. Inc., *Using an Astronomic Timeclock with the RadioRA® System*, Application Note #42, 1998, pp. 1–2.

Lutron Electronics Co. Inc., *Using the RadioRA® System to Activate Scenes 5–16 on a GRAFIK Eye® Control Unit*, Application Note #48, 1998, pp. 1–4.

Lutron Electronics Co. Inc., *Using the RadioRA® Telephone Interface*, Application Note #46, 1998, pp. 1–2.

Lynch et al., Application of Data Compression Techniques to a Large Bibliographic Database, Proceeding of the Seventh International Conference on Very Large Database, Cannes, France, Sep. 9–11, 1981 (Washington, DC: IEEE Computer Society Press, 1981), pp. 435–447.

Lynch et al., Beyond the Integrated Library System Concept: Bibliographic Networking at the University of California, Proceedings of the Second National Conference on Integrated Online Library Systems Proceedings, Sep. 1984, pp. 243–252.

Lynch et al., Conservation, Preservation and Digitization, Energies for Transition: Proceedings of the Fourth National Conference of the Association of College and Research Libraries, Baltimore, MD, Apr. 9–12, 1986 (Chicago, IL: Association of College and Research Libraries, 1986), pp. 225–228.

Lynch et al., Document Delivery and Packet Facsimile, Proceedings of the 48th ASIS Annual Meeting, vol. 22, Oct. 20–24, 1985, pp. 11–14.

Lynch et al., Electronic Publishing, Electronic Imaging, and Document Delivery, Electronic Imaging '86 (Boston, MA: Institute for Graphic Communication, Inc., 1986), pp. 662–667.

Lynch et al., Library Applications of Electronic Imaging Technology, Information Technology and Libraries, Jun. 1986, pp. 100–105.

Lynch et al., Packet Radio Networks: Architectures, Protocols, Technologies and Applications, Pergamon Press, 1ed., 1987, pp. 1–275.

Lynch et al., Public Access Bibliographic Databases in a Multicampus University Environment, Databases in the Humanities and Social Sciences—4, Proceedings of the International Conference on Databases in the Humanities and Social Sciences, Jul. 1987, Learned Information, Inc., 1989, pp. 411–419.

Lynch et al., The Telecommunications Landscape: 1986 Library Journal, Oct. 1, 1986, pp. 40–46.

*M100 Series Motor Actuator*, Author: unknown, *Johnson Controls, Inc.*; Apr. 1993, pp. 1–20.

*M100C Series Actuator with Digital Control Signal Input and R81CAA–2 Interface Board*, Installation Bulletin, *Johnson Controls*, 2000, pp. 1–12.

Mak et al., *Design Consideration for Implementation of Large Scale Automatic Meter Reading Systems, IEEE Transactions of Power Delivery*, vol. 10, No. 1, Jan. 1995, pp. 97–103.

Mak et al., Design Considerations for Implementation of Large Scale Automatic Meter Reading Systems IEEE Transactions on Power Delivery, vol. 10, No. 1, Jan. 1995, pp. 97–103.

Malkin, RFC 2453, RIP Version 2 (Nov. 1998), available at http://tools.ietf.org/html/rfc2453, Jun. 24, 2009, pp. 1–40.

Maltz, Experiences Designing and Building a Multi–Hop Wireless Ad Hoc Network Testbed, *Paper*, Mar. 5, 1999, School of Computer Science Carnegie Mellon University, pp. 1–20.

Maltz et al., Experiences Designing and Building a Multi–Hop Wireless *Ad Hoc* Network Testbed, *Paper*, Mar. 5, 1999, available at http://reportsarchive.adm.cs.cmu.edu/anon/1999/CMU–C S–99–116.pdf, pp. 1–20.

Maltz, On–Demand Routing in Multi–Hop Wireless Mobile Ad Hoc Networks, *Thesis*, May 2001, pp. 1–192.

*Man–Portable Networked Sensor System* (1997–), Author: unknown, available at http://www.spawar.navy.mil/depts/d30/d37/d371/mpnss/mpnss.html on May 20, 2010, pp. 1–4.

*March of the Motes*, Author: unknown, *New Scientist*, vol. 179, issue 2409, Aug. 23, 2003, pp. 26.

Marcy et al., Wireless Sensor Networks for Area Monitoring and Iintegrated Vehicle Health Management Applications; *Rockwell Science Center*, Thousand Oaks, CA, AIAA–99–4557; Date: unknown, pp. 1–11.

Markie et al., LonWorks and PC/104: A winning Combination, *PC/104 Embedded Solutions*; Summer 1998, pp. 1–8.

Martel et al., Home Automation Report: A Modular Minimum Complexity, High–Resolution and Low Cost Field Device Implementation for Home Automation and Healthcare, *MIT*; Publisher: unknown; Mar. 31, 1998; pp. 1–29.

McQuillan et al., The ARPA Network Design Decisions; Computer Networks, vol. 1, No. 5, Aug. 1977 pp. 243–289.

McQuillan et al., The New Routing Algorithm for the ARPANET, IEEE Transactions on Communications, vol. COM–28, No. 5, May 1980, pp. 711–719.

*Metasys Compatible Products*, Author: unknown; *Johnson Controls, Inc.*, 1997 (9 pages).

*Metasys Extended System Architecture*, vol. II, Author: unknown, Publisher: unknown, Sep. 1999.

*Metasys N2 System Protocol Specification for Vendors*, Author: unknown, Publisher: unknown, Jun. 1996.

Mills, Exterior Gateway Protocol Formal Specification (Apr. 1984), RFC 904, available at http://tools.ietf.org/html/rfc904, Jun. 24, 2009, pp. 1–32.

*Modicon Interfacing*, Author: unknown, *Engineering Report*, No. 90–022, Revised: Apr. 12, 1996, pp. 1–9.

*Moore Products—Hart Protocol Interfacing*, Author: unknown, *Engineering Report*, No. 94–007, Revised: Mar. 1, 1996, pp. 1–3.

Moorman, *Packet Radio Used in a Cost–Effective Automated Weather Meso–Net*, available at http://www.wrh.noaa.gov/.wrh/96TAs/TA9631/ta96–31.html, Dec. 3, 1996 (5 pages).

Moy, RFC 2328, OSPF Version 2 (Apr. 1998), available at http://tools.ietf.org/html/rfc2328, Jun. 24, 2009, pp. 1–245.

Mozer et al., The Neural Network House: An Overview, in L. Niklasson & Boden (Eds.), *Current trends in connectionism* (pp. 371–380); Hillsdale: Erlbaun, 1995; pp. 1–9.

MTC Teams with Coactive Networks to Deliver an Advanced Energy Communications and Management Solution, *Coactive* (press release), Author: unknown, Feb. 5, 2001, pp. 1–4.

Murthy et al., An Efficient Routing Protocol for Wireless Networks, Mobile Networks and Applications 1 (1996), pp. 183–197.

Natkunanathan et al., A Signal Search Engine for Wireless Integrated Network Sensors, EED, *UCLA Electrical Engineering Department*;; Date: unknown; pp. 1–4.

Natunanathan et al., Wins: Signal Search Engine for Signal Classification, *EED, UCLA*; Date: unknown; pp. 1–6.

Negus et al, HomeRF™ and SWAP: Wireless Networking for the Connected Home, *ACM Sigmobile Mobile Computing and Communications Review*, vol. 2, Issue 4, Oct. 1998, available at http://portal.acm.org/citation.cfm?id=1321400.1321401, on Mar. 29, 2009, pp. 1–2.

Negus et al., HomeRF™ and SWAP: Wireless Networking for the Connected Home, *Mobile Computing and Communications Review*, vol. 2, No. 4, Date: unknown, pp. 28–37.

Network Working Group, *Internet Protocol (IPv6)*, *Internet Engineering Task Force*, 1998.

NewPower and Coactive Networks Announce Strategic Alliance to Deliver the Connected Home, *Coactive* (press release), Author: unknown, Mar. 14, 2001, pp. 1–4.

Nextgen Searches, *IPCO v. The Wireless Sensor Network Industry*? Special Report on *IPCO*v. *Oncor et al.*, Corporate Manager's Edition, 2009, pp. 1–16.

NX–480 Wireless Motion Sensor, document No. 466–1479 Rev. D;, *Caddx Controls*; AuAuthor: unknown; Caddx Controls, Inc.; May 1, 1998, pp. 1.

Omni Automation System, Author: unknown; *Home Automation, Inc.*, Date: unknown, pp. 1–266.

Omni Instalation Manual, Author: unknown; *Home Automation, Inc.*, Oct. 1997, pp. 1–88.

Omni Owner's Manual, Author: unknown; *Home Automation, Inc.*, Date: unknown, pp. 1–136.

Omni user Manual, *Home Automation, Inc.*; Author: unknown; 1997.

*Omron Interfacing*, Author: unknown, *Engineering Report*, No. 95–003, Revised: Apr. 17, 1996, pp. 1–4.

Ondo, *PLRS/JTIDS Hybrid, Filled Artillery Journal*, Jan.– Feb. 1981, pp. 20–25.

*Opto–22 Protocol*, Author: unknown, *Engineering Report*, No. 93–010, Revised: May 31, 1996, pp. 1–8.

Oran (ed.), OSI IS–IS Intra–Domain Routing Protocol, RFC 1142 (Feb. 1990), available at http://tools.ietf.org/html/rfc1142, Jun. 24, 2009, pp. 1–665.

Park et al., SensorSim: A Simulation Framework for Sensor Networks, *ACM*, 2000, pp. 104–111.

Perkins et al., A Mobile Networking System Based on Internet Protocol, Publisher: unknown, Date: unknown, pp. 1–17.

Perkins et al., *Ad–Hoc* On–Demand Distance Vector Routing "AODV", http://moment.cs.ucsb.edu/AODV/aodv.html, Aug. 25, 2009, pp. 1–5.

Perkins et al., Continuous, transparent network access for portable users, A Mobile Networking System Based on Internet Protocol, IEEE Personal Communications, First Quarter 1994, pp. 32–41.

Perkins et al., Highly Dynamic Destination–Sequenced Distance–Vector Routing (DSDV) for Mobile Computers; SIGCOM Conference on Communications Architectures, Protocols ans Applications, London England UK (Aug. 1994); pp. 234–244.

Perkins et al., Highly Dynamic Destination–Sequenced Distance–Vector Routing (DSDV) for Mobile Computers, ACM SIGCOMM Computer Communications Review archive vol. 24, Issue 4 (Oct. 1994), pp. 234–244.

Perkins et al., Mobility Support in IPv6, *Internet Draft* (Sep. 22, 1994), available at http://www.monarch.cs.rice.edu/internet–draft/draft–perkins–ipv6–mobility–sup–oo.txt., Sep. 26,2009, pp. 1–13.

Perkins et al., RFC3561—*Ad Hoc* On–Demand Distance Vector (AODV) Routing (Jul. 2003), available at http://tools.ietf.org/html?rfc 3561, Aug. 25, 2009, pp. 1–38.

*Phoenix Contact Interfacing*, Author: unknown, *Engineering Report*, No. 94–001, Revised: Jun. 20, 1996, pp. 1–7.

Pittway Corporation, Company History, available at http://www.fundinguniverse.com/company–histories/Pittway–Corporation Mar. 6, 2009, pp. 1–5.

*PLC Direct (Koyo) Interfacing*, Author: unknown, *Engineering Report*, No. 96–001, Revised: Apr. 10, 1996, pp. 1–8.

Postel (Editor), Internet Protocol, DARPA Internet Program Protocol Specification, RFC 791 (Sep. 1981), Information Sciences Institute, University of So. Cal., pp. 1–45.

Postel (Editor), Internet Protocol, DARPA Internet Program Protocol Specification, RFC 791 (Sep. 1981), Information Sciences Institute, University of So. Cal., available at http://www.rfc–editor.org/rfc/rfc791.txt on Sep. 14, 2009, 51 pages.

Postel (ed.), *Transmission Control Protocol, Version 4*, RFC793, available at http://www.faqs.org/rfcs/rfc793.html, Sep. 1981, pp. 1–85.

Pottie et al., Adaptive Wireless Arrays for Interactive RSTA in SUO (Awairs), *UCLA, Electrical Engineering Department*; Date: unknown, pp. 1–20.

Pottie et al., Adaptive Wireless Arrays Interactive Recconaissance, Surveillance, and Target Acquisition in Small Unit Operations (Awairs); Lower Power Wireless Integrated Microsensors (LWIM), Presented to Dr. E. Carapezza, Dr. D. Lao and Lt. Col. J. Hernandez, *UCLA, Rockwell Science Center*; Mar. 21, 1997, pp. 1–110.

Pottie, Awairs Mini–Site Review [Presentation], *Rockwell Science Center*; Feb. 23, 1998, pp. 1–58.

Pottie, Awairs: Mini–Site Review, *Project Status*, UCLA: Rockwell Science Center, Feb. 23, 1998, pp. 1–58.

Pottie, *Hierarchical Information Processing in Distributed Sensor Networks, ISIT*, Aug. 16–21, 1998, IEEE, 1998, pp. 163.

Pottie et al., Wins: Principles and Practice, *EDD, UCLA*; Date: unknown, pp. 1–10.

Pottie et al., Wireless Integrated Network Sensors: Towards Low Cost and Robust Self–Organizing Security Networks; *EED, UCLA; Rockwell Science Center; SPIE* vol. 3577, Nov. 1, 1998, pp. 86–95 (20 pages).

Pottie et al., *Wireless Integrated Network Sensors: Towards Low Cost and Robust Self–Organizing Security Networks*, Publisher: unknown, Date: unknown, pp. 1–10.

Pottie et al., Wireless Integrated Network Sensors, *UCLA; Communications of the ACM*, vol. 43, No. 5, May 2000, pp. 51–58.

Pottie, Wireless Sensor Networks, ITW 1998, Jun. 22–26, 1998, available at http://dantzig.ee.ucla.edu/oclab/Pottie. html, 2 pages.

Power/Perfect Energy Management Systems, Author: unknown, *Johnson Controls*, 1983, pp. 1–4.

Rabaey et al., PicoRadio Supports *Ad Hoc* Ultra–Low Power Wireless Networking, *Computer*; IEEE, Jul. 2000, pp. 42–48.

Radlherr, Datentransfer Ohne Draht und Telefon, *Funkschau*, Nov. 1991, pp. 49–52.

Raji, Control Networks and the Internet, *Echelon Corp.*; 1998, pp. 1–39.

Raji, End–to–End Solutions with LonWorks® Control Technology: Any Point, Any Time, Any Where, *Echelon Corp.*; 1998, pp. 1–30.

Rehkter et al., A Border Gateway Protocol 4 (BGP–4), RFC 1771, (Mar. 1995), available at http://tools.ietf.org/html. rfc1771, Jun. 24, 2009, pp. 1–58.

Ritter et al. *The Architecture of Metricom's Microcellular Data Network™ (MCDN) and Detail of its Implementation as the Second and Third Generation Ricochet™ Wide–Area Mobile Data Service, IEEE*, 2001, pp. 143–152.

Rosen, Exterior Gateway Protocol (EGP), RFC 827 (Oct. 1982), available at http://tools.ietf.org/html/rfc827, Jun. 24, 2009, pp. 1–48.

Salkintzisa et al., *Design and implementation of a low–cost wireless network for remote control and monitoring applications, Elservier, Microprocessors and Microsystems*, 1997, pp. 79–88.

Saltzer et al., Source Routing of Campus–wide Internet Transport (Sep. 15, 1980), available at http://groups.csail. mit.edu/ana/publications/pubPDFs/Sourcerouting.html, Sep. 21, 2009, pp. 1–14.

Schulman et al., SINCGARS Internet Controller–Heart of the Digitized Battlefield, Proceedings of the 1996 Tactical Communications Conference, Apr. 30–May 2, 1996, pp. 417–421.

*Selected Vendor Telecommunications Products*, Author: unknown, available at http://eetd.lbl.gov/ea/ems/reports/39015a.pdf, Date: unknown; pp. 1–83.

Shacham et al., A Packet Radio Network for Library Automation; 1987 IEEE Military Communications Conference, vol. 2, at 21.3.1 (Oct. 1987); pp. 456–462.

Shacham et al., Dynamic Routing for Real–Time Data Transport in Packet Radio Networks, IEEE Proceedings of INFOCOM '82, pp. 152–159.

Shacham et al., Future Directions In Packet Radio Architectures And Protocols, Proceedings of The IEEE, vol. 75, No. 1, Jan. 1987, pp. 83–99.

Shacham et al., Packet Radio Networking, Telecommunications vol. 20, No. 9, Sep. 1986, pp. 42,43,46,48,64 and 82.

Shoch, Inter–Network Naming, Addressing and Routing, Internet Experiment Note # 19, Notebook section 2.3.3.5, Xerox Palo Alto Research Center, Jan. 29, 1978, Publisher: unknown, pp. 1–9.

Smart Home Technology Leader Intelli Selects Coactive Networks Internet Getaways, *Coactive* (press release), Author: unknown, Sep. 11, 2000, pp. 1–4.

Sohrabi et al., Protocols for Self–Organization of a Wireless Sensor Network, *IEEE Personal Communications*, Oct. 2000, pp. 16–27.

*Special Poll Feature*, Author: unknown, *Engineering Report*, No. 93–008, Sep. 1993, pp. 1–5.

*Square D Interfacing* Author: unknown, *Engineering Report*, No. 88–010, Revised: Apr. 18, 1996, pp. 1–9.

Subramanian et al., An Architectural for Building Self–Configurable Systems, *IEEE*, 2000, pp. 63–73.

Sunshine, Addressing Problems in Multi–Network Systems (Apr. 1981), available at ftp://ftp.isi.edu/in–notes/ien/ien178.txt, Sep. 14, 2009, pp. 1–26.

Sunshine, Addressing Problems in Multi–Network Systems, Proceedings INFOCOM '82, 1982 IEEE, pp. 12–18.

Sunshine, Network Interconnection and Gateways, IEEE Journal on Selected Areas in Communications, vol. 8, No. 1, Jan. 1990, pp. 4–11.

Sunshine, Source Routing in Computer Networks, Information Sciences Department of The Rand Corporation (1977), Publisher: unknown, pp. 29–33.

Technology Review, Metricom's Ricochet Packet Radio Network, Ham Radio Online, 1996, Author: unknown, pp. 1–3.

*Technology Review: Metricom's Ricochet Packet Radio Network*, Author: unknown, *Virtual Publishing*, 1996, available at http://www.hamradio–online.com/1996/jan/met ricom. html on May 4, 2010, pp. 1–3.

*Texas Instruments Interface*, Author: unknown, *Engineering Report*, No. 91–021, Revised: Nov. 1994, pp. 1–3.

The Institute of Electrical and Electronics Engineers, Inc., *IEEE Std 802.11–1997*, available at www.ieee.org on Jun. 26, 1997.

The New Power Company Announces Revolutionary Energy–Saving Program that Gives Consumers Remote Control of their Thermostats via the Internet, *NewPower* (press release), Author: unknown, Apr. 24, 2001, pp. 1–6.

Theodorides, *Wireless Integrated Network Sensors*, Power Point Presentation, Publisher: unknown, Apr. 15, 2003, pp. 1–19.

The SNVT Master Master List and Programmers's Guide, *Echelon Corp.*; Author: unknown; Mar. 1996, pp. 1–23.

Tobagi–et–al, Packet Radio and Satellite Networks, IEEE Communications Magazine, vol. 22, No. 11, Nov. 1984, pp. 24–40.

Toh, A Novel Distributed Routing Protocol to Support Ad–Hoc Mobile Computing, Conference Proceedings of the 1996 IEEE Fifteenth Annual International Phoenix Conference on Computers and Communications, Mar. 27–29, 1996, pp. 480–486.

*Toshiba Interfacing*; Author: unknown, *Engineering Report*, No. 91–011, Revised: Jun. 19, 1996, pp. 1–4.

Totolo, HomeRF, A New Protocol on the Horizon, Feb. 1999, available at http://www.hometoys.com/htinews/feb99/articles/totolo/totolo.htm, Mar. 2, 2009, pp. 1–3.

*TranstexT® Advanced Energy Management System*, Article, Author: unknown, Publisher: unknown, Date: unknown, pp. 1–2.

*TranstexT® Advanced Energy Management System*, Brochure, Author: unknown, *Integrated Communication Systems, Inc.*, 1990, pp.1–8.

Varadhan et al., SDRP Route Construction, Internet Draft, available at draft–ietf–sdr–route–construction–01.{ps,txt}, Feb. 27, 2005, pp. 1–12.

Vardhan et al., Wireless Integrated Network Sensors (WI(NS): Distributed In Situ Sensing for Mission and Flight Systems, *2000 IEEE Aerospace Conference Proceedings*; 2000, pp. 459–463 (12 pages).

Vista–40 2–Partition Security System Installation and Setup Guide; *Ademco*, Author: unknown; Jul. 1, 1998.

Wang et al., Energy–Scalable Protocols for Battery–Operated MicroSensor Networks, *EED, MIT*; Date: unknown, pp. 1–11.

Warrock, *Scool Give Report on Radio–Based FMS, Energy User News*, Nov. 7, 1983, pp. 1.

Weiser, Some Computer Science Issues in Ubiquitous Computing, Mar. 23, 1993, *Communications of the ACM*; Jul. 1993, pp. 1–13.

Weiser, The Computer for the $21^{st}$ Century, *Scientific American*; Sep. 1991, available at http://www.ubiq.com/hypertext/weiser/Sci AmDraft3.html on Apr. 20, 2009, pp. 1–9.

*Welcome to UtiliNet: A Wireless Data Communications Solution from Metricom, Inc.*, Author: unknown, available at http://web.archive.org/web/199806028045812/www.metricom.com/industrial/utilinet.html on May 10, 2010, pp. 1–10.

Westcott et al., Hierarchical Routing for Very Large Networks, IEEE Military Communications Conference, Oct. 21–24, 1984, Conference Record vol. 2, pp. 214–218.

*Westinghouse Numa Logic Interface*, Author: unknown, *Engineering Report*, No. 91–013, Date: unknown, pp. 1–7.

Wey et al., Clone Terminator: An Authentication Service for Advanced Mobile Phone System; IEEE (1995); pp. 175–179.

*What's Behind Ricochet: A Network Overview*; Author: unknown, available at http://web.archive.org/web/20000815090824/www.ricochet.com/ricoche t_advantage/tech_overview.html, Aug. 15, 2000, pp. 1–4.

Wikipedia, Ad Hoc On–Demand Distance Vector Routing, available at http://en.wikipedia.org/wiki/Ad_Hoc_On–Demand_Distance_Vector_Routing on Aug. 25, 2009, pp. 1–3.

Wikipedia, Bellman–Ford Algorithm, available at http://en.wikipedia.org/Wiki/Bellman–Ford, Jun. 24, 2009, pp. 1–4.

Wikipedia, Border Gateway Protocol, available at http://en.wikipedia.org/wiki/Border_Gateway_Protocol, Jun. 24, 2009, pp. 1–13.

Wikipedia, Distance–Vector Routing Protocol, available at http://en.wikipedia.org/wiki/Distance–Vector_Routing_Protocol, Jun. 24, 2009, pp. 1–4.

Wikipedia, Enhanced Interior Gateway Routing Protocol, available at http://en.wikipedia.org/wiki/EIGRP, Jun. 24, 2009, pp. 1–7.

Wikipedia, Exterior Gateway Protocol, available at http://en.wikipedia.org/wiki/Exterior_Gateway_Protocol, Jun. 24, 2009, pp. 1.

Wikipedia, Interior Gateway Routing Protocol, available at http://en.wikipedia.org/wiki/Interior_Gateway_Routing_Protocol, Jun. 24, 2009, pp. 1–2.

Wikipedia, IS–IS, available at http://en.wikipedia.org/wiki/IS–IS, Jun. 24, 2009, pp. 1–3.

Wikipedia, L. R. Ford, Jr., available at http://en.wikipedia.org/wiki/L._R. Ford, Jr, Jun. 24, 2009, pp. 1.

Wikipedia, Open Shortest Path First, available at http://en.wikipedia.org/wiki/Open_Shortest_Path_First, Jun. 24, 2009, pp. 1–9.

Wikipedia, Richard E. Bellman, available at http://en.wikipedia.org/wiki/Richard_Bellman, Jun. 24, 2009, pp. 1–3.

Wikipedia, Routing Information Protocol, available at http://en.wikipedia.org/wiki/Routing_Information_Protocol, Jun. 24, 2009, pp. 1–4.

Will et al., *Wireless Networking for Control and Automation of Off–road Equipment, ASAE*, Jul. 18–21, 1999, pp. 1–10.

Wilson, Lexicon 700t Touchscreen Remote, Jan. 1, 1999, available at http://avrev.com/home –theater–remotes–system–control/remotes–system on Mar. 2, 2009, pp. 1–3.

Wireless Accessories, catalog pages, *Home Automation, Inc.*; available at http://web.archive.org/web/19970216060056/www.homeauto.com/ on Feb. 17, 2009(archived web page);, Author: unknown; pp. 1–2.

Wright (ed.), Home–automation networks mature while the PC industry chases a new home LAN, *EDN Design Feature*, Date: unknown, pp. 1–9.

Wu, Distributed System Design; CRC Press (1999); pp. 177–180 and 204.

Wunnava et al., Web Based Remote Security System (WRSS) Model Development, *IEEE*, Apr. 7–9, 2000, pp. 379–382.

X10, CK11A ActiveHome, Home Automation System, *Owner's Manual*, Oct. 23, 1997, pp. 1–56.

X10.com: The Supersite for Home Automation, *What's in the Kit*, available at http://web.archive.org/web/19991111133653/www.com/products/x, on Mar. 2, 2009, pp. 1–2.

X10.com: The Supersite for Home Automation, *Wireless Remote Control System (RC5000)*, available at http://web.archive.org/web/1999111453227/ www.x10.com/products/x1, on Mar. 2, 2009, pp. 1.

X10: The Supersite for Home Automation, *Transceiver Module*, available at http://web.archive.org/web/20000229141517/www.x10.com/products/x, on Mar. 2, 2009, pp. 1.

Yadav, *Border Security Using Wireless Integrated Network Sensors (WINS)* Power Point Presentation, Publisher: unknown, Date: unknown, pp. 1–22.

Young, A Unifying Dynamic Distributed Multichannel TDMA Slot Assignment Protocol, Working paper, *Rockwell International*; Oct. 25, 1995, pp. 1–29.

Young, USAP: A Unifying Dynamic Distributed Multichannel TDMA Slot Assignment Protocol, *Rockwell International Communication Systems Division; IEEE*; 1996, pp. 235.

Yu, *Target Identification Processor for Wireless Sensor Network*, Dissertation, Los Angeles: University of California, 1999, pp. 1–110.

Zander et al., The Softnet Project: A Retrospect, 1988 IEEE, pp. 343–345.

Zimmermann et al., Daten Funken, Publisher: unknown; Date: unknown, pp. 1–6.

U.S. Appl. No. 09/271,517, in the name of Thomas D. Petite, for a System for Monitoring Conditions in a Residential Living Community, abandoned as per Notice of Abandoned mailed Oct. 14, 2004.

Brownrigg, E.B. et al.; A Packet Radio Network for Library Automation; IEEE (1987); pp. 456–462.

Brownrigg, E.B. et al.; Packet Radio Networks; Architectures, Protocols, Technologies and Applications (1987), (introduction pp. ix–xviii); pp. 3–274.

Brownrigg, E.B. et al.; Distribution, Networks, and Networking: Options for Dissemination; Workshop on Electronic Texts Session III (http://palimpsest.standford.edu/byorg/lc/etextw/sess3.html 1992); pp. 1–10.

Brownrigg, E.B.; User Provided Access to the Internet; (http://web.simmons.edu/~chen/nit/NIT'92/033–bro.htm 2005); pp. 1–6.

Perkins, C.E. et al.; Highly Dynamic Destination–Sequenced Distance–Vector Routing (DSDV) for Mobile Computers; SIGCOMM 94–9/94 London England UK (1994); pp. 234–244.

Wu, J.; Distributed System Design; CRC Press (1999); pp. 177–180 and 204.

Kahn, Robert E., Gronemeyer, Steven A., Burchfiel, Jerry, and Kunzelman, Ronald C., "*Advances in Packet Radio Technology,*" IEEE Nov. 1978, vol. 66, No. 11, pp. 1468–1496.

Wey, Jyhi–Kong, Chang, Han–Tsung, Sun, Lir–Fan and Yang, Wei–Pang, "*Clone Terminator: An Authentication Service for Advanced Mobile Phone System,*" IEEE 1995, pp. 175–179.

Jubin, John and Tornow, Janet D., "*The DARPA Packet Radio Network Protocols,*" Proceedings of the IEEE, vol. 75, No. 1, Jan. 1987, pp. 21–32.

Kleinrock, Leonard and Kamoun, Farouk, "*Hierarchical Routing for Large Networks,*" North–Holland Publishing Company, Computer Networks 1, 1997, pp. 155–174.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-4, 6-8, 10-12 and 14-16 is confirmed.

Claims 1, 5, 9 and 13 are cancelled.

* * * * *